(12) United States Patent
Namiki et al.

(10) Patent No.: US 6,611,370 B2
(45) Date of Patent: Aug. 26, 2003

(54) RAMAN AMPLIFIER SYSTEM, APPARATUS AND METHOD FOR IDENTIFYING, OBTAINING AND MAINTAINING AN ARBITRARY RAMAN AMPLIFICATION PERFORMANCE

(75) Inventors: Shu Namiki, Tokyo (JP); Yoshihiro Emori, Tokyo (JP); Mikio Ogai, Chiba (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/775,632

(22) Filed: Feb. 5, 2001

(65) Prior Publication Data
US 2001/0050802 A1 Dec. 13, 2001

(51) Int. Cl.[7] .............................. H01S 3/30; H04B 10/12
(52) U.S. Cl. .............. 359/334; 359/341.4; 359/337.11; 359/341.41; 359/341.42
(58) Field of Search ..................... 359/341.41, 341.4, 359/341.42, 334, 194, 337.11

(56) References Cited

U.S. PATENT DOCUMENTS

| | | | |
|---|---|---|---|
| 4,616,898 A | | 10/1986 | Hicks, Jr. |
| 4,699,452 A | | 10/1987 | Mollenauer et al. |
| 5,664,131 A | * | 9/1997 | Sugiya .................. 359/337.13 |
| 5,673,280 A | | 9/1997 | Grubb et al. |
| 5,715,263 A | | 2/1998 | Ventrudo et al. |
| 5,887,093 A | | 3/1999 | Hansen et al. |
| 5,907,429 A | * | 5/1999 | Sugata .................... 359/341.42 |
| 5,912,761 A | * | 6/1999 | Jander et al. ................ 359/134 |
| 5,940,209 A | * | 8/1999 | Nguyen ..................... 359/124 |
| 5,995,275 A | * | 11/1999 | Sugaya ........................ 359/160 |
| 6,038,063 A | * | 3/2000 | Tsuda et al. ................. 359/341 |
| 6,115,174 A | | 9/2000 | Grubb et al. |
| 6,144,487 A | * | 11/2000 | Michishita ............... 359/337.1 |
| 6,151,160 A | | 11/2000 | Ma et al. |
| 6,178,038 B1 | | 1/2001 | Taylor et al. |
| 6,229,631 B1 | * | 5/2001 | Sato et al. .................. 359/110 |
| 6,246,510 B1 | * | 6/2001 | BuAbbud et al. ............ 359/337 |
| 6,292,288 B1 | * | 9/2001 | Akasaka et al. ............. 359/334 |
| 6,310,716 B1 | * | 10/2001 | Evans et al. ................. 359/337 |
| 6,313,940 B1 | * | 11/2001 | Bode et al. .................. 359/177 |
| 6,317,255 B1 | * | 11/2001 | Fatehi et al. ................. 359/177 |
| 6,320,884 B1 | | 11/2001 | Kerfoot, III et al. |
| 6,344,922 B1 | | 2/2002 | Grubb et al. |
| 6,417,959 B1 | | 7/2002 | Bolshtyansky et al. |
| 6,433,921 B1 | * | 8/2002 | Wu et al. .................... 359/334 |
| 6,452,715 B1 | * | 9/2002 | Friedrich ..................... 359/334 |
| 6,452,716 B1 | * | 9/2002 | Park et al. ................... 359/334 |
| 2001/0036004 A1 | | 11/2001 | Ackerman et al. |

FOREIGN PATENT DOCUMENTS

WO    WO 01/51986    * 6/2000

OTHER PUBLICATIONS

Emori, Y. and Namiki, S. "100 nm bandwidth flat gain Raman amplifiers pumped and gain–equalized by 12–wavelength–channel WDM hihg power laser diodes." OFC/IOOC 1999, Technical Digest. PD19/1–19/3, Feb. 1999.*

* cited by examiner

Primary Examiner—Thomas G. Black
Assistant Examiner—Andrew R Sommer
(74) Attorney, Agent, or Firm—Oblon, Spivak, McClelland, Maier & Neustadt, P.C.

(57) ABSTRACT

A Raman amplifier, system and method using a plurality of pumps configured to pump light into an optical fiber so as to Raman-amplify an optical signal propagating through the optical fiber. The Raman amplifier also includes an optical coupler configured to optically interconnect the pumping device with the optical fiber, and a control unit configured to control the pumping device so as to achieve a target amplification performance. Further, the control unit monitors the Raman-amplified WDM signal and determines if the monitored Raman-amplified WDM signal is within an allowable tolerance of the target amplification performance. If the Raman-amplified signal is not within the allowable tolerance, the control unit actively controls the pumps to bring the monitored Raman-amplified signal within the allowable tolerance of the target amplification profile.

171 Claims, 34 Drawing Sheets

DESIGN OF PUMPING WAVELENGTH BASED ON SUPERPOSITION PRINCIPLE

DESIGN PARAMETERS:

WAVELENGTH ALLOCATION
EFFECTIVE GAIN ALLOCATION

SPECIFICATIONS:

FIBER TYPE, GAIN AND FLATNESS
BANDWIDTH, NUMBER OF LDS

ACCOUNTING FOR PUMP-TO-PUMP
RAMAN INTERACTIONS (a) 1420 nm PUMP
(b) 1435 nm PUMP
(c) 1450 nm PUMP
(d) 1495 nm PUMP (ALSO ELEMENT GAIN FOR PUMP AT LONGER WAVELENGTH)
(e) TOTAL GAIN IF NO PUMP-TO-PUMP INTERACTION
(f) TOTAL GAIN, INCLUDING PUMP-TO-PUMP INTERACTION
(g) ELEMENT GAIN FOR 3 PUMPS AT SHORTER WAVELENGTHS

RAMAN AMPLIFIER SYSTEM, APPARATUS AND METHOD FOR IDENTIFYING, OBTAINING AND MAINTAINING AN ARBITRARY RAMAN AMPLIFICATION PERFORMANCE

CROSS-REFERENCE TO RELATED APPLICATIONS

This document contains subject matter related to that disclosed in PCT Application No. PCT/JP99/03944, filed on Jul. 23, 1999; and JP Application No. 2000-006567, filed in the Japanese Patent Office on Jan. 14, 2000, each of which are incorporated herein by reference in their entirety.

BACKGROUND OF THE INVENTION

1. Field of the Invention

The present invention relates to a Raman amplifier system, apparatus and method for amplifying optical signals in various optical media, and more particularly to a Raman amplifier system, apparatus and method that employs a control unit for achieving an arbitrary Raman amplification profile in a single Raman amplifier as well as a plurality of cascaded Raman amplifiers in a communications network.

2. Discussion of the Background

Optical fiber communication systems transmit optical signals over considerable distances. However, the transmitted optical signals are attenuated because of absorption and scattering, ultimately resulting in signal degradation. To keep the level of signal strength above background noise by a predetermined amount, the optical signals must be periodically amplified. Typically, optical signals are amplified using electronic repeaters, which convert the optical signals into electric signals, amplify the electrical signals, and then convert the amplified electrical signals back into optical signals for further transmission along an optical fiber.

Since 1996, network traffic growth has continued at a torrid pace, with Internet traffic doubling every 100 days and overall network traffic growth approaching 100% annual growth. In an effort to keep pace with bandwidth demands nearly doubling annually, wavelength division multiplexing (WDM) system designers are moving to more cost effective solutions such as optical amplifiers.

Generally, there are two general types of optical amplifiers for amplifying signals within optical fiber communication systems. The first type is a rare earth doped fiber amplifier, such as an Erbium Doped Optical Fiber Amplifier (EDFA) using Er (erbium) doped fibers as an amplification medium. The second type of optical amplifier is a Raman amplifier.

EDFA is currently the most widely used optical amplifier for WDM systems and is effective and reliable in optically amplifying WDM signals. However, an amplification bandwidth of EDFA has a limited range of about 1530 nm to 1610 nm. Further, as shown in FIG. 1, EDFA produces a wavelength dependent gain profile with a peak gain between 30–36 dB in the 1525 nm to 1540 nm range and a more flat gain plateau at about 30 dB in the 1540 nm to 1560 nm range.

Accordingly, when EDFA is used to amplify WDM signals, which are spectrally distributed over the amplification bandwidth, a non-uniform amount of gain is applied to the separate WDM channels, depending on the wavelength of the channels. To offset this effect, a gain flattening filter is used to obtain a uniform or flat gain profile (a gain deviation of less than 1 dB) across the entire communication band. In particular, a loss profile of the gain flattening filter is designed to have an inverse shape similar to the gain profile. However, the filter is limited to a particular gain profile and is not dynamically adjustable to compensate for changes in a magnitude of the gain of the EDFA. Accordingly, a flat gain profile cannot be maintained when the gain of the EDFA is changed. In addition, the gain flattening filter decreases the total amount of power launched into an optical fiber.

Further, WDM systems using EDFAs are plagued by noise problems. In more detail, there are two types of noise associated with fiber optic transmission: span noise and amplifier noise. In a system amplified exclusively by EDFAs, a signal leaves a first amplification site at a high end of the system's dynamic range. However, over the next approximately 75 km, the signal attenuates linearly and reaches the next EDFA at a level that is much closer to the background noise floor (i.e., lower signal-to-noise ratio) than when originally generated. Thus, when the EDFA amplifies the signal, the EDFA amplifies both the signal itself as well as the background, such that the signal-to-noise ratio is not further degraded by background noise when transmitted further down the optical fiber. The amplfier itself, however, introduces some amplifer noise into the the signal and thus the signal to noise (background plus amplfer noise) ratio decreases after each EDFA amplification stage.

After about 400–600 km, the signal has to be regenerated (i.e., "cleaned up"). To accomplish this, regenerators are strategically situated throughout the network. The regenerators convert the optical signal back to its electrical equivalent so the data may be detected, as is done in a receiver. Then, the data signal is converted into an optical signal and retransmitted on the network. However, requiring regenerators to be positioned every 400 to 600 km is a costly process, which accounts for up to 50% of the total cost of a network. Regenerators are also very expensive which further increases the total cost of the network.

Raman amplifiers use a phenomenon known as Stimulated Raman Scattering (SRS) of light within an optical fiber to achieve a gain in a particular wavelength band. SRS produces a peak gain at a frequency which is smaller than a frequency of the light pumped into the optical fiber by about 13 THz (or conversely produces a peak gain at a wavelength which is longer than a wavelength of the light pumped into the optical fiber by about 100 nm). For example, FIG. 2 illustrates a gain profile resulting from the use of a pumping device including a single semiconductor laser with a central wavelength of 1450 nm. In this case, the peak of the gain profile is at approximately 1550 nm (i.e., shifted 100 nm from the 1450 nm central wavelength of the semiconductor laser) and the profile has a bandwidth of about 20 nm within a gain deviation of about 1 dB.

However, Raman amplification has primarily been investigated for applications in wavelength bands that can not be amplified by EDFA, because the Raman amplifier requires a greater pumping power to obtain the same gain as that of the EDFA. Thus, traditionally Raman amplifiers have not been used to amplify WDM signals, but this may be changing more recently.

In conventional optical communication systems, optical amplifiers for WDM signals are a basic system component that, in combination with the other system components, define the system's communication performance. When establishing new communication systems, or when upgrading existing systems, system operators perform capacity allocation analyses that determine the number of amplifiers that are required to keep the signal above the background span noise when transmitting the signal from one location to the next.

Due to the rapid growth of Internet traffic, system requirements change frequently. When changes occur, the system analysis must be readdressed to ensure that the components that have already been fielded are able to handle the change in system requirements. Since the amplifiers that are fielded have a predefined system performance, with regard to gain shape across the amplification band, it is generally not practical (from a cost and complexity perspective) to provide field upgrades to the amplifiers to alter their gain profiles to optimize system performance at minimal cost. The common solution therefore is to place additional amplifiers at intermediary points between two already fielded amplifiers, or simply replace the fielded amplifiers with more capable amplifiers, albeit at high expense.

Because amplifiers are conventionally considered to be a discrete component of a larger network, when fault conditions occur at a particular amplifier, the repair action is typically taken only on that amplifier, without considering whether the repair action can be avoided by using excess amplification capacity within that amplifier, or at adjacent amplifiers (upstream or downstream of the damaged amplifier). Furthermore, changes in network architecture that may effect bandwidth, for example, or by using other fibers, may change the original design premise on which the original communication system was developed. For example, perhaps a new type of fiber is laid between two existing EDFA or Raman amplifiers, where the bandwidth-attenuation characteristics for that fiber are different than for the one it replaced. In this condition, the gain profile of the amplifiers may not be matched to the fiber, thus giving rise to suboptimum utilization of system resources and/or system performance.

SUMMARY OF THE INVENTION

Accordingly, one object of the present invention is to address the above and other noted problems with conventional EDFA and Raman amplifiers.

To achieve this and other objects, the present invention provides a novel Raman system, amplifier and method that uses a plurality of pumps that are controlled by a control unit to output predetermined levels of pump light into an optical fiber so as to Raman-amplify a WDM optical signal propagating through the optical fiber. The control unit ensures that the Raman amplification performance (e.g., a predetermined amplifier gain profile across the amplification bandwidth) is set to be consistent with system requirements. The control unit monitors the amplified WDM signal and, subsequently, determines if the monitored amplified WDM signal is within a predetermined threshold of the target amplification profile. If the Raman-amplified signal is not within the predetermined threshold, the control unit actively controls the pumps to bring the monitored amplified WDM signal within the predetermined threshold of the target amplification profile. The control unit is also configured to respond to control signals from a central controller (or other source) that directs the Raman amplifier to create a new target amplification performance perhaps based on a change in system operating conditions or requirements.

Another feature of the present invention is that each Raman amplifier need not operate alone, but rather in an internetworked fashion with other amplifiers in the communication system. Since Raman amplification is a distributed amplification, the present invention exploits this distributed effect by shifting amplification duties between adjacent, cascaded Raman amplifiers so as to compensate for unforeseen changes in component operations or system requirements.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
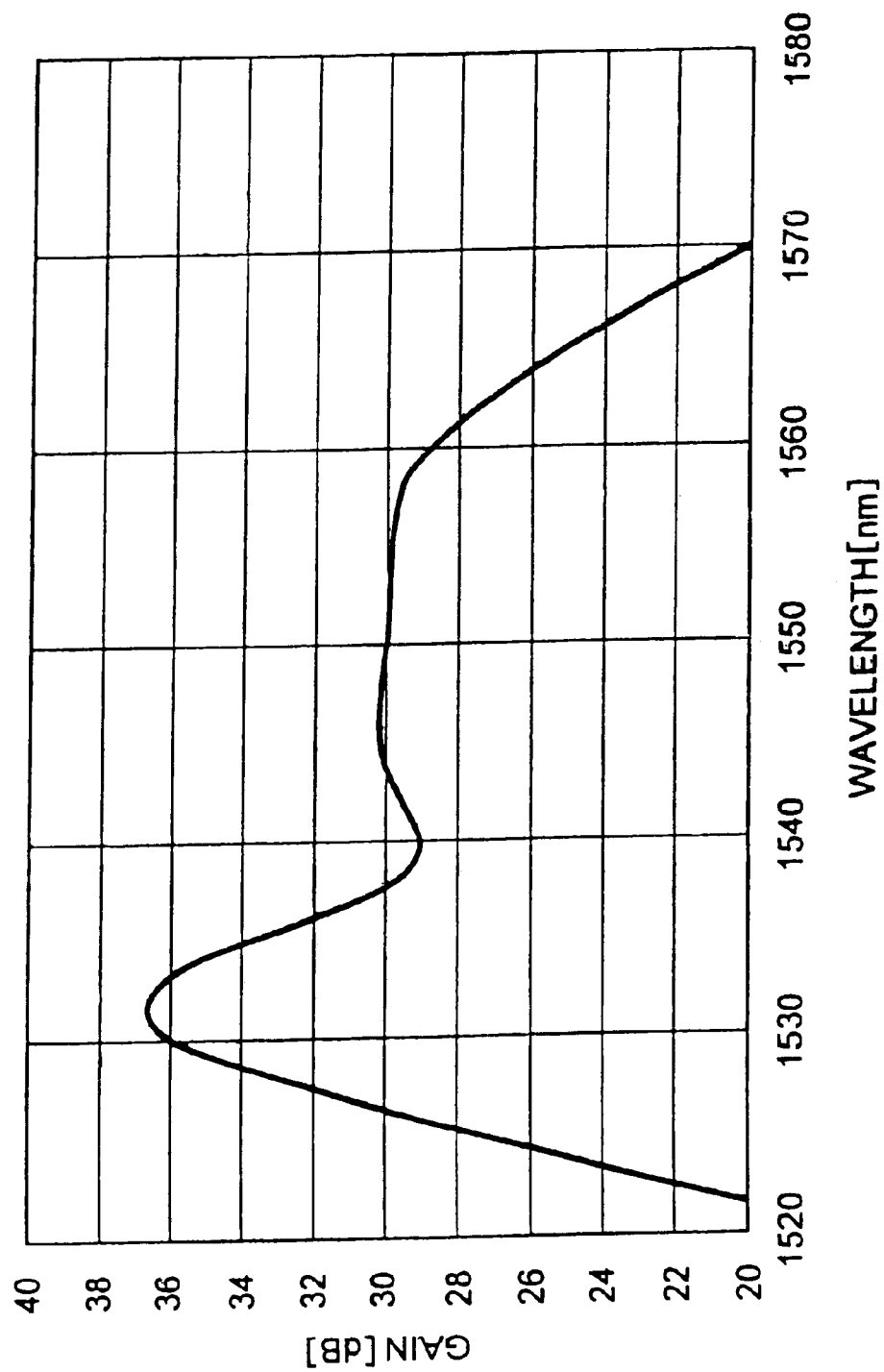
FIG. 1 is a graph illustrating an amplification profile of an EDFA amplifier.
Figure 2:
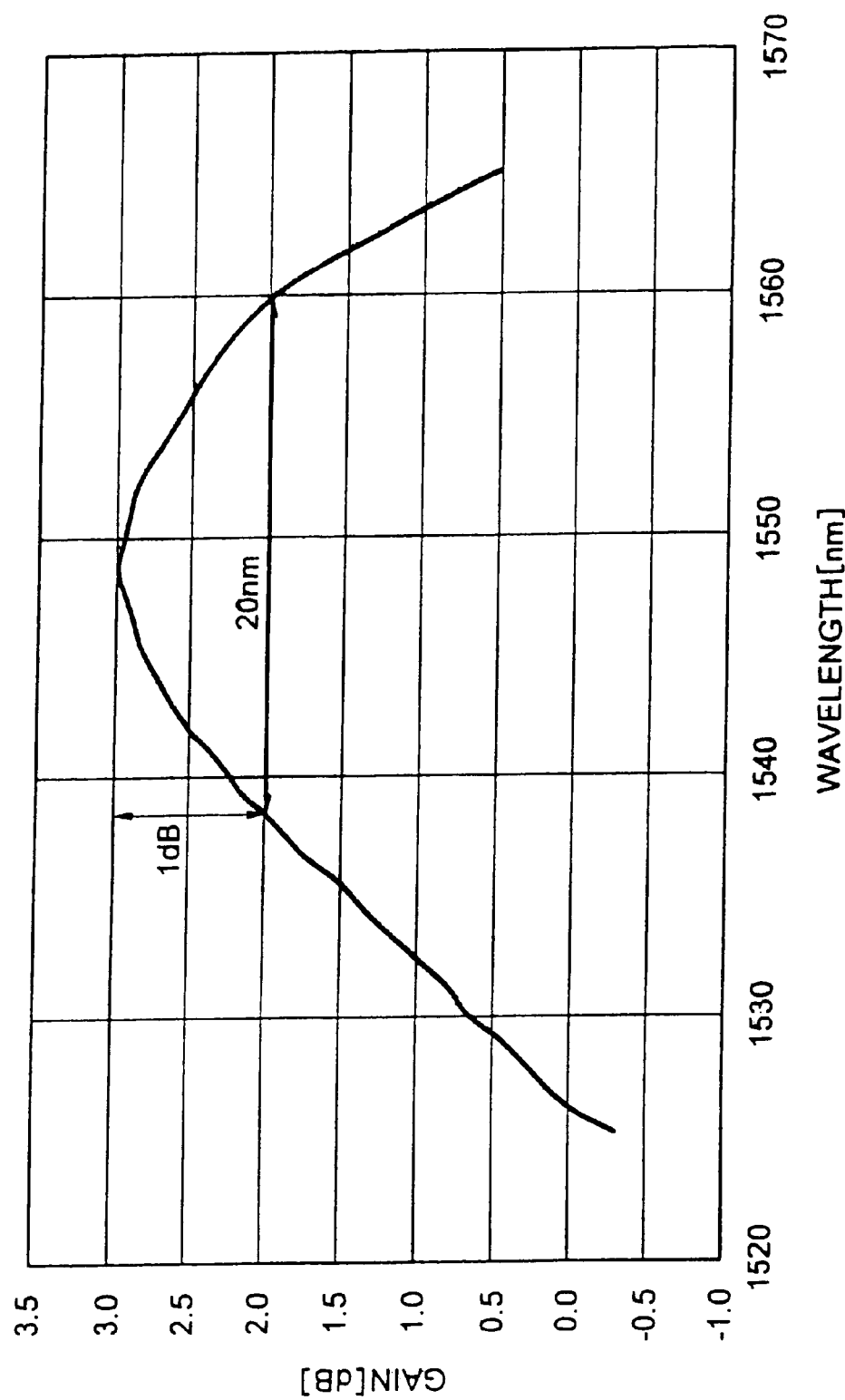
FIG. 2 is a graph illustrating an amplification profile of a Raman amplifier using a single semiconductor laser.
Figure 3:
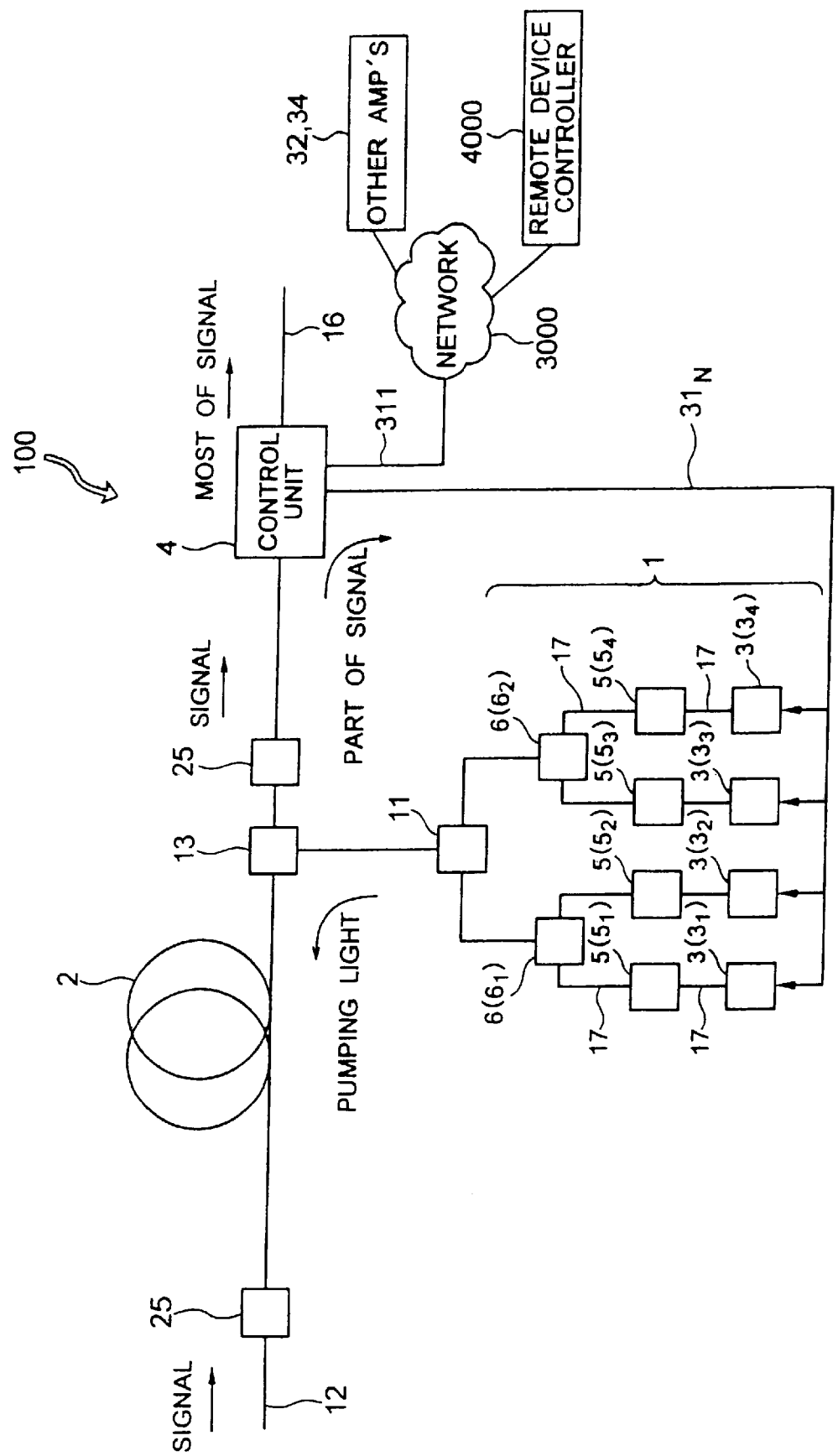
FIG. 3 is a schematic of a Raman amplifier according to one embodiment of the present invention.

Referring now to the drawings, FIG. 3 illustrates a Raman amplifier 100 according to the present invention. The Raman amplifier 100 includes an amplifier fiber (optical fiber) 2, a WDM coupler 13, a pumping device 1, a control unit 4, and optional polarization independent isolators 25. The Raman amplifier 100 is connected to an input fiber 12 and output fiber 16, which may be transmission fibers such as single mode fibers, dispersion compensation fibers (DCF), dispersion flattening fibers, etc.

The Raman amplifier 100 uses a communication link 311 to connect to a network 3000, which in turn is connected to other amplifiers 32, 34 as well as a remote device controller 4000. The remote device controller 4000 monitors the operational status of the Raman amplifier 100 as well as the other amplifiers 32, 34. The network 3000 may be a proprietary wireless or wired network, or another network that is publicly accessible, such as the Internet or a hybrid network, part proprietary and part publicly accessible. While the Raman amplifier 100 may operate autonomously, it may also be provided with additional information about the overall system performance, such that the control unit 4 can adapt its amplification performance to help offset any adverse affects to the system's performance as indicated by a change in conditions, reflected in the additional information. As an example, the additional information may be that a replacement fiber with different attenuation characteristics is being used to interconnect two cascaded Raman amplifiers. In this case, the Raman amplifier 4 may employ a new "target" amplification performance so as to normalize the channel characteristics for all of the WDM channels, despite the fact that the new fiber may attenuate some of the channels by a lesser amount than others.

The pumping device 1 includes Fabry-Perot type semiconductor lasers 3 (i.e., $3_1$, $3_2$, $3_3$ and $3_4$), wavelength stabilizing fiber gratings 5 (i.e., $5_1$, $5_2$, $5_3$ and $5_4$), polarization couplers 6 (i.e., $6_1$ and $6_2$), and a WDM coupler 11. The central wavelengths of the semiconductor lasers $3_1$ and $3_2$ and wavelengths of the fiber gratings $5_1$ and $5_2$ are the same wavelength $\lambda_1$, and the central wavelengths of the semiconductor lasers $3_3$ and $3_4$ and reflection wavelengths of the fiber gratings $5_3$ and $5_4$ are the same wavelength $\lambda_2$. The central wavelengths of the semiconductor lasers $3_1$, $3_2$ and $3_3$, $3_4$ are respectively stabilized to $\lambda_1$ and $\lambda_2$ via the wavelength stabilizing fiber gratings $5_1$, $5_2$ and $5_3$, $5_4$.

The light generated by the semiconductor lasers $3_1$, $3_2$ and $3_3$, $3_4$ are polarization-combined by the $6_1$ and $6_2$ for each wavelength $\lambda_1$ and $\lambda_2$. In addition, light output from the polarization combiners $6_1$ and $6_2$ is combined by the WDM coupler 11. Polarization maintaining fibers 17 are connected between the semiconductor lasers 3 and polarization combiners 6 to maintain two different polarization planes, thus ensuring an input signal will be adequately amplified regardless of its orientation in the signal fiber 12 or amplification fiber 2.

The pumping device 1 in this example includes two pumps that provide light having two different wavelengths $\lambda_1$ and $\lambda_2$ into the amplifier fiber 2 (i.e., a first pump that provides light having a central wavelength of $\lambda_1$, and a second pump that provides light having a central wavelength of $\lambda_2$). Further, as noted in copending U.S. Pat. application Ser. No. 09/527,748, a wavelength interval between the wavelengths $\lambda_1$ and $\lambda_2$ is selected to be greater than 6 nm and smaller than 35 nm.

The light output from the pumping device 1 is coupled to the amplifier fiber 2 via the WDM coupler 13. Further, an optical signal (WDM signal) is incident on the amplifier fiber 2 via the input fiber 12 and is then combined with the light pumped into the amplifier fiber 2 so the incident optical signal is Raman-amplified. In addition, the Raman-amplified optical signal is passed through the WDM coupler 13 and is transmitted toward the control unit 4, where a part of the amplified optical signal is branched to form a monitor signal (or sampled output signal), and the other part is output on the output fiber 16.

Much of the remaining discussion focuses on an operation and configuration of the control unit 4. While there are different embodiments of the control unit 4, a common feature of each embodiment is that a processor is employed to assert control over the amplification performance of the Raman amplifier. While some embodiments include a signal monitoring feature in the control unit, it should be understood that the control unit can receive a monitored output signal from an external source. Likewise the control unit 4 may include a laser driver circuit, or simply an interface to a driver circuit that is external to the control unit 4. In each case, however, the control unit 4 is equipped with a processor that is able to execute a series of instructions (perhaps by way of a PAL, or ASIC) to interpret whether the output of the Raman amplifier is within a predetermined tolerance of a target amplification performance, and take corrective action when it is not.

The control unit 4 monitors the monitor signal and generates a control signal on a bus 31, that includes at least N control lines, so as to control drive currents for the semiconductor lasers 3 to achieve a small gain deviation relative to a target gain profile (e.g., a flat amplification profile). The control unit 4 according to the present invention is discussed in more detail later.

The amplifier fiber 2 may be a special fiber suitable for Raman amplification, such as a fiber having a non-linear index of refraction "n2" of 3.5 E-20 $m^2$/W or more. The amplifier fiber 2 may also be an extension of the input fiber 12. Further, a reverse dispersion fiber (RDF) having a dispersion of less than −20 ps/nm/km may be connected to a single mode fiber (SMF) so the amplifier fiber 2 can also function as a transmission line. Generally, because the RDF has a dispersion of less than −20 ps/nm/km, a RDF which has a length substantially the same as or two times greater than a length of the SMF may be used. In such a case, the Raman amplifier is configured so the light pumped into the optical fiber is propagated from the RDF toward the SMF. Further, the amplifier fiber 2 may be connected to and inserted into a transmission fiber (not shown) to which the optical signal is transmitted.

Figure 4:
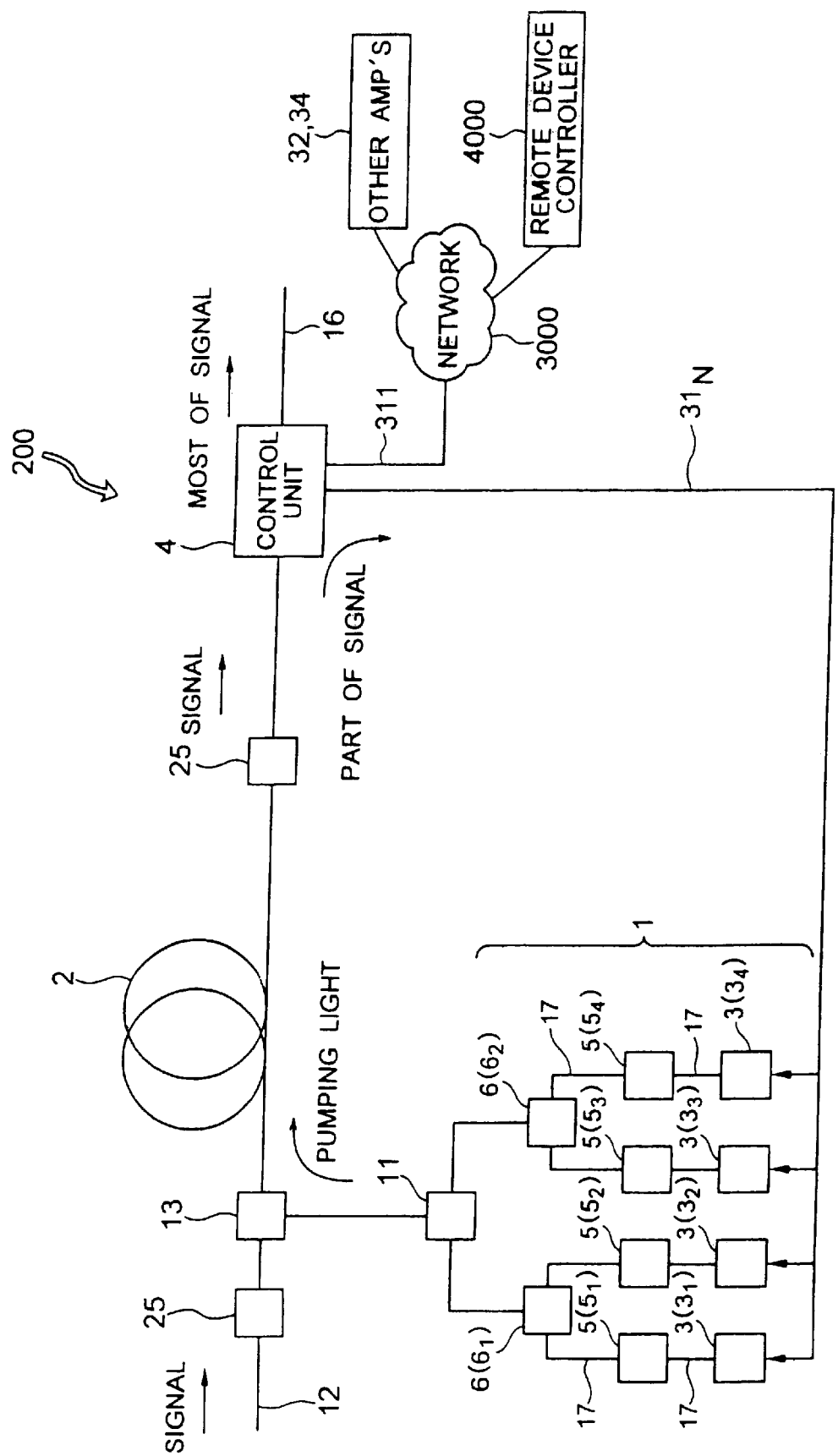
FIG. 4 is a schematic of another Raman amplifier according to another embodiment the present invention.
Figure 5:
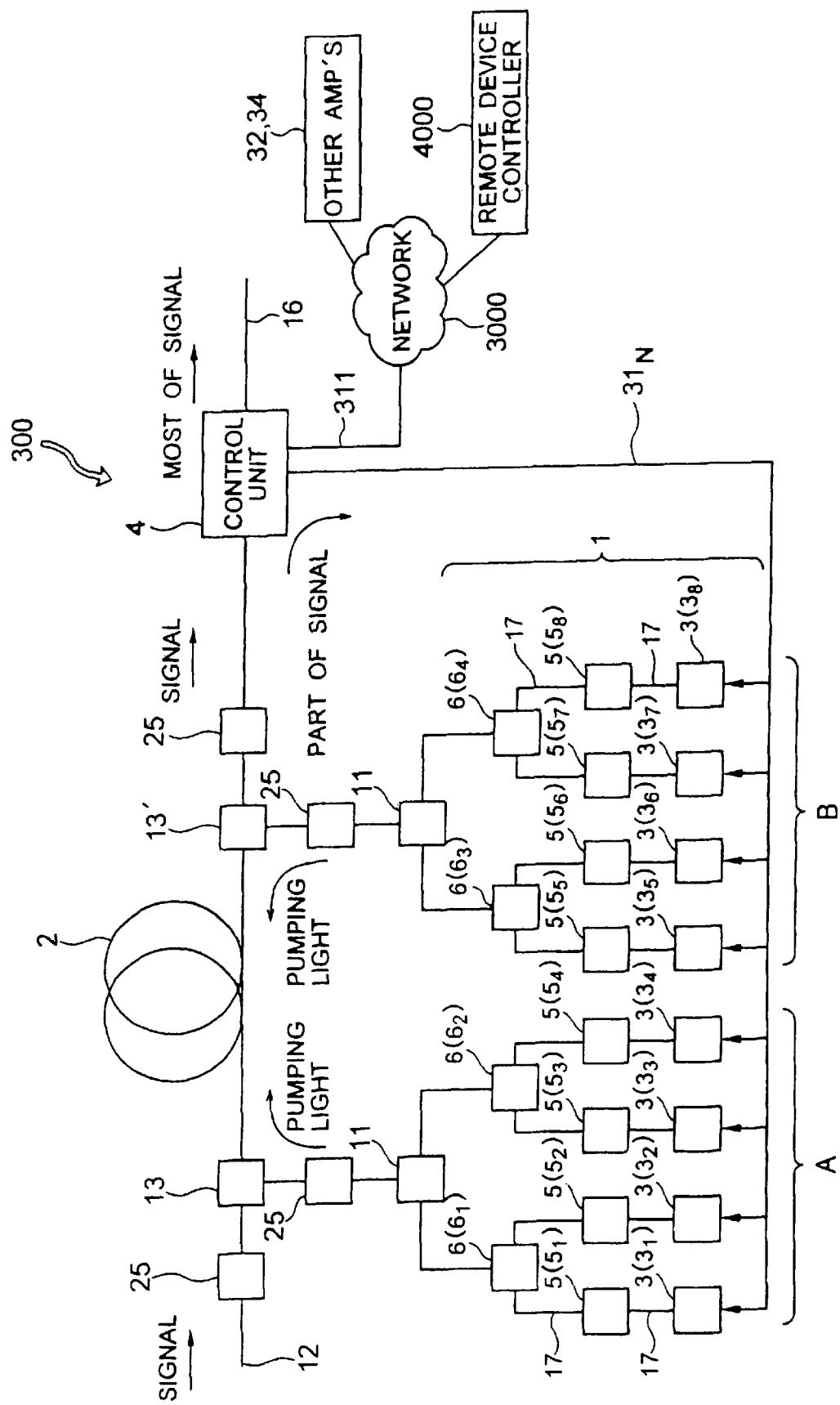
FIG. 5 is a schematic of yet another Raman amplifier embodiment according to the present invention.

FIGS. 4 and 5 illustrate other embodiments of Raman amplifiers according to the present invention. In particular, FIG. 4 illustrates a Raman amplifier 200 in which the WDM coupler 13 is provided at an input end of the amplifier fiber 2, and the light output from the light pumping source 1 is pumped into the amplifier fiber 2 via the WDM coupler 13. In this arrangement, noise introduced into the amplified optical signal is less problematic than noise introduced into the amplified optical signal in the Raman amplifier shown in FIG. 3 because the Raman amplification occurs before the signal is attenuated. In addition, FIG. 5 is another example of a Raman amplifier 300 in which light output from two groups of semiconductor lasers A and B included in the pumping device 1 are propagated in two different directions through the amplifier fiber 2. As shown, WDM couplers 13 and 13' are respectively provided at input and output ends of the amplifier fiber 2 such that light launched into the WDM coupler 13' is propagated toward the output end of the amplifier fiber 2 and light launched into the WDM coupler 13 is propagated toward the input end of the amplifier fiber 2. In addition, the pumping device 1 in FIG. 5 includes four pumps (i.e., two pumps each having a pair of lasers in group A and two pumps each having a pair of lasers in group B).

In FIG. 4, the central wavelengths of the semiconductor lasers $3_1$ and $3_2$ included in the first group A of the pumping device 1 and the central wavelengths of the semiconductor lasers $3_5$ and $3_6$ included in the second group B are the same. In addition, the central wavelengths of the semiconductor lasers $3_3$ and $3_4$ included in the first group A and the central wavelengths of the semiconductor lasers $3_7$ and $3_8$ included in the second group B are the same. Further, fiber gratings $5_1$–$5_8$ are respectively matched with the central wavelengths of the semiconductor lasers 3.

In the exemplary embodiment shown in FIG. 5, when the central wavelengths of the semiconductor lasers $3_1$ and $3_2$ included in the first group A are $\lambda_1$, the central wavelengths of the semiconductor lasers $3_3$ and $3_4$ included in the first group A are $\lambda_3$, the central wavelengths of the semiconductor lasers $3_5$ and $3_6$ included in the second group B are $\lambda_2$, and the central wavelengths of the semiconductor lasers $3_7$ and $3_8$ included in the second group B are $\lambda_4$, the wavelengths $\lambda_1, \lambda_2, \lambda_3$ and $\lambda_4$ may be adjacent wavelengths. That is, there are four pumps which produce light having central wavelengths of $\lambda_1, \lambda_2, \lambda_3$ and $\lambda_4$, respectively. Further, the interval between central wavelengths of adjacent pumps is greater than 6 nm and smaller than 35 nm, and the difference between the maximum central wavelength $\lambda_4$ and the minimum central wavelength $\lambda_1$ is smaller than 100 nm. With this arrangement, a very high quality (and thus more expensive) wavelength combiner is not required.

CONTROL UNIT
General Functional Description

The control unit 4 performs the function of controlling the operations of establishing a target amplification performance to be achieved by the Raman amplifier, and then monitoring the signal output from the Raman amplifier to ensure the amplifier is actually operating within a predetermined tolerance of the target amplification performance. The control unit 4 will initially identify and set the target amplification performance, but it is also configured to make adjustments to the target amplification profile if it is provided with additional information about the system-level performance that has not yet been taken into account when establishing the target amplification performance. For example, suppose a failure in a pump laser at an adjacent downstream amplifier is reported to the control unit 4. The control unit 4 may then help compensate for this failure, which will manifest itself in a less than ideal amount of amplification in a portion of the amplification by increasing the amplification profile for that portion of the amplification band in the Raman amplifier 100.

A first functional feature of the control unit 4 is that it is configured to obtain a target Raman amplification performance and then monitor an actual output (Raman amplified) WDM signal to determine if the monitored amplification performance is within a predetermined tolerance of the target performance. The control unit 4 performs this monitoring operation by identifying deviations between the actual performance and the target performance. If the control unit 4 determines that the monitored amplification performance is within the allowable tolerance of the target amplification performance throughout the amplification band, the control unit 4 does not alter the conditions for the pumping device and continues monitoring the actual amplification performance. However, if the control unit 4 determines that the actual amplification is not within the allowable tolerance of the target amplification performance, the control unit may increase or decrease pumping power into amplifier fiber by controlling output powers of the pumps (or groups of pumps) so as to maintain the target amplification performance.

Another feature of the control unit 4 is that it is configured to change the target performance as well as the conditions for a pumping device to produce a new target performance for Raman amplification. For example, a particular communication band may need to be expanded to accommodate additional channels on the network. To accommodate this change in system requirements, the control unit 4 may be configured to set another set of conditions for the pumping device, such as turning on or off some of the pump lasers so as to achieve another target performance for increasing a communication bandwidth. The new conditions for the pumping device may be added to the existing conditions while initial conditions may be set when initial target performance is provided.

A third feature of the present invention is that the control unit 4 is networked with other amplifiers in a cascaded arrangement, such that by coordinating amplification profiles between the cascaded amplifiers the overall system performance remains optimum for WDM signals, despite the fact that the communication conditions may have changed in some way from an original system design. For example, by coordinating the amplification profiles between adjacent amplifiers, the failure of selected pumps may be compensated for by adjusting the amplification profile of one or more adjacent amplifiers. For example, the control unit 4 may adjust the amplification performances of pre-cascaded and/or post-cascaded Raman amplifiers to offset any problem that arises with a Raman amplifier connected therebetween. Other conditions may be compensated for as well, such as the use of a different fiber, with different attenuation characteristics than the original fiber or the insertion of another network component (e.g., switch or amplifier) between two Raman amplifiers.

The control unit 4 may be configured to perform all three aspects in addition to initially setting the target amplification performance. The processes of initially setting, maintaining, and changing the target amplification will be discussed below. However, before providing these process descriptions, a description of the components employed in the control unit 4 will first be described with reference to FIGS. 6–10.

CONTROL UNIT

Component Description

Figure 6:
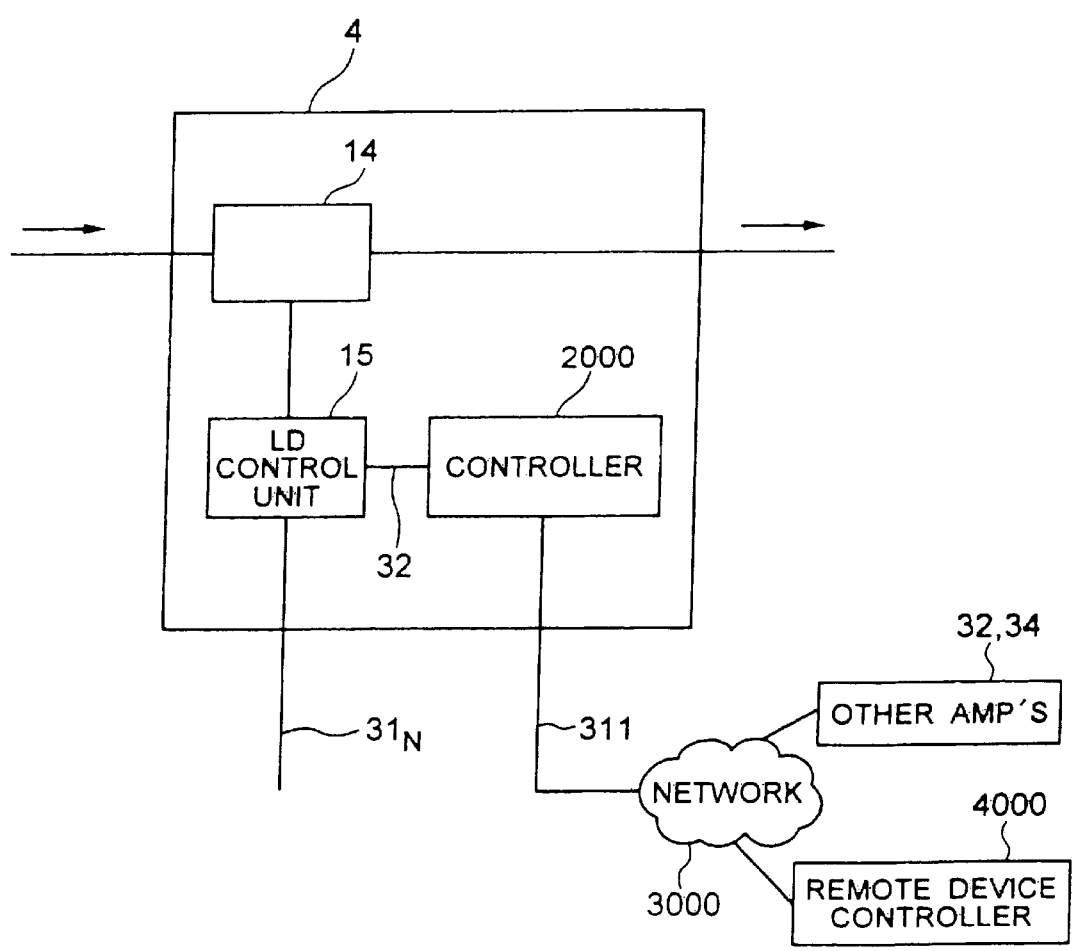
FIG. 6 is a schematic of a control unit included in the Raman amplifier according to the present invention.

As shown in FIG. 6, the control unit 4 includes a tap coupler 14 that is connected to a laser diode (LD) control unit 15 via an optical fiber that carries a fraction of the WDM optical signal to an LD control unit 15. While the tap coupler 14 is shown to be housed within the control unit 4, it may also be an external component that connects to the control unit 4. Likewise, separate components of the LD control unit 4 may be discrete components that need not be housed within a common control unit enclosure.

The LD control unit 15 de-multiplexes the WDM monitor signal (i.e., the portion of the amplified WDM signal provided by the tap coupler 14) and then converts the demultiplexed signals into electrical signals. Samples of the electrical signals are provided to the controller 2000 for performing the amplification control processes (discussed in detail with respect to FIG. 11, for example). Since a function performed by the control unit 4 is to monitor the actual amplification performance of the Raman amplifier, the LD control unit 15 samples the electrical signals and compares this series of samples against the target amplification performance. The sampling process performed by the LD control unit 15 and controller 2000 does not necessarily have to be performed on a WDM channel-by-WDM channel basis. Rather, the LD control unit 15 and controller 2000 may perform the control processes with a greater or a lesser spectral resolution than 1 sample set per WDM channel. This discussion of spectral resolution and sampling will be addressed in more detail below. As seen, the LD Control unit provides output control lines 31N for controlling the optical output levels of each pump laser 3 (see, e.g., FIG. 3). The LD control unit 15 also exchanges sample data and control information with the controller 2000. The controller 2000 is configured to connect to a data communication network 3000, such as the Internet for exchanging data and control information with a remote device controller 4000 and other amplifiers 32, 34.

Figure 7:
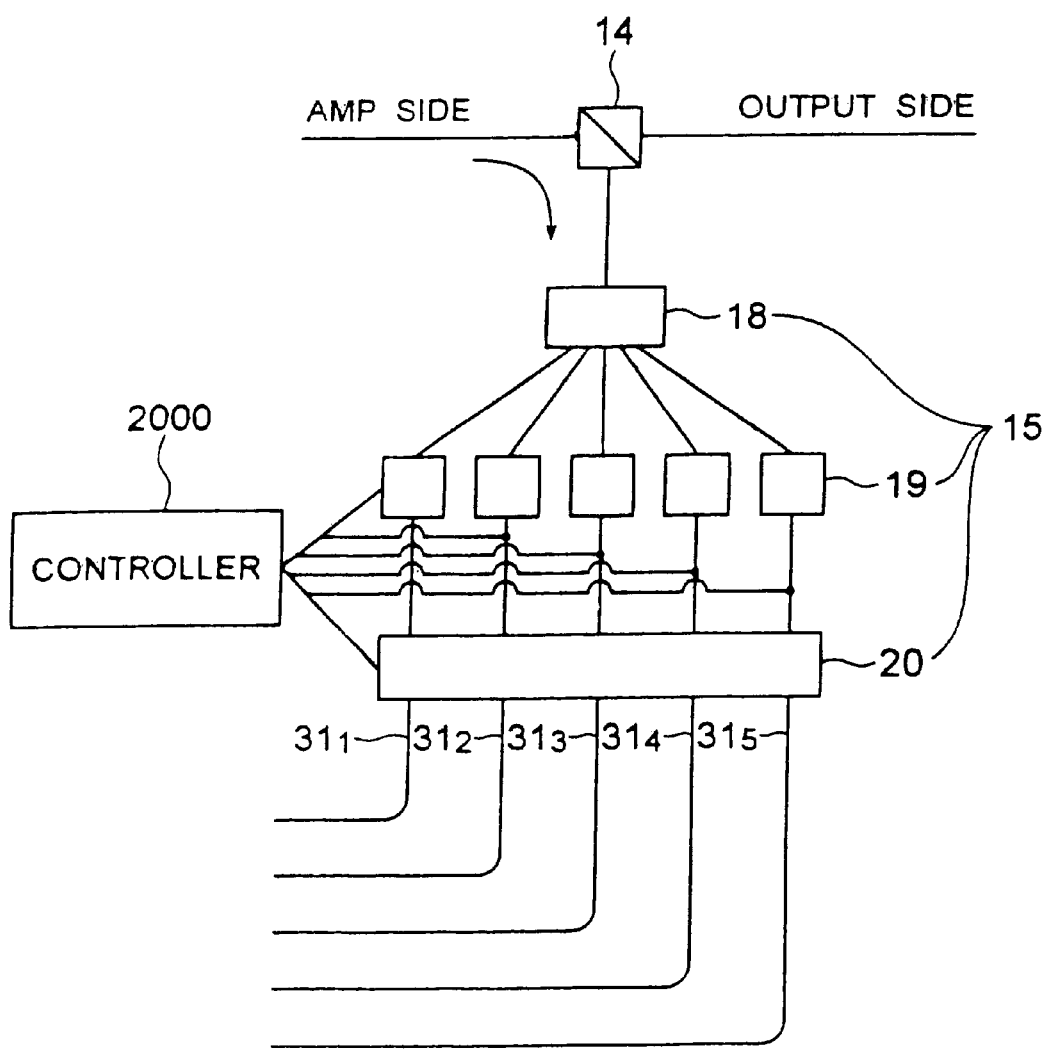
FIG. 7 is a schematic illustrating components included in the control unit according to the present invention.
Figure 8:
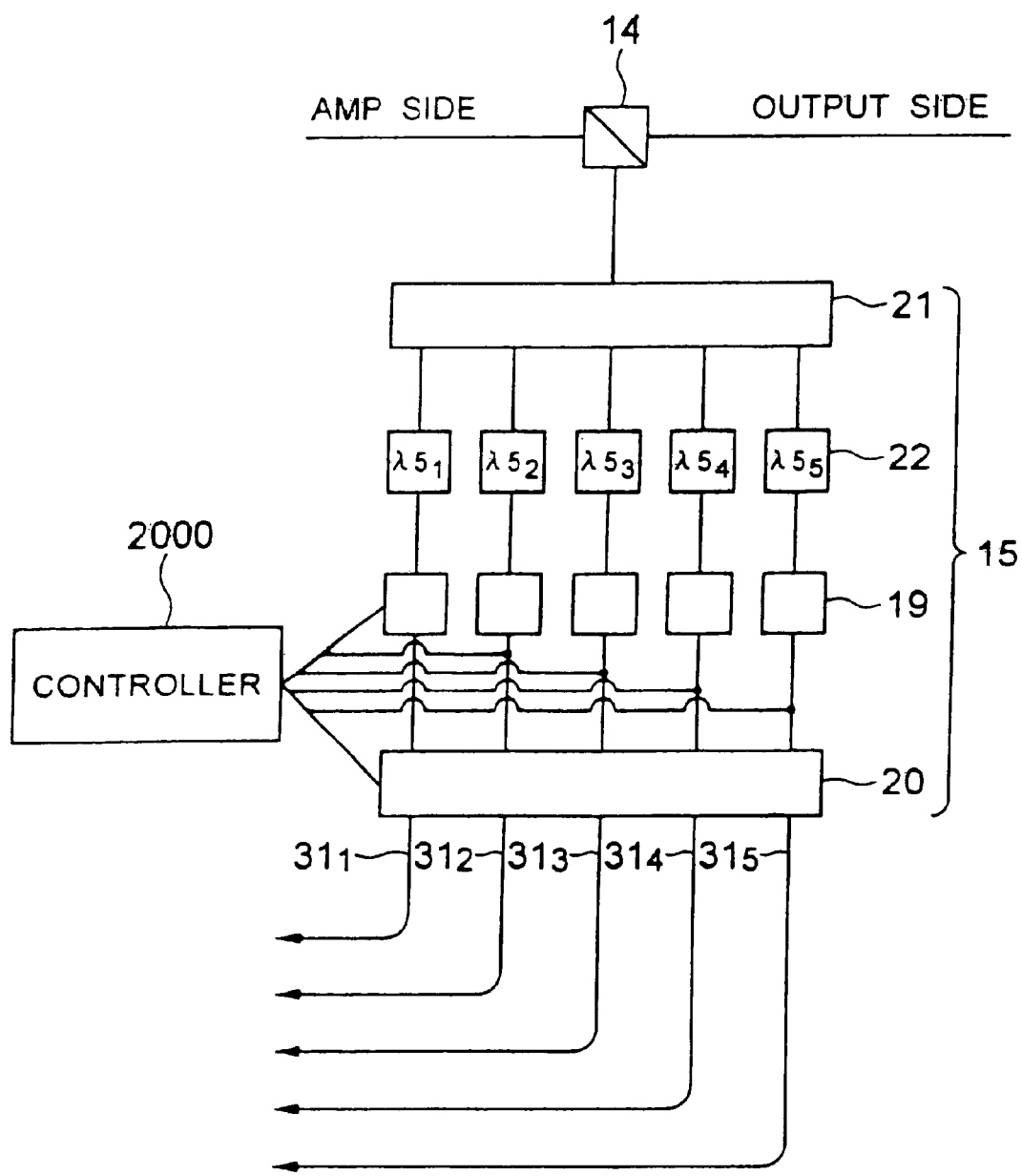
FIG. 8 is a schematic illustrating other components included in the control unit according to the present invention.

FIGS. 7 and 8 provide more detailed descriptions of subcomponents of the LD control signal unit 15. In FIG. 7, the LD control signal unit includes a wavelength de-multiplexer 18, optical/electrical converting mechanisms 19 (e.g., photo-diodes) and an LD control circuit 20 connected in series. The wavelength de-multiplexer 18 separates the monitored WDM optical signal into a plurality of optical sample-signals, each having a different central wavelength. The de-multiplexed optical sample may, for example, correspond to channels of the WDM signal, as discussed above. Once again, the function performed by the de-multiplexer 18 is to isolate separate spectral components of the WDM signal that is being amplified by the Raman amplifier 100. For basic control schemes, the de-multiplexer 18 may only provide two sample-signals, perhaps one at shorter wavelengths within the amplification band and another at longer wavelengths in the amplification band. A limitation, however, with having too few sample-signals is that the resolution of the sampled signal is not sufficient to observe sub-bands where the gain profile of the Raman amplifier is not within a predetermined tolerance (e.g., 1 dB) of the target amplification performance. On the other hand, having too many sample-signals unnecessarily increases the expense and complexity of the processing resources in the control unit 4. Thus, as a practical guideline, the number of sample-signals to be developed is set to correspond with either a number of WDM channels to be handled by the Raman amplifier, or a number of pump lasers employed in the Raman amplifier. Thus, typical numbers of sample-signals developed by the de-multiplexer for dense WDM signals will range between about 10 to 100. However, smaller numbers, such as 2 mentioned above, or up to, or exceeding, 1000 are possible as well.

The optical/electrical converting mechanisms 19 convert the de-multiplexed optical sample signals into electrical signals. Output currents provided by the converting mechanisms 19 vary, depending on the respective magnitudes of the de-multiplexed sample-signals. The controller 2000 receives the electrical currents via a bus 32, where the controller 2000 then samples the respective currents to create a digital rendition of the sample-signals. Alternatively, the controller 2000 receives the digital rendition of the sample-signals from the LD control circuit 20 which digitizes the sample-signals. Likewise, the converting mechanisms 19 provide a digitized output.

The LD control circuit 20 is shown to be a separate controller from controller 2000, but the two can be incorporated into a single processor-based controller. As shown in FIG. 7, however, the controller 2000 is configured to implement a digital signal processor based-embedded controller, while the main analog processing is performed in the LD control circuit 20. For example, in one embodiment, the controller 2000 holds in memory appropriate drive current values for the separate pump lasers, based on the certain target amplification performance to be achieved. Once the drive current values are identified, the controller 2000 then informs the LD control circuit 20 (either via a digital message or separate analog signals), so the LD control circuit 20 may control laser drive circuits contained therein to produce the desired pump laser drive currents. However, in another embodiment, the LD control circuit 20 may operate digitally and may itself hold in memory the drive current values that are associated with achieving the target amplification performance. In this case, the LD control circuit 20 dispatches control signals to semiconductor lasers 3 (see, e.g., FIG. 4), which contain their own drive circuits that respond to the control signals or are interconnected with separate drive circuits.

Figure 9:
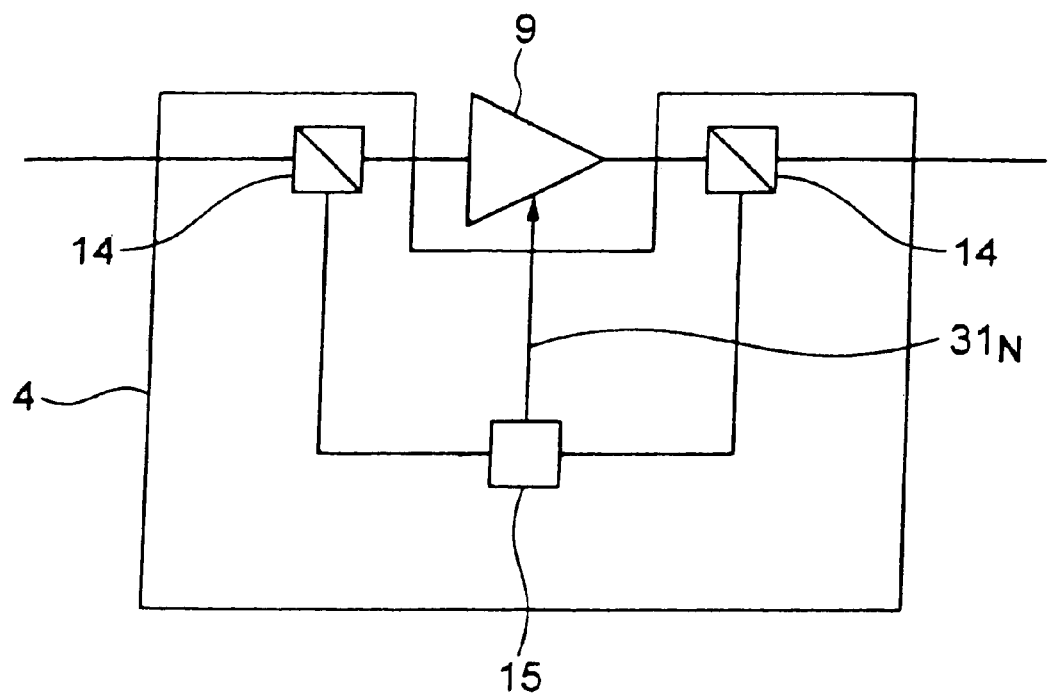
FIG. 9 is a schematic which illustrates controlling an output power from a Raman amplifier by monitoring optical signals input to and output from the Raman amplifier.

FIG. 8 illustrates another exemplary embodiment of the control unit 4. Unlike the embodiment of FIG. 7, the embodiment of FIG. 8 includes a power splitter 21 and bandpass filters 22. The power splitter 21 splits the monitored WDM optical signal branched by the tap coupler 14 into a plurality of sample-signals. For example, the power splitter 21 may be configured to divide the branched WDM signal into a corresponding number of channels of the WDM signal. The bandpass filters 22 have different central wavelengths and fixed-width passbands that only permit that portion of the respective sample-signals having optical energy within the specific passband to pass therethrough. The optical/electrical converters 19, controller 2000 and LD control circuit 20 are like that described above in reference to FIG. 7. It should be noted that although the discussion has been primarily focused on sampling the amplified output from the Raman amplifier to perform the control operation, the control unit 4 may also sample the input signal to the Raman amplifier, as shown in FIG. 9. By directly measuring the input optical signal and the output optical signal, the control unit 4 is able to establish a direct measurement of amplifier gain, and the profile of the amplification gain. As an alternative to measuring the input level, the controller 2000 may receive a message from an upstream Raman amplifier 30 (see, e.g., FIG. 35) which describes an output level of the WDM signal as it leaves Raman amplifier 30. Since the fiber loss characteristics are generally known for the fiber that interconnects amplifier 30 with amplifier 32, the controller 2000 in amplifier 32 can calculate the apparent level of the WDM signal that is input to the Raman amplifier 32.

Figure 10:
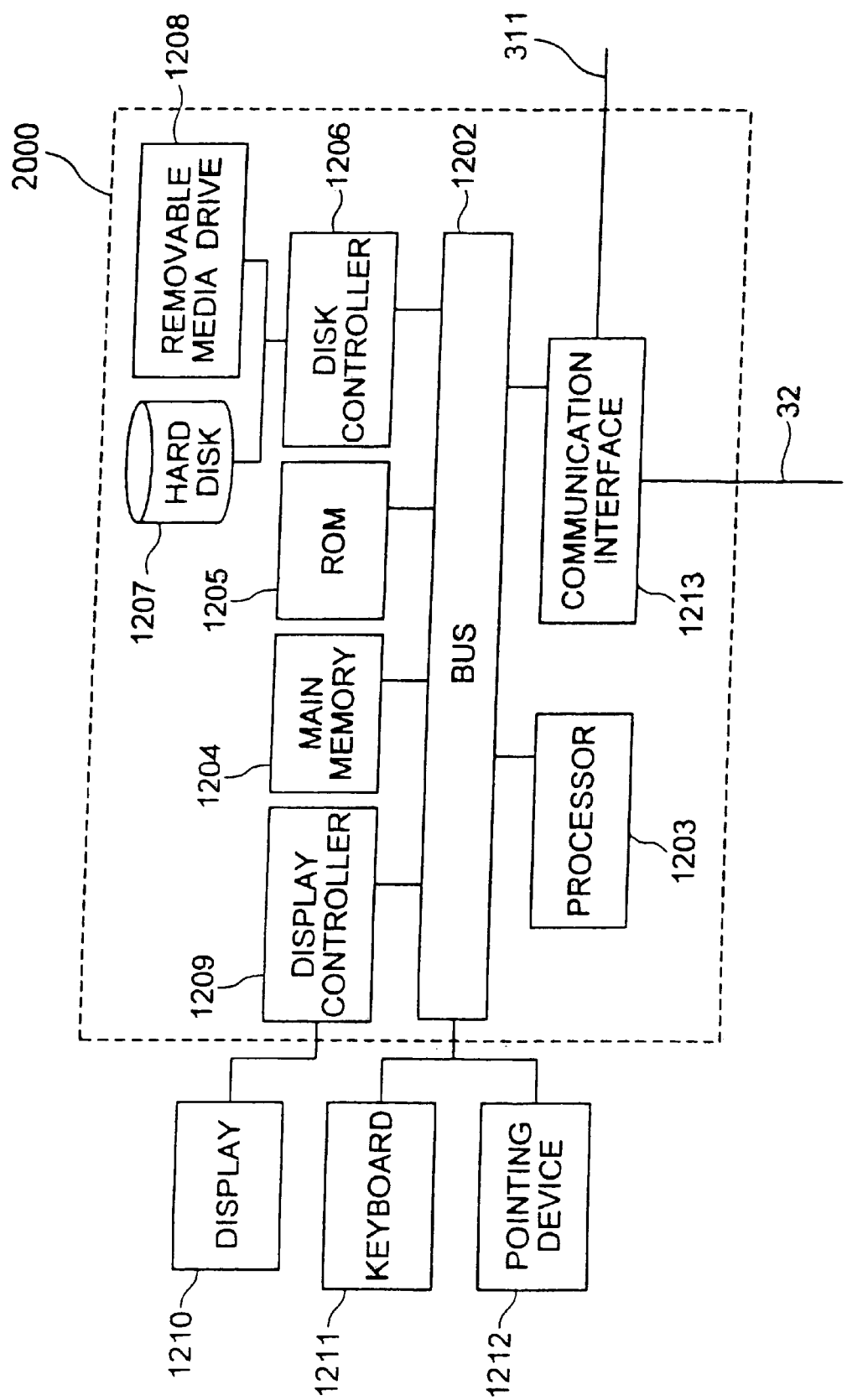
FIG. 10 is a schematic illustrating a computer system included in the control unit according to the present invention.

FIG. 10 illustrates an exemplary embodiment of the components employed in the controller 2000. The controller 2000 includes a bus 1202 that interconnects a processor 1203 with other components in the controller, as illustrated. A main memory 1204, such as a random access memory (RAM) or other storage device (e.g., dynamic RAM (DRAM), static RAM (SRAM), and synchronous DRAM (SDRAM)), is coupled to the bus 1202 for storing information and instructions to be executed by the processor 1203. In addition, the main memory 1204 may be used for storing temporary variables or other intermediate information during the execution of instructions by the processor 1203. A read only memory (ROM) 1205 or other static storage device (e.g., programmable ROM (PROM), erasable PROM (EPROM), and electrically erasable PROM (EEPROM)) is also coupled to the bus 1202 for storing static information and instructions for the processor 1203.

The controller 2000 also includes an optional disk controller 1206 coupled to the bus 1202 to control one or more optional storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the LD control circuit 20 using an appropriate device interface (e.g., small computer system interface (SCSI), integrated device electronics (IDE), enhanced-IDE (E-IDE), direct memory access (DMA), or ultra-DMA). The hard drive 1207 and removable media drive 1208, when used, hold record data for subsequent retrieval by a technician when servicing the Raman amplifier, or remotely retrievable by the remote device controller 4000.

The controller 2000 optionally includes a display controller 1209 coupled to the bus 1202 to control an optional display 1210, such as a cathode ray tube (CRT), for displaying information to a network engineer, or technician who is servicing the Raman amplifier. The LD control circuit 20 includes interfaces to accommodate input devices, such as a keyboard 1211 and a pointing device 1212, for interacting with the network engineer and providing information to the processor 1203. The pointing device 1212, for example, may be a mouse, a trackball, or a pointing stick for communicating direction information and command selections to the processor 1203 and for controlling cursor movement on the display 1210. In addition, a printer port and an optional printer may be included to provide printed listings of the data structures/information, or any other data stored and/or generated by the controller 2000.

The controller 2000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)) to perform all, or a portion, of the logic operations.

The controller 2000 performs a portion or all of the processing steps of the control process by the processor 1203 executing one or more sequences of one or more instructions contained in a memory, such as the main memory 1204. Such instructions may be read into the main memory 1204 from another computer readable medium, such as a hard disk 1207 or a removable media drive 1208 or downloaded from another computer, such as the remote device controller 4000. One or more processors in a multi-processing arrangement may also be employed to execute the sequences of instructions contained in main memory 1204. In alternative embodiments, hard-wired circuitry may be used in place of or in combination with software instructions. Thus, the embodiments are not limited to any specific combination of hardware circuitry and software.

As stated above, the controller 2000 includes at least one computer readable medium or memory for holding instructions programmed according to the teachings of the present invention and for containing data structures, tables, records, or other data described herein. Examples of computer readable media are compact discs hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the computer readable instructions include software for operating the controller 2000, for driving a pumping device and for enabling the controller 2000 to interact with a human user. Such software may include, but is not limited to, device drivers, operating systems, development tools, and applications software. Such computer readable media further includes the computer program product of the present invention for performing all or a portion (if processing is distributed) of the processing performed in implementing the control aspects of the present invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that may provide instructions to the processor 1203 for execution. A computer readable medium may take many forms, including, but not limited to, non-volatile media, volatile media, and transmission media. Non-volatile media includes, for example, optical disks, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media may take the form of acoustic or light waves, such as those generated during radio wave, optical and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the controller 2000 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The controller 2000 also includes a communication interface 1213 coupled to the bus 1202. The communication interface 1213 provides a communication link with the LD control unit 20 via the bus 32 and a communication link with the network 3000 via the link 311. The communication interface 1213 may also be configured to provide an Internet connection so a network engineer can control the LD control circuit 20 at a remote location (e.g., remote device controller 4000 (FIG. 4), which itself may have an architecture like that shown in FIG. 10. For example, the communication interface 1213 may be a network interface card to attach to any packet switched LAN, or other network 3000 (FIG. 4). As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information to and from remote devices.

Control Process

Figure 11:
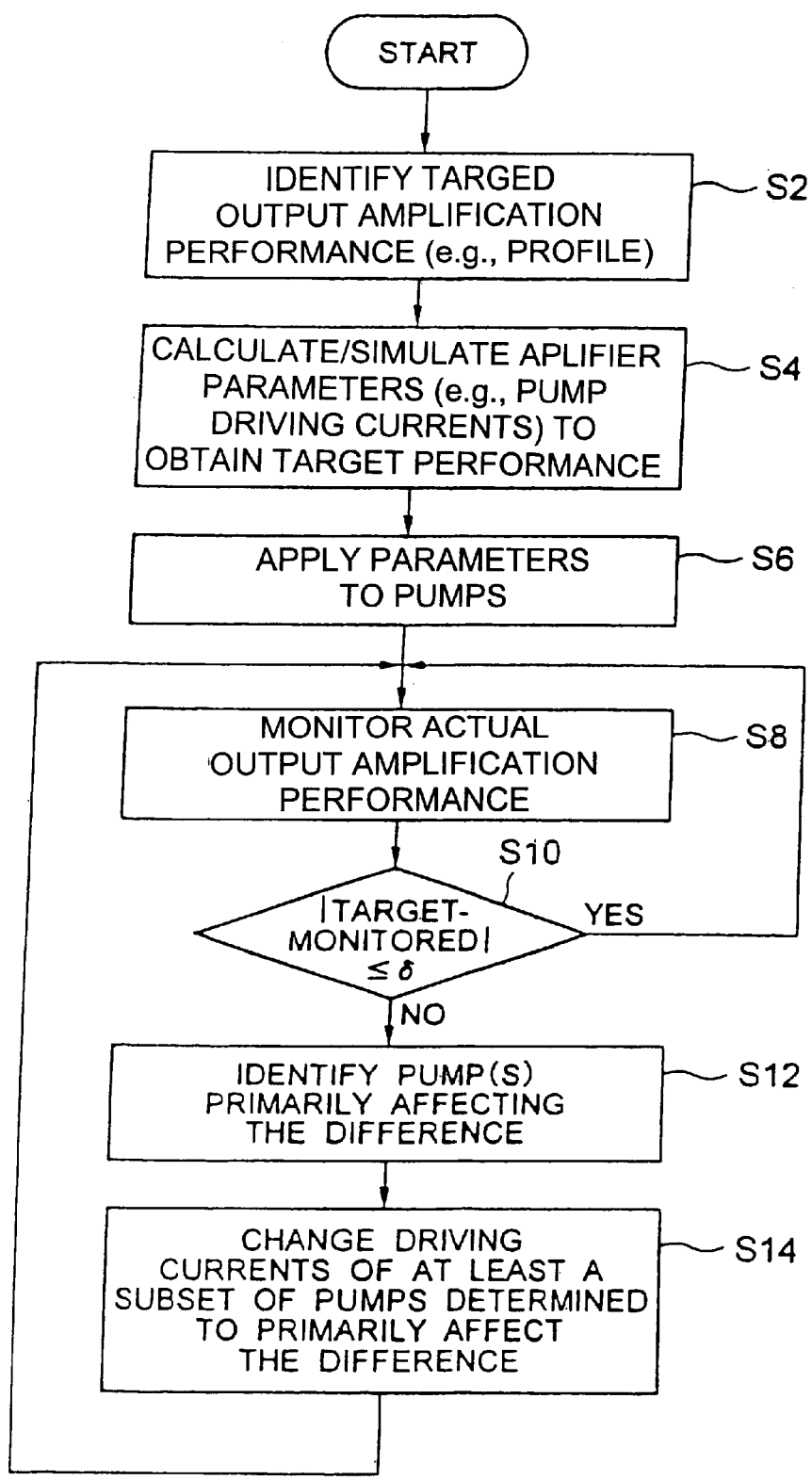
FIG. 11 is a flowchart illustrating a control operation of the Raman amplifier according to the present invention.

FIG. 11 is a flowchart illustrating an operational process performed by the control unit 4 (FIG. 10). This control process is for (1) establishing a predetermined target amplification performance (e.g., an amplification profile or output signal power profile over a predetermined amplification bandwidth), (2) monitoring whether an actual amplification performance is within a predetermined tolerance of the target amplification performance, and (3) taking corrective action when the actual amplification performance is not within the predetermined tolerance. In particular, steps S2, S4 and S6 respectively identify the target output amplification performance, determine the amplifier parameters (e.g., pump laser drive currents) that are used to achieve the target output amplification performance and apply the parameters to achieve the target performance. Steps S8, S10, S12, and S14 are directed to ensuring that the actual amplification performance stays within a predetermined tolerance of the target amplification profile and/or at least adopts an acceptable profile shape (such as a flat or tilted profile slope).

Identifying Target Output Amplification Performance (step S2)

The process in FIG. 11 begins in step S2 where an input WDM optical signal characteristic (A) (such as a mean optical signal level measured in sub-bands of the amplification band) and an (initial) target amplification performance (B) are provided to, and/or generated by, the control unit 4 and stored in the memory 1204 (FIG. 10). The target amplification performance may be represented by a series of values indicative of a predetermined gain profile that is set by a system operator to achieve a desired system performance. Since gain relates to the level of an output signal relative to an input signal, the input signal level is identified either directly or indirectly, as will be discussed below.

Moreover, if the system operator intends to have the Raman amplifier operate with a predetermined gain profile, the input WDM optical signal characteristic (A) is first determined in one of several ways, discussed below.

The WDM signal level may be measured directly at an input to the Raman amplifier. In this case, the control unit 4 can verify that the target gain is achieved by comparing the target gain (stored in memory after being input via line 311, FIG. 10) to a ratio of a measured output signal and the level of the optical signal applied to the amplifier. As an alternative to a direct measurement of the input signal level, the signal level may be obtained from an output signal level reported to the Raman amplifier (e.g., amplifier 32 in FIG. 35) from a downstream Raman amplifier (e.g., amplifier 30 in FIG. 35), less an estimated, or measured, amount of attenuation due to fiber loss between the two Raman amplifiers. Still further, the input level may be inferred from a process employed by the control unit 4 in which a signal of known power is input to the Raman amplifier and then an amount of driving current applied to respective pump lasers to produce a predetermined output level measured at the output of the subject Raman amplifier is identified and saved in memory. Subsequently, the amount of amplification may be estimated from a change in the amount of driving current relative to the values stored in memory. This later process may be performed as an initial step during a built-in-test procedure or during a calibration operation, for example. As still a further alternative, a target output WDM optical signal characteristic (C) may be provided from an external source and stored in memory instead of the target amplification performance (B). In this case, the target amplification performance (B) is calculated from (A) and (C) and stored in the memory 1204. The target amplification performance (B) and WDM optical signal characteristics (A) may be provided, stored and read, for example, from the main memory in the control unit 4 during operational conditions.

Calculating and Simulating Amplifier Parameters (e.g. Pump Laser Driving Currents) Used to Obtain the Target Output Amplification Performance (Step S4).

After the target amplification performance, as well as associated parameters (e.g., input signal level, if the target amplification performance is implemented to be an amplifier gain) is obtained in step S2, the process then proceeds to step S4. In step S4, the amplifier parameters to achieve the target amplification performance are determined by contemporaneous calculation/simulation, or by referencing a look-up table that holds parameters that were previously determined and stored for various conditions. In the present discussion, the amplifier parameters will be described as driving currents that are produced by pump laser driving circuits (positioned either in the control unit 4 or adjacent to the pump lasers 3). However, the amplification parameters may be attenuation amounts applied by optical attenuators (not shown), which attenuate optical output of the pump lasers that are driven at fixed driving currents (e.g., $I_{max}$).

Figure 13:
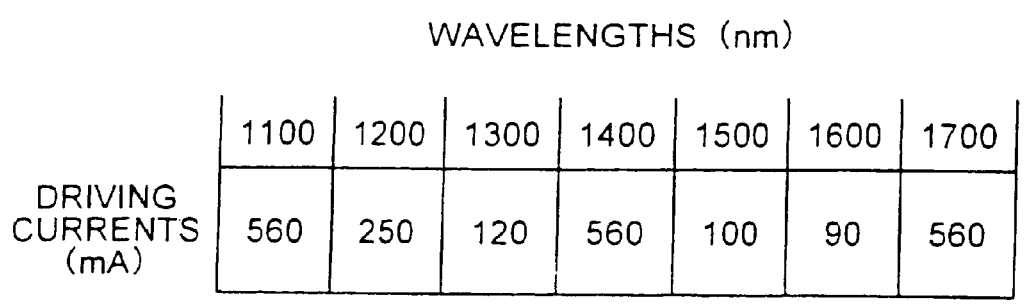
FIG. 13 is a fiber loss data table used by the control unit according to the present invention.

While the present discussion has focused on associating pump laser driving currents with a target amplification performance, there are additional operational conditions that the control unit 4 may consider, such as internal losses inherent in the optical signal measurement operation, fiber losses, pump-to-pump interaction or aging of the pump lasers. To compensate for these additional conditions, such as fiber loss (attenuation), sets of driving currents are pre-set and stored in memory. The sets of driving currents correspond with various gain profiles that are available for selection so as to compensate for the fiber loss, etc. Selecting a target performance that accounts for the additional conditions is similar to "pre-emphasis", or "post-emphasis" in a communications system, where "post-emphasis" applies in the context of applying the Raman amplification upstream of the Raman amplifier. In either case, the adjusted driving currents are collected as values in a table, an example of which is shown in FIG. 13. These values may be retrieved by the control unit 4 from memory and used to control the driving circuits required to compensate for the wavelength dependent fiber loss characteristic.

Figure 12:
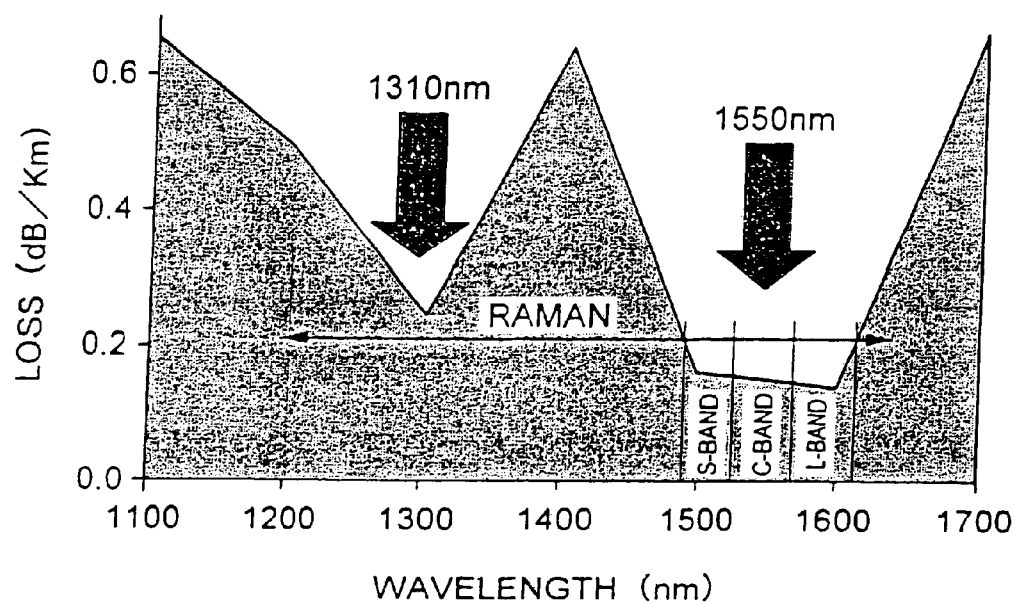
FIG. 12 is a graph illustrating a wavelength-dependency characteristic of fiber loss in an optical fiber.

By way of example as shown in the Nov. 28, 2000 publication "Photonics" by CIBC World Markets, FIG. 12 shows that it is known that an amount of attenuation in an optical fiber at 1400 nm is much greater than at 1500 nm. The conventional approach for dealing with this difference in attenuation is to simply use the part of the spectrum that has minimal attenuation. The present inventors take a different approach by employing an amplification profile that compensates for the non-uniform attenuation characteristics in the transmission band. As seen in FIG. 13, the main memory 1204 holds a greater driving current (560 mA) for the pump laser having a peak Raman gain at 1400 nm, than the driving current (100 mA) for the pump having a peak Raman gain at 1500 nm, where the fiber loss is much less. Thus, by using a table such as that shown in FIG. 13, the driving currents can be determined so as to achieve the target amplification performance. Other parameters that affect the target profile can also be stored in a data table in the memory of the LD control processor 2000.

Example of Simulation Process to Provide Target Amplification Performance

There are simulation programs currently available which can initially calculate the necessary driving currents to achieve the desired output profile. For example, the evolution of WDM pumps and signals may be expressed by the following equations:

$$\frac{dP_\nu^\pm}{dz} = -\alpha_\nu P_\nu^\pm + \varepsilon_\nu P_\nu^\mp + P_\nu^\pm \sum_{\mu > \nu} \frac{g_{\mu\nu}}{A_\mu}(P_\mu^+ + P_\mu^-) + \quad (1)$$

$$2h\nu \sum_{\mu > \nu} \frac{g_{\mu\nu}}{A_\mu}(P_\mu^+ + P_\mu^-)\left[1 + \frac{1}{\exp\left[\frac{h(\mu-\nu)}{kT}\right] - 1}\right] -$$

$$P_\nu^\pm \sum_{\mu < \nu} \frac{\nu}{\mu} \frac{g_{\nu\mu}}{A_\nu}(P_\mu^+ + P_\mu^-) -$$

$$4h\nu P_\nu^\pm \sum_{\mu < \nu} \frac{g_{\nu\mu}}{A_\nu}\left[1 + \frac{1}{\exp\left[\frac{h(\nu-\mu)}{kT}\right] - 1}\right]$$

where subscripts $\mu$ and $\nu$ denote optical frequencies, superscripts "+" and "−" denote forward- and backward-propagating waves, respectively, $P_\nu$ is optical power around $\nu$, which is the product of power spectral density at $\nu$ and infinitesimal bandwidth $\delta\nu$, $\alpha_\nu$ is attenuation coefficient, $\epsilon_\nu$ is Rayleigh backscattering coefficient, $A_\nu$ is effective area of optical fiber at frequency $\nu$, $g_{\mu\nu}$ is a Raman gain parameter at frequency $\nu$ due to the pump at frequency $\mu$, h is Planck's constant, k is Boltzmann constant, and T is temperature. This equation is expected to include almost all conceivable effects observable in real systems, such as pump-to-pump and signal-to-signal Raman interactions, pump depletions due to Raman energy transfer, Rayleigh backscattering, fiber loss, spontaneous emission noise and blackbody radiation noise. The main memory 1204 holds computer readable instructions that have equation (1) encoded therein. These instructions are executed by the processor 1203 so as to simulate a target amplification performance from an aggregation amplification effects provided by the different pump lasers.

Example of How to Set Target Amplification Performance

Figure 14:
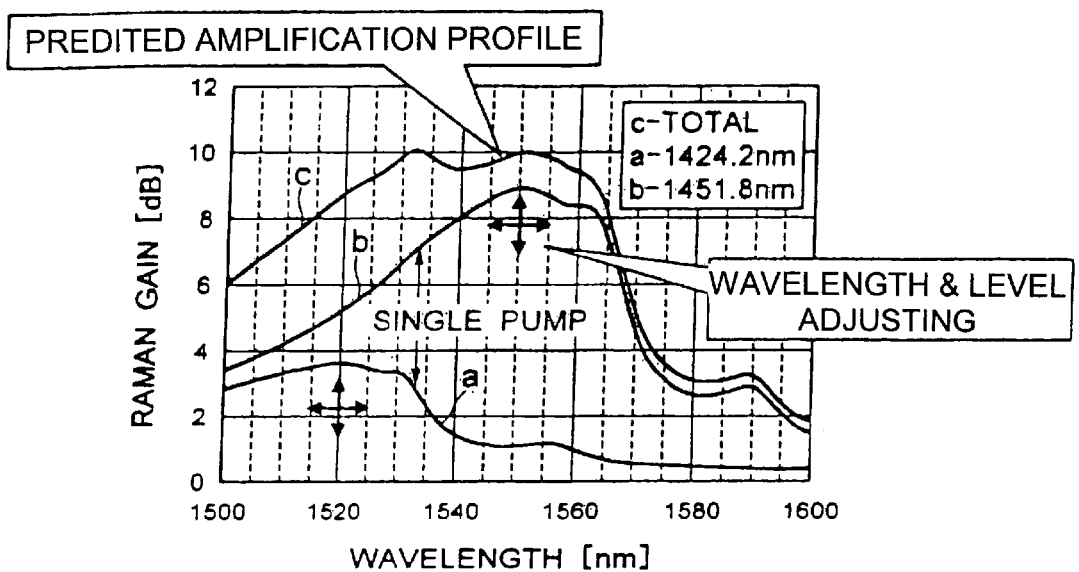
FIG. 14 is a graph illustrating a superposition principle for predicting a Raman amplification profile according to the present invention.
Figure 15A:
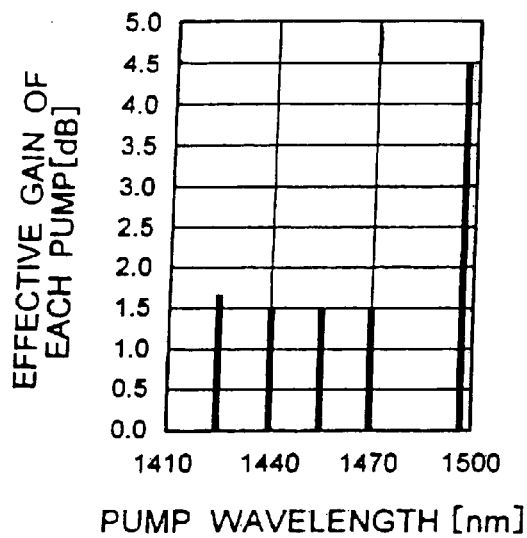
FIGS. 15A and 15B are graphs illustrating a design of a pumping device based on the superposition principle according to the present invention.
Figure 15B:
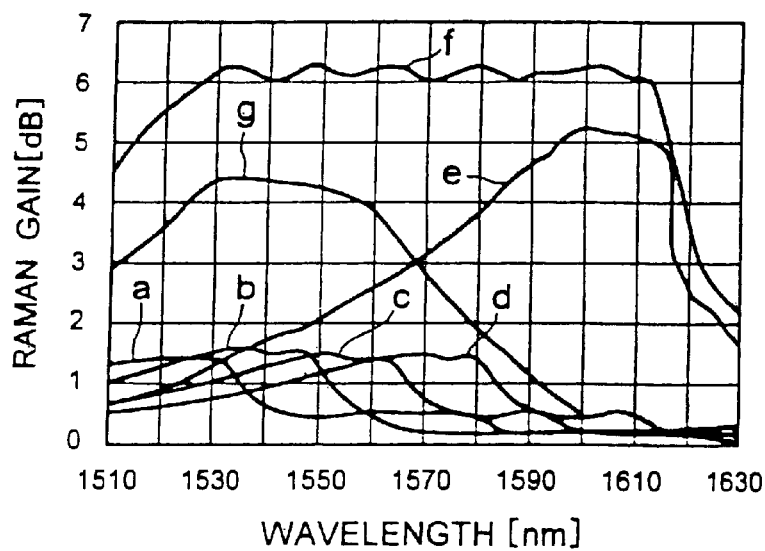
Figure 16:
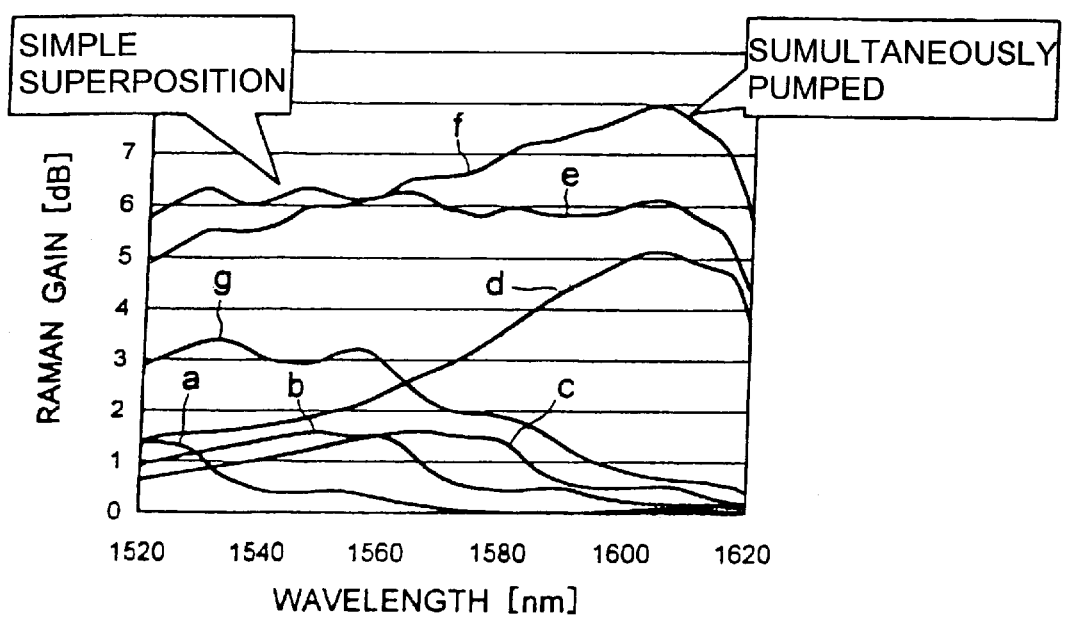
FIG. 16 is a graph illustrating a predicted Raman amplification profile based on the superposition principle and an actual Raman amplification profile.

FIGS. 14, 15A and 15B will now be referred to when explaining an exemplary process of how to set a target amplification performance (step S4 in FIG. 11). FIGS. 14, 15A, 15B and 16 illustrate a superposition principle that is used in one embodiment according to the present invention to determine the appropriate conditions (e.g., center wavelength of pumps, pump output powers) needed to obtain a flat (or arbitrarily shaped) Raman amplification performance.

FIG. 14 is a graph showing individual and composite Raman gain profiles versus wavelength for two pump lasers, operating at 1424.2 nm and 1451.8 nm. Since this invention applies to the spectral band shown in FIG. 12, for example, the pump lasers may be referred to as YYXX lasers (YY being in a range of 13 through 15 and XX being in a range of 00 through 99). As an example, for producing a Raman gain in the S-Band through L-band, the YYXX lasers may be referred to as 14XX pump lasers (e.g., 1400 nm to 1499 nm). The Raman amplification gain profile due to the single pump laser operating at a central wavelength of 1424.2 nm is shown as profile "a" in FIG. 14. Likewise, an amplification profile due to a single pump laser operating at a central wavelength of 1451.8 nm is shown as profile "b". The total Raman amplification profile due to the simultaneous operation of both pumps is shown as profile "c" and is determined via the superposition principle (i.e. the profiles are additive). That is, according to the superposition principle, the amplification profiles due to each of the pumps may be added to achieve a total amplification profile that corresponds to the addition of the two individual profiles.

FIGS. 15A and 15B illustrate another example of the superposition principle as applied to the present invention with regard to creating target amplification performances. As shown in FIG. 15A, four pump lasers at the shorter wavelengths (i.e., a first group) are set at a first predetermined gain level (or optical output level), and a fifth pump laser (i.e., a second group, having only one pump laser in this example, but more could be included) is set to a higher gain level. The fifth pump laser is separated in wavelength from the closest of the pump lasers in the first group by a greater wavelength interval than between that of adjacent members in the first group. Moreover, the pump lasers in the first group are set to approximately equal gain levels and are separated from one another by about 20 nm (although a range of 6 nm to 35 nm is a reasonable separate range to minimize appreciable inflection points in the gain profile). In this example, the fifth pump laser operates at a central wavelength of 1495.2 nm (29.2 nm above the closest pump laser in the first group, which operates at 1466.0 nm), and is set to impart an effective gain that is almost 3 times higher than that of each of the first group of pumps.

FIG. 15B corresponds with FIG. 15A and illustrates how the superposition principle applies to the amplification profiles produced by the pump lasers in the first group and in the second group. Amplification profiles "a", "b", "c", and "d" correspond with the pump lasers in the first group, which respectively operate at 1424.2 nm, 1437.9 nm, 1451.8 and 1466.0 nm. Profile "g" corresponds with a composite profile for the first group and profile "e" corresponds with profile provided by the pump laser in the second group, namely 1500 nm (although a plurality of pumps, such as two or three, may be used to form the second group). Note that the respective amplification peaks occur at a wavelength that is about 100 nm longer than where the source pump operates.

Target amplification gain profiles "c" (in FIG. 14) and "f" (in FIG. 15B) are generated by applying the superposition principle. The resulting shape of the predicted amplification gain profiles may be made substantially flat, as shown, or set to any arbitrary shape, by adjusting the outputs of the pump lasers, given a specific spacing of the wavelengths at which the pump lasers operate. For example, the amplification profile "f" shown in FIG. 15B may be made to tilt so as to have a negative slope throughout the amplification band by reducing the gain of the second group, namely the pump operating at the central wavelength of 1500 nm. Likewise, the profile could also be tilted to assume a negative slope by increasing the output from group 1 (i.e., gain profile "g"). Conversely, target amplification profiles "c" (FIG. 14) and "f" (FIG. 15B) could be made to have a positive slope by either reducing the output from the first group, and/or increasing the output from the second group. Gain profiles "g" and "e" (FIG. 15B), which are provided by a group of pumps, may be referred to as "element gain profiles." Since there are generally a greater number of pump lasers operating in the group(s) at the shorter wavelengths, it is possible to impart a greater number of higher order gain shape features in the element gain profile for the shorter wavelengths than for the longer wavelengths.

Setting Optical Output of Pump Lasers to Initially Establish Target Amplification Performance (S6)

After step S4 is completed, the process proceeds to step S6, where the control unit 4 may then assert control over the optical output of the pump lasers by applying the amplification parameters previously determined to the pump lasers. As an example, when the simulated amplification performance matches the target amplification performance, within a predetermined tolerance, respective drive currents for each pump laser are identified in a look-up table based on the peak amplification output level from each of the pump lasers determined in the simulation. Alternatively, or complementarily, the control unit 4 may be programmed to adjust an amount of attenuation exhibited programmable attenuators, optically coupled to each of the pump lasers, so as to control the respective optical outputs of the pump lasers, consistent with obtaining the target amplification performance. Thus, the amplifier parameters are associated with an amount of optical energy applied to the optical fiber carrying the fiber, and need not only be the driving currents applied to the pump lasers.

Monitoring and Maintaining Actual Amplification Performance (S8, S10, S12, and S14).

The transition from step S6 to step S8 in the control process of FIG. 11 is a transition from initiating an amplification performance, that is presumably reasonably close to the target amplification performance, to monitoring and adjusting the actual amplification performance to be within a predetermined tolerance band of the target amplification performance. This monitoring and adjusting portion of the control process begins in step S8, where the control unit 4 monitors the output WDM signal, and perhaps also monitors the actual input WDM signal, as discussed above with regard to FIG. 9.

Step S8 may be accomplished in a variety of ways. One way is to take several measurements across the amplification band, such as one mean power measurement per pump laser. In this scenario, there would be a one-to-one correspondence between the amplifier sub-band and each pump laser, like that shown in FIG. 7. The samples are taken by the LD control processor 20 (FIG. 7) and reported to the processor 2000 via bus 32. However, there is no restriction on the granularity with which the monitoring step is performed. The greater the resolution (i.e., number of sample points per Hz), the greater the ability to determine the degree to which the actual amplification performance matches that of the target amplification performance. However, after the resolution approaches a level that corresponds with the closest pump laser spacing (e.g., not closer than 6 nm for separate pump sources), little further benefit is achieved unless multiple laser outputs are combined so as to increase the optical output power. At the other extreme, if the resolution is restricted to only a few points, there is a limited ability to determine whether there are inflection points between sample points. Thus, having a resolution that generally corresponds with the pump spacing helps to ensure reliable conformance with the target amplification performance across the entire amplification band, while not wasting processing resources. After obtaining the sample points, the control unit 4 stores the sample points of the output WDM signal in memory 1204 (FIG. 10) for subsequent processing.

After step S8, the process proceeds to step S10, where an inquiry is made to determine if the actual (monitored) amplification performance is within a certain tolerance (γ, e.g., 0.5 dB for strict compliance, or 1 dB for less strict compliance) of the target amplification performance, throughout the amplification band. In one embodiment, this determination is made on a sample-by-sample basis, according to equation (2) below:

$$ABS[\text{target–monitored}] \leq \gamma \text{ (a certain tolerance)} \quad (2)$$

Alternatively, an average of the monitored samples may be combined to develop a mean amplification performance over a predetermined sub-band. In this case, it is possible to reduce the number of calculations required, but also permits the control unit 4 to measure for a compliance of "shape" with regard to the target amplification performance. For example, as will be discussed below, the control unit 4 may control groups of pump lasers to affect a desired amplification performance. Suppose the control of the pump lasers is handled by controlling the pump lasers as two groups. The control unit 4 can then calculate a mean output level for the shorter wavelengths (first group) and another mean output level for the longer wavelengths (second group). This allows the control unit 4 to (1) determine whether the mean amplification performance across the amplification band is within γ and (2) to determine if an adjustment needs to be made to the slope (i.e., tilt) of the total amplification performance by some amount.

Now, referring to the flowchart of FIG. 11, if the response to the inquiry in step S10 is affirmative (yes) for all sample points (or alternatively, for a predetermined number of sample points or percentage of all sample points), the process returns to step S8. However, if the response to the inquiry in step S10 is negative, the process proceeds to step S12.

In step S12, the control unit 4 compares the amount of deviation observed for each of the sample points. If there is not a consecutive pattern of deviations (e.g., adjacent samples that are both outside the predetermined tolerance), then the control unit 4 implements an adjustment process that adjusts (up or down) an optical output from the pump laser whose peak amplification profile is most closely aligned with where the deviation occurred. Moreover, if the control unit observes that the deviation is isolated to a small part of the amplification band, then the control unit 4 adjusts that optical output for the pump laser whose peak output most strongly influences that part of the amplification band.

However, if the control unit 4 determines in step S12 that a series of adjacent samples of the monitored amplification profile deviate by more than the predetermined tolerance from the target amplification performance, then the control unit 4 implements a different process. In this later situation, the control unit 4 creates a "secondary target amplification profile." The shape of this secondary target amplification profile is formed from a difference between the target amplification performance and the monitored amplification profile. Much like with step S4, the control unit then determines (e.g., through simulation or table look-up) a set of amplifier parameters (e.g., pump laser drive currents) that can be applied to the pump lasers so as to have the monitored amplification profile more closely match the target amplification profile. Thus, the control unit 4 creates secondary target amplification profile that, when added to the monitored amplification profile, results in a new amplification profile that more reliably falls within the predetermined tolerance of the target amplification profile, across the amplification band.

Once step S12 is completed, the process proceeds to step S14, where the control unit 4 causes the optical outputs of the affected pump lasers to be adjusted by an amount necessary to implement the secondary target amplification profile. The process then returns to step S8 for continued monitoring and adjusting operations.

Examples of Using Groups of Pump Lasers to Set, and Maintain Amplification Performances Setting and maintaining an amplification profile may be accomplished with the control unit 4 by adjusting individual pump laser outputs. However, control can also be accomplished by adjusting the element profiles of respective groups of pump lasers. As discussed above, each of the element profiles is realized by combining the respective gain profiles of the pump lasers in that group. Then, the element gains themselves may be adjusted to lessen the number of degrees of freedom in the control process when making changes to the total amplification performance. For example, the levels of two element profiles may be adjusted quickly to impart a slope change on the total amplification profile. As discussed above, a positive slope may be created by increasing the gain of the second element and/or decreasing the gain of the element profile for the first element. Conversely, a negative slope may be imparted on the total amplification performance if the profile for the first element is increased and/or the profile for the second element is decreased.

A computer-based simulation process, as discussed above, may be used to efficiently determine a magnitude by which each of the element profiles should be adjusted so as to realize the desired effect. For example, a two step simulation process may be employed where the element profiles are identified via an element analysis (i.e., performing simulations to determine the respective gain levels attributable to each of the pump lasers to achieve the desired element profile). Then, a second step would be performed where the levels of the element profiles are adjusted to provide a desired total amplification profile of a predetermined shape. As one example, the element profiles could be developed during an initial setup mode of operation (e.g., step S4 in FIG. 11) and then the second simulation step would be performed in step S12 to identify an amount by which respective element profiles should be adjusted to maintain the total amplification performance to stay within the predetermined tolerance.

With regard to initially establishing the element profiles, the present inventors observed that since a high effective gain is expected with a lower power required, an element gain profile for the longer wavelength band (second element profile) is temporally set based on the desired target amplification gain profile. Moreover, the second element profile is set at a sufficiently high gain to ensure that the second element profile substantially accounts for the gain required at the longer wavelength portion of the amplification band. When done this way, the burden is then shifted on the control unit 4 to set the first element gain profile to match the difference between the target amplification profile and the second element gain profile. Since there are more pump lasers in the shorter wavelength group (i.e., the first group) there are more pump lasers available to create a more complex shaped first element profile.

When setting the shape for the first element profile, the control unit 4 may take into account additional conditions. For example, one of the additional conditions may be an amount of fiber loss in the optical fiber. This fiber loss may be determined at the time of installation of the Raman amplifier, and thus varies depending on the operational setting for that Raman amplifier. The fiber loss may change over time, perhaps based on a system operator adding another amplifier closer to the subject Raman amplifier, thus decreasing the distance over which the output optical signal must travel before being amplified again. As an example of a further "additional condition", the first element profile may be adapted to compensate for pump-to-pump interactions that may be experienced. See FIG. 16, which shows how pump-to-pump interactions will tend to inflate the total amplification performance at the longer wavelengths (profile "f"). By having the control unit 4 account for these additional conditions, it is possible to have the control unit 4 alter the shape of the respective element profiles, such that the total amplification performance is optimized, despite the existence of the additional conditions in which that Raman amplifier will operate.

As another example of how the control unit 4 may adjust the element profiles as a simplified control mechanism (as compared with simultaneously adjusting all of the pump lasers), suppose a tilted gain is observed when a flat gain is targeted. In this situation, the control unit 4 may correct for the tilted gain by adjusting the optical output of the first group of pumps and/or the second group of pumps. One adjustment process is to make incremental changes to the driving current for each pump until the total gain profile becomes readjusted to the relatively flat total gain profile "f" in FIG. 15B. The driving current increments are then stored in the memory 1204 for quick retrieval when making adjustments to the total amplification profile in future situations.

The control unit 4 may be purposefully configured to impart a tilted gain by adjusting the levels of the element profiles. For example, a flat gain across the amplification band may be appropriate if the communication parameters in the optical communication link are uniform across the spectral band. However, loss in an optical fiber is wavelength dependent, and thus, some channels of the WDM signal may be attenuated more than others when transiting between cascaded amplifiers. In this case, the control unit 4 may offset this operating condition by "pre-emphasizing" the optical signals that tend to be attenuated more by adjusting the element profiles to create a tilted total Numeric Example of Using Groups of Pump Lasers to Set, and Maintain Amplification Gain Profiles A numeric example will now be provided as a further explanation about how a simplified control process implemented in the control unit 4 can use groups of lasers to set and maintain an amplification gain performance within a predetermined tolerance of a target amplification performance. Assume a power level of respective WDM optical signals, e.g., channels 1–10, is uniform at −20 dBm. Also assume a net target gain applied by the Raman amplifier is about 10 dB, considering the internal losses imparted by the tap coupler and the WDM coupler. Consequently, the actual per channel output power level from the Raman amplifier should be uniform and have a value of about −10 dBm (i.e., −20 dBm+10 dB). The control unit 4 may keep as a stored value an indication that the output signal level, per channel is −10 dBm. Thus, if the control unit 4, during its monitoring operation determines that the output signal per channel is above or below that −10 dBm signal level by more than a specified amount, the control unit 4 can increase or decrease the element profile by an appropriate amount to counteract the deviation from the expected output level. For example, the control unit 4 may determine the following actual output power levels and corresponding deviations from the target value of −10 dBm:

| Channel # | Actual output power level | Deviation from target |
|---|---|---|
| Channel 1: | −15.0 dBm | 5.0 dBm |
| Channel 2: | −14.5 dBm | 4.5 dBm |
| Channel 3: | −14.0 dBm | 4.0 dBm |
| Channel 4: | −13.5 dBm | 3.5 dBm |
| Channel 5: | −13.0 dBm | 3.0 dBm |
| Channel 6: | −12.5 dBm | 2.5 dBm |
| Channel 7: | −12.0 dBm | 2.0 dBm |
| Channel 8: | −11.5 dBm | 1.5 dBm |
| Channel 9: | −11.0 dBm | 1.0 dBm |
| Channel 10: | −10.5 dBm | 0.5 dBm |

The control unit 4 will then make the determination that a series (i.e., more than one) deviations exist between sample points and thus will adjust an element profile up or down in gain level. By observing the series of deviations, the control unit 4 has in effect determined the "secondary target amplification profile." The control unit may thus compensate for this deviation by increasing the element gain of the first group so as to create a more tilted total amplification profile that more closely matches the target amplification profile. Further adjustments to the first element profile may then be made by adjusting optical outputs of the pump lasers within the first group, if necessary.

Alternatively, the control unit 4 may refer to the memory to identify drive current adjustments that have previously been associated with the secondary target amplification profile that is presently observed. Moreover, the memory holds sets of drive current adjustment values for the respective pumps in the first and second groups that are prearranged to create particular secondary target amplification profiles. Since only a limited number of pre-stored secondary target amplification profiles can be held in memory, the control unit 4 performs a least-squares analysis, based on the observed secondary target amplification profile to select a "closest" pre-stored secondary target amplification profile. Other pattern recognition processes may be used as well to select appropriate pre-stored secondary target amplification profiles, for the purpose of retrieving the drive current settings associated with the pre-stored secondary target amplification profiles.

Alternatively, the control unit 4 can be configured to determine an average or mean value of the deviations and verify if this average or mean value is within an allowable tolerance. For example, the control unit 4 may determine that the average value of the deviations is zero, which in some instances may indicate that the amplification performance has been satisfied. If it is not within tolerance however, the control unit 4 would increase/decrease the element gains as appropriate to more closely close the gap between the actual output level profile and the target level profile (i.e., −10 dBm in this example).

Further, the deviations shown above correspond to a difference between the actual output power level and the target output power level. Note, however, the control unit 4 may determine the drive currents from the superposition principle, as discussed above.

Example of Handling Additional Conditions When Creating Element Gain Profiles

Raman amplifiers will be placed in service in a variety of different operational conditions that may influence how an optimum target gain profile is identified for that operational environment. Information about the operational conditions (such as the pump-to-pump interaction shown as the difference between profiles "f" and "e" in FIG. 16) is provided to the control unit 4 at step S2 (FIG. 11) for selecting the optimum target profile. The source of this information may be found during equipment installation, or periodic recalibration. When a target gain profile "e" is initially given in step S2, yet an actual gain profile is observed like "f", this difference in actual from predicted performance is found in steps S8 and S10. The control unit 4 may observe this deviation as being attributable to the existence of pump-to-pump interaction, that had not originally been considered in steps S2 and S4 when establishing the target amplification performance. Once this observation is made, the process of FIG. 11 may reestablish a new target profile in steps S2 and S4 that consider the existence of pump-to-pump interaction, rather than just simple superposition. In this case, with the modified process for developing the target amplification performance, the observed variation from target amplification performance to the monitored amplification performance should narrow, thus requiring less adjustment to maintain the predetermined gain profile.

This additional condition information (which in this case is the realization that there is pump-to-pump interaction) is also considered in steps S10 and S12 (FIG. 11) when performing the monitoring and analyzing process steps. The information is useful since the additional conditions will be reflected in the target amplification profile, or in observed, consistent deviations from the target amplification profile. The output level of the pumps in each group may then be changed as necessary so as to maintain the target amplification performance (step S14).

For example, the control unit 4 may incrementally increase or decrease an output power of each pump in the first group so as to effect the element amplification profile of the first group. If the observed total gain profile is still not within the allowable tolerance of the target gain profile after this incremental increase or decrease, the control unit 4 may again incrementally increase or decrease the output power of each group of pumps.

A look-up table, such as that shown in Table 1, may be used to implement this incremental approach. That is, the control unit 4 may select a first profile #1 for the set of four pumps in the first group and read the driving currents from the table for each pump (i.e., a driving current of 500 mA for each pump). If the actual amplification profile does not equal the target amplification profile, the control unit may select profile #2 for the four pumps in the first group. This incremental approach may be continued until the actual amplification profile is within the allowable tolerance of the target amplification profile.

TABLE 1

Group 1 (four pumps)

| Pump 1 | Pump 2 | Pump 3 | Pump 4 | Profile Number |
| --- | --- | --- | --- | --- |
| 500 mA | 500 mA | 500 mA | 500 mA | #1 |
| 490 mA | 490 mA | 490 mA | 490 mA | #2 |
| 480 mA | 480 mA | 480 mA | 480 mA | #3 |

In addition, the look-up Table 1 may also be modified to store different drive currents corresponding to different types of amplification profiles.

For example, the look-up Table 2 shown below may be used by the control unit 4 to provide various element gain profiles for a specified group of pumps. The values in Table 2 were selected as examples to show that different sets of values may be selected.

TABLE 2

Group 1 (four pumps)

| Pump 1 | Pump 2 | Pump 3 | Pump 4 | Profile Number |
| --- | --- | --- | --- | --- |
| 560 mA | 311 mA | 122 mA | 244 mA | #1 |
| 560 mA | 500 mA | 440 mA | 330 mA | #2 |
| 480 mA | 480 mA | 480 mA | 480 mA | #3 |

In this example, the control unit 4 may determine that the gain profile #2 is suitable to offset a fiber loss characteristic (i.e., another "additional" condition"). The control unit 4 may then read the necessary driving currents from the table to achieve a desired amplification profile for the first group of pumps. The control unit 4 may select the best profile (i.e., one that minimizes a difference between an actual output signal level and a target output signal level, considering the effects of any additional conditions such as fiber loss) from the table based on a variety of factors. For example, the control unit 4 may select profile #3 that provides the actual amplification performance, due to both the first and second groups having a profile 5 dB below a target gain profile. The control unit 4 may also determine this drop in gain occurs in the wavelengths corresponding to the pumps in the first group. The control unit 4 may then select profile #1 from Table 2 (which has previously been determined as the best profile to offset a loss of 5 dB or less, for example). Once profile #1 is selected, the driving currents associated with profile #1 are then retrieved from memory and applied to the respective pump lasers.

Examples of Having the Control Unit Substitute New Target Amplification Performances When Communication Conditions Change Using the control unit 4 and a special arrangement of the pumping device, the target amplification performance may be changed. In the examples that follow, the change of target amplification performance is explained in the context of attempting to provide a same system-level performance for an input WDM signal even though a system parameter has changed. FIGS. 17–35 illustrate different examples of the control unit 4 exerting control over the pump lasers so as to produce a target amplification gain profile that yields a same overall system performance for an input WDM signal, even though the communication conditions may have changed.

Selecting a Subset of Equally Separated Pump Lasers

Figure 17:
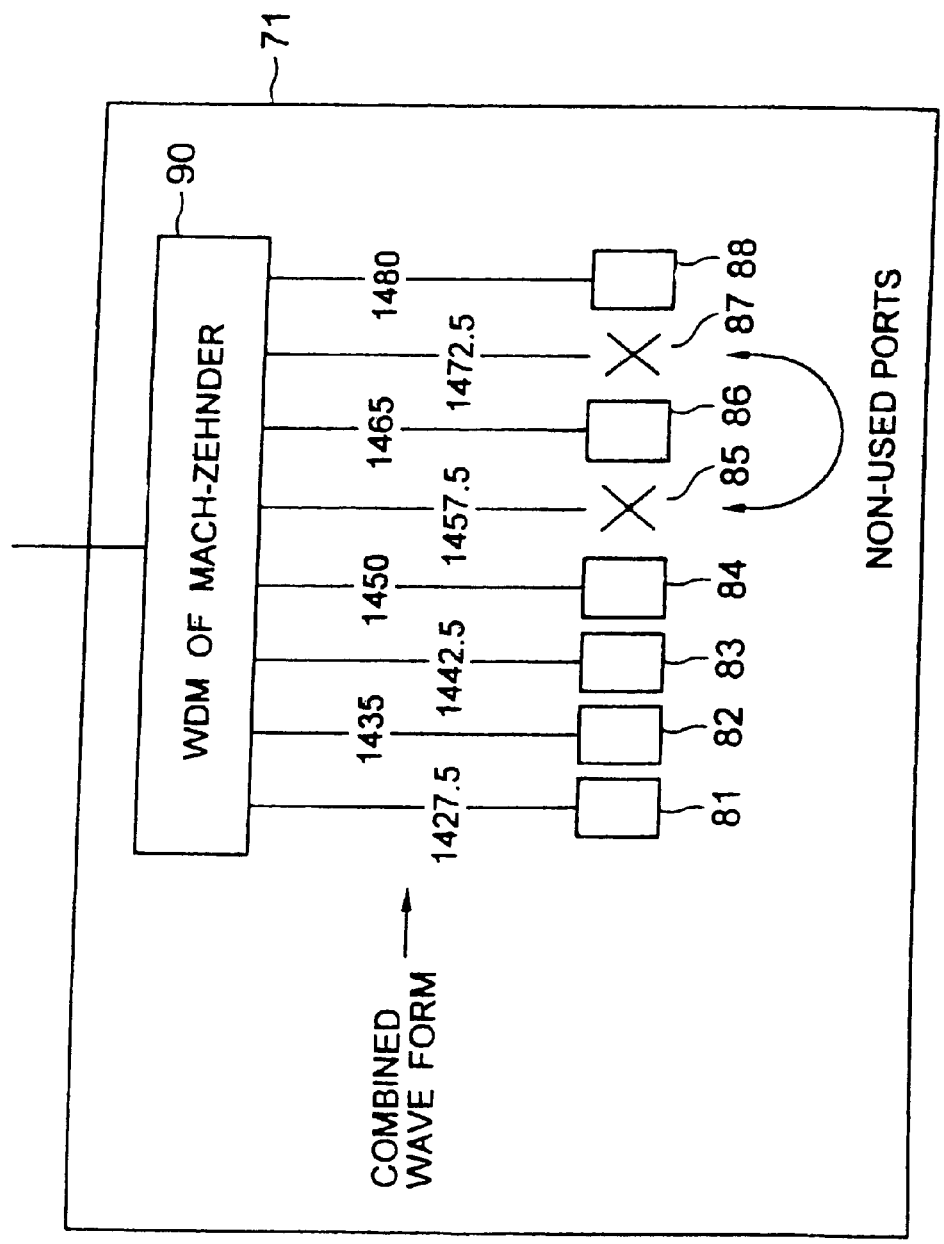
FIG. 17 is a schematic of another pumping device according to the present invention.

FIG. 17 is a schematic of another pumping device 71 according to the present invention, which includes "slots" for eight pump lasers 81–88 coupled by a Mach-Zehnder interferometer 90. In addition, each slot for the pumps 81–88 are separated by an equal wavelength (i.e., by 7.5 nm) and produce the same output value. However, note in this example, that pump lasers 85 and 87 are not used. This may be accomplished by simply not installing these pumps into the pumping device 71. Alternatively, the control unit 4 may simply not apply driving currents to pumps 85 and 87. This alternative embodiment enables the production of a "generic pumping device" that may be configured/reconfigured after it is placed in a particular operational situation. In this way, each amplifier need not be custom fit to a particular place in a communication network, but rather the generic amplifier may be remotely configured by the remote device controller (4000) that downloads operational parameters to the Raman amplifier. In this case, it is possible that at least some fraction of the pump lasers will not be used by the control unit 4 to create the target amplification performance. (Although not shown in FIG. 17, the control unit 4 asserts control over the pump lasers 81–88 by way of control lines so as to switch the pump lasers in or out of the pumping device 71, or alternatively by asserting control over the driving circuits).

In this example, the total power of the pumps included in the first group, at the shortest wavelength side (i.e., the total power due to pumps 81, 82, 83 and 84) is greater than a total power due to the pumps in the second group at the longer wavelength side (i.e., the total power due to pumps 86 and 88). This provides a flat amplification profile since the control unit 4 adjusts the levels of the pump lasers in the first group and the second group to form element profiles that result in a flat profile when combined. In FIG. 17, the pumps in each of the respective groups produce the same output power, but the total output power due to the pumps operating at the longer wavelength side is set to be sufficiently high to maintain the flat gain profile even though only a subset of the pumps (i.e., pumps 85 and 87) is used.

After the element profiles are established, the control unit 4 may monitor the actual WDM signal and control each operating pump so as to maintain the target amplification gain profile (as previously described with reference to FIG. 11). Alternatively, the control unit 4 may monitor and control the actual amplification profile with respect to two groups of pumps.

Changing an Amplification Bandwidth

Figure 18:
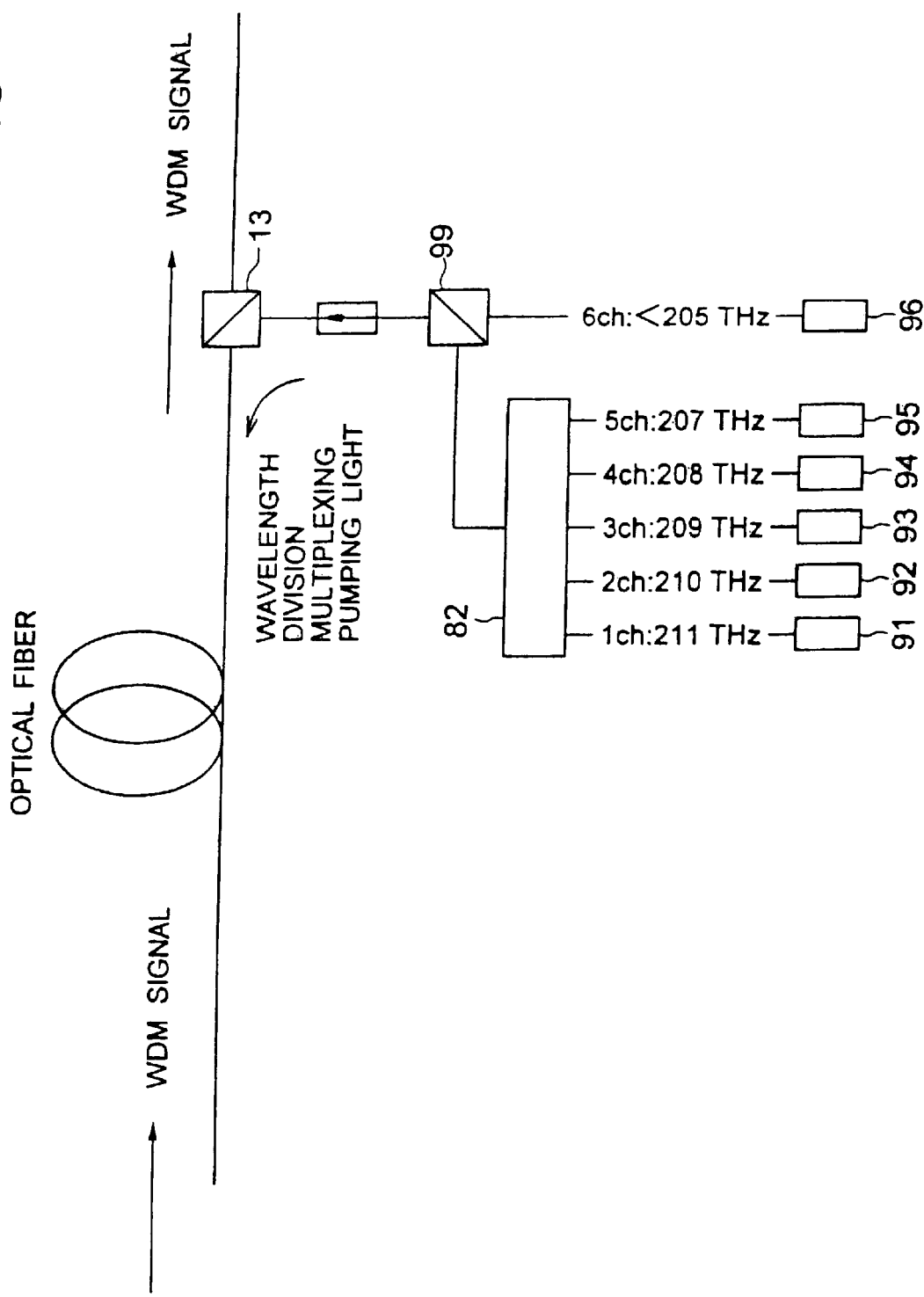
FIG. 18 is a schematic for explaining another Raman amplification example according to the present invention.

The amplification bandwidth can be expanded or contracted by changing the contributions from pump lasers at the shortest and longest wavelengths in the group of pump lasers. FIG. 18 illustrates another example in which this can be accomplished. It should be noted that in FIG. 18, the center frequencies of the pump lasers are shown, rather than the central wavelengths. As shown, the center frequency of the first pump 91 is 211 THz (a wavelength of 1420.8 nm) and the center frequency of the fifth pump 95 is 207 THz (a wavelength of 1448.3 nm). The pumps 91–95 are spaced apart from each other at an interval of 1 THz and the light output from the pumps 91–95 are combined via the WDM combiner 82 to form a shorter wavelength group. This combined light is then combined via a coupler 99 with light output from the longer wavelength group that includes a pump 96 operating at a frequency of 205 THz (a wavelength of 1462.4 nm), which is spaced apart from the fifth pump 95 by 2 THz.

Figure 19:
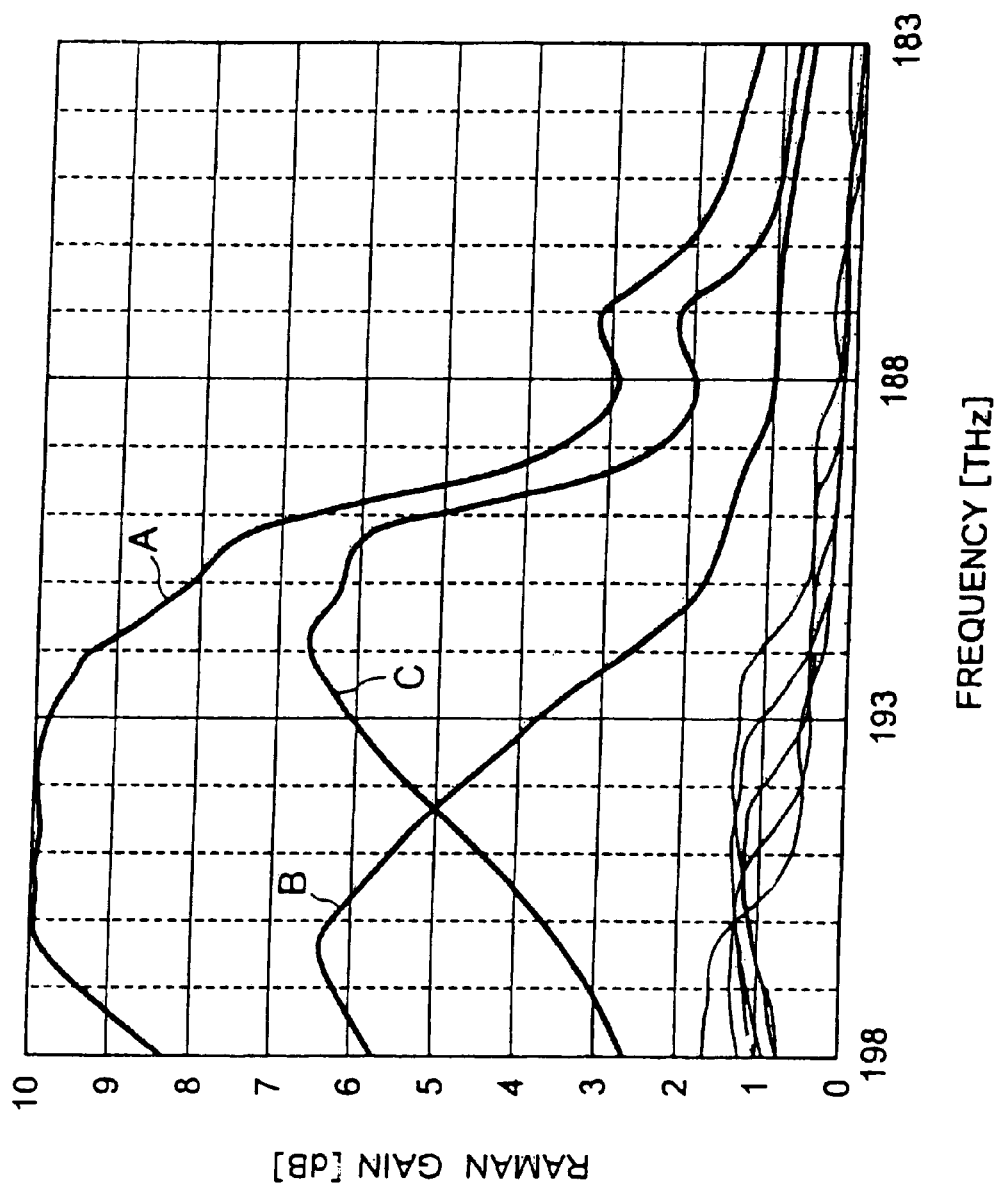
FIG. 19 is a graph illustrating amplification profiles of the pumping device in FIG. 18.

FIG. 19 illustrates Raman amplification profiles for the pumps 91–96 shown in FIG. 18. The curve "A" represents a total amplification profile due to all of the pumps 91–96, the curve "B" represents a sum of the amplification profiles due to a group of shorter wavelengths of the first five pumps 91–95, and the curve "C" represents an amplification profile due to the sixth pump 96. The thin lines in FIG. 19 correspond to amplification profiles for each of the first five pumps 91–95. By multiplexing the light output from the pumps 91–95 spaced at intervals of 1 THz, a smooth curve extending rightwardly and downwardly is formed (i.e., curve "B"). In addition, by adding the curve "B" to an amplification profile extending rightwardly and upwardly (in FIG. 19) due to the light output from the sixth pump 96 (i.e., curve "C"), a total Raman amplification profile is substantially flat as shown by the curve "A". Further, as shown by the thin lines in FIG. 19, a projection of a first amplification curve and a recess of another amplification curve mutually cancel each other when the interval is 1 THz.

Figure 20:
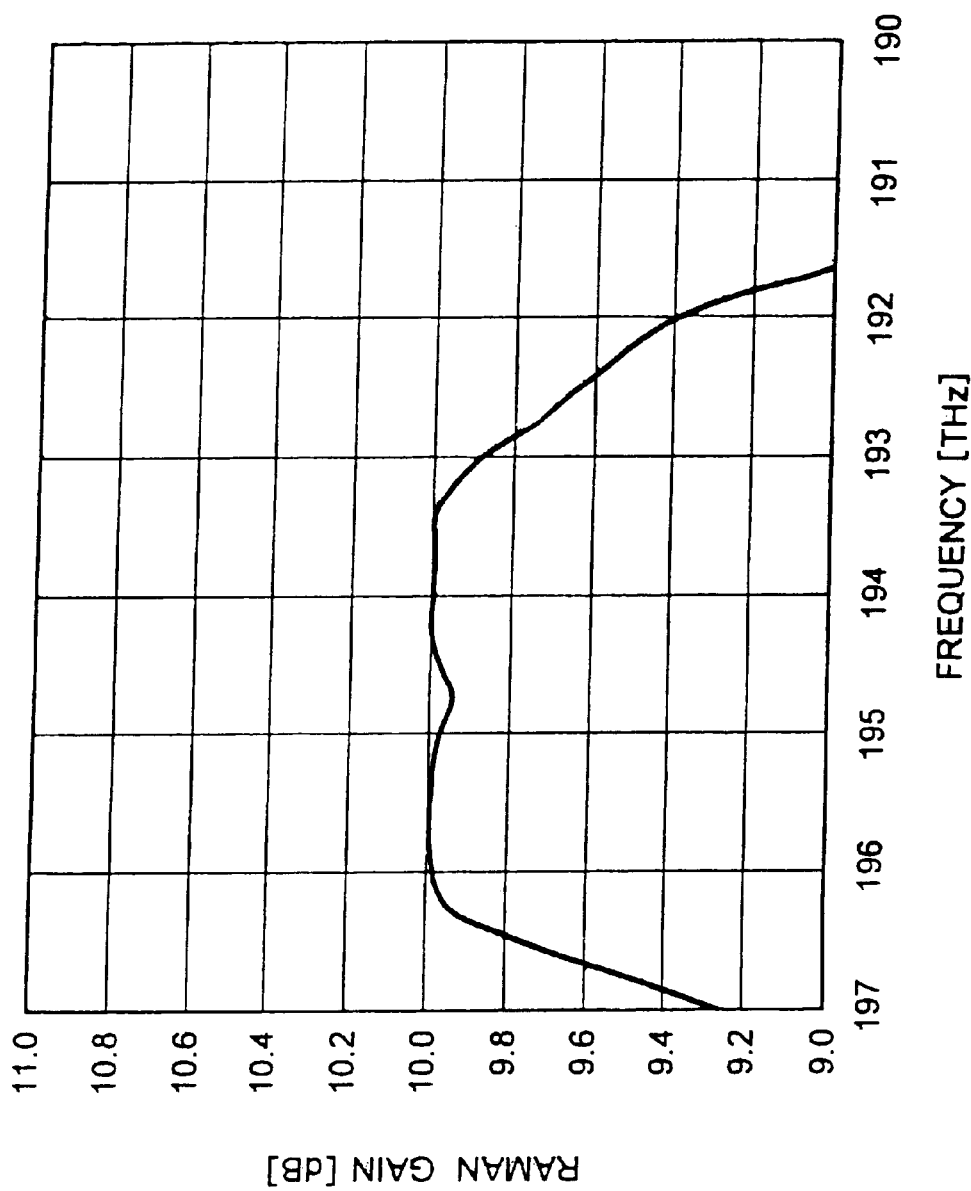
FIG. 20 is a graph illustrating an enlarged view of a total amplification profile of the pumping device in FIG. 18.

FIG. 20 is a graph illustrating an enlarged view of the total amplification curve "A" shown in FIG. 19. As shown, the amplification bandwidth at 10 dB extends from about 196 THz (a wavelength of 1526.6 nm) to about 193 THz (a wavelength of 1553.3 nm) and a gain deviation of about 0.1 dB is achieved.

Figure 21:
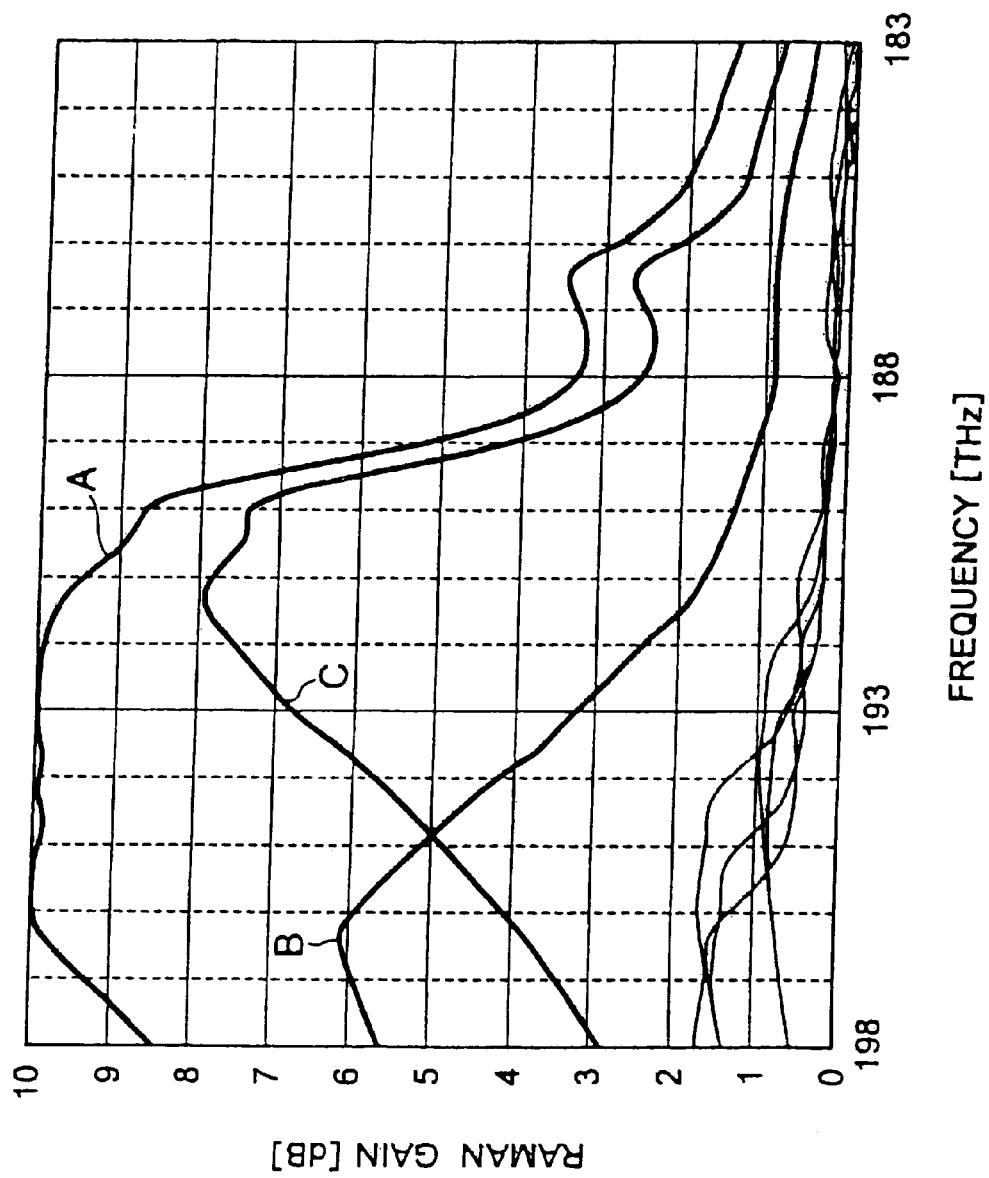
FIG. 21 is a graph illustrating amplification profiles for a variation of the pumping device in FIG. 18.

FIG. 21 shows amplification profiles when the center frequency of the pump 96 in FIG. 18 is spaced apart from the fifth pump 95 by 2.5 THz (rather than being spaced apart from the fifth pump 95 by 2.0 THz as in FIG. 18). Similar to FIG. 19, the curve "A" represents the total amplification profile, the curve "B" represents the sum of amplification profiles due to the first five pumps 91–95, and the curve "C" represents an amplification profile of the sixth pump 96. Further, the thin lines represent individual amplification profiles of the first five pumps 91–95.

Figure 22:
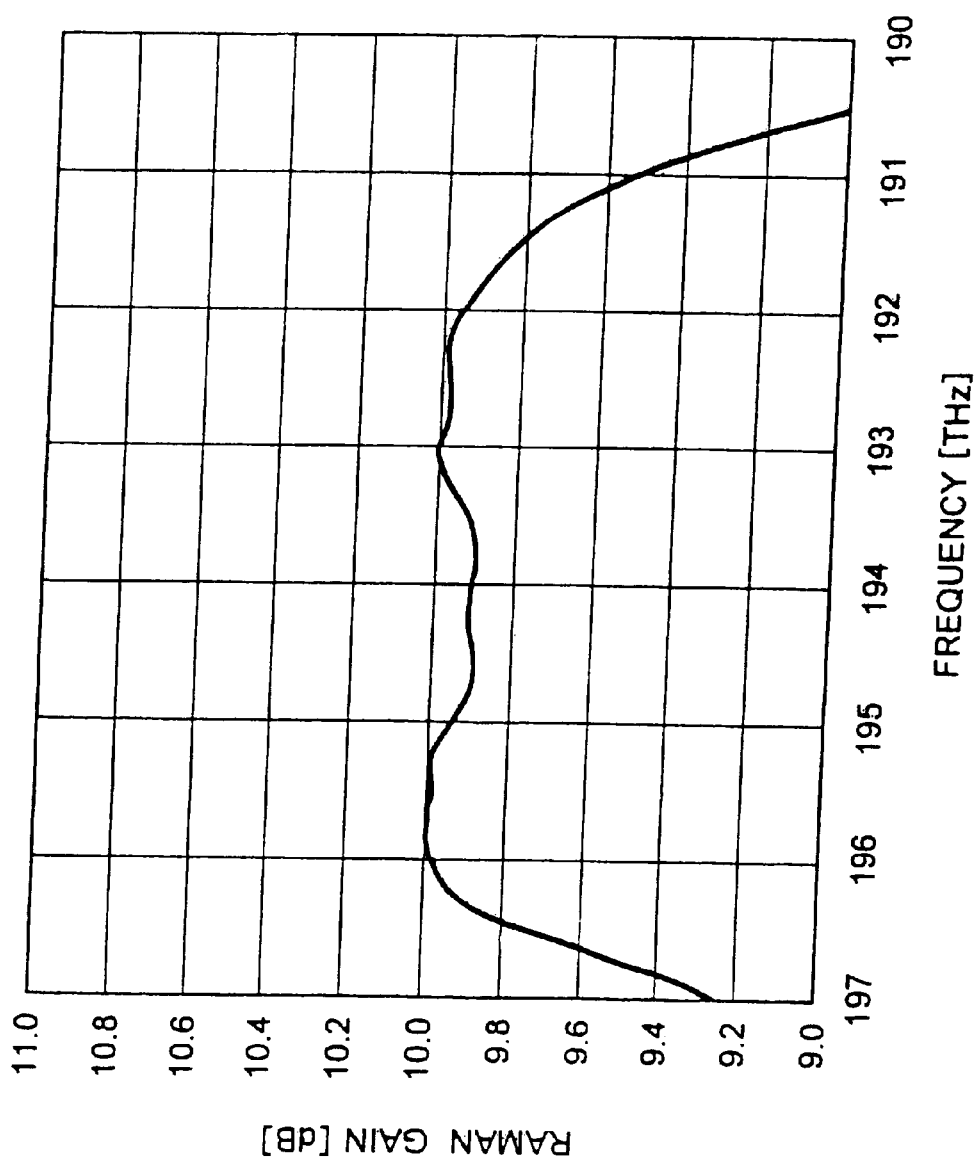
FIG. 22 is a graph illustrating an enlarged view of a total amplification profile of the pumping device shown in FIG. 21.

FIG. 22 is an enlarged view of the total amplification curve "A" shown in FIG. 21. As shown, the peak amplification is at 10 dB, the amplification bandwidth extends from about 196 THz (a wavelength of 1529.6 nm) to about 192 THz (a wavelength of 1561.4 nm) and an amplification deviation of about 0.1 dB is achieved. Further, the amplification bandwidth is wider than that in FIG. 20, but a larger ripple occurs at a middle portion of the bandwidth. The ripple is caused because the interval between the fifth pump 95 and the sixth pump 96 is larger (i.e., 2.5 THz rather than 2.0 THz). Thus, in FIG. 22, a larger amplification bandwidth is achieved, but there is a larger ripple at a middle portion of the bandwidth. The expansion in bandwidth can be controlled by incorporating, and actuating spare pump lasers at set intervals below the center frequency of the pump laser that produces the shortest wavelength used to develop profile "B", and above a center frequency of longest wavelength used to develop profile "C" in FIG. 19. While, the spare pumps are more expensive to install than not including spare pumps, the Raman amplifier is quickly and easily reconfigured from a remote device controller 4000 (FIG. 6) to adjust an amplification bandwidth.

Example of Optimized 1 THz Spacing

Figure 23:
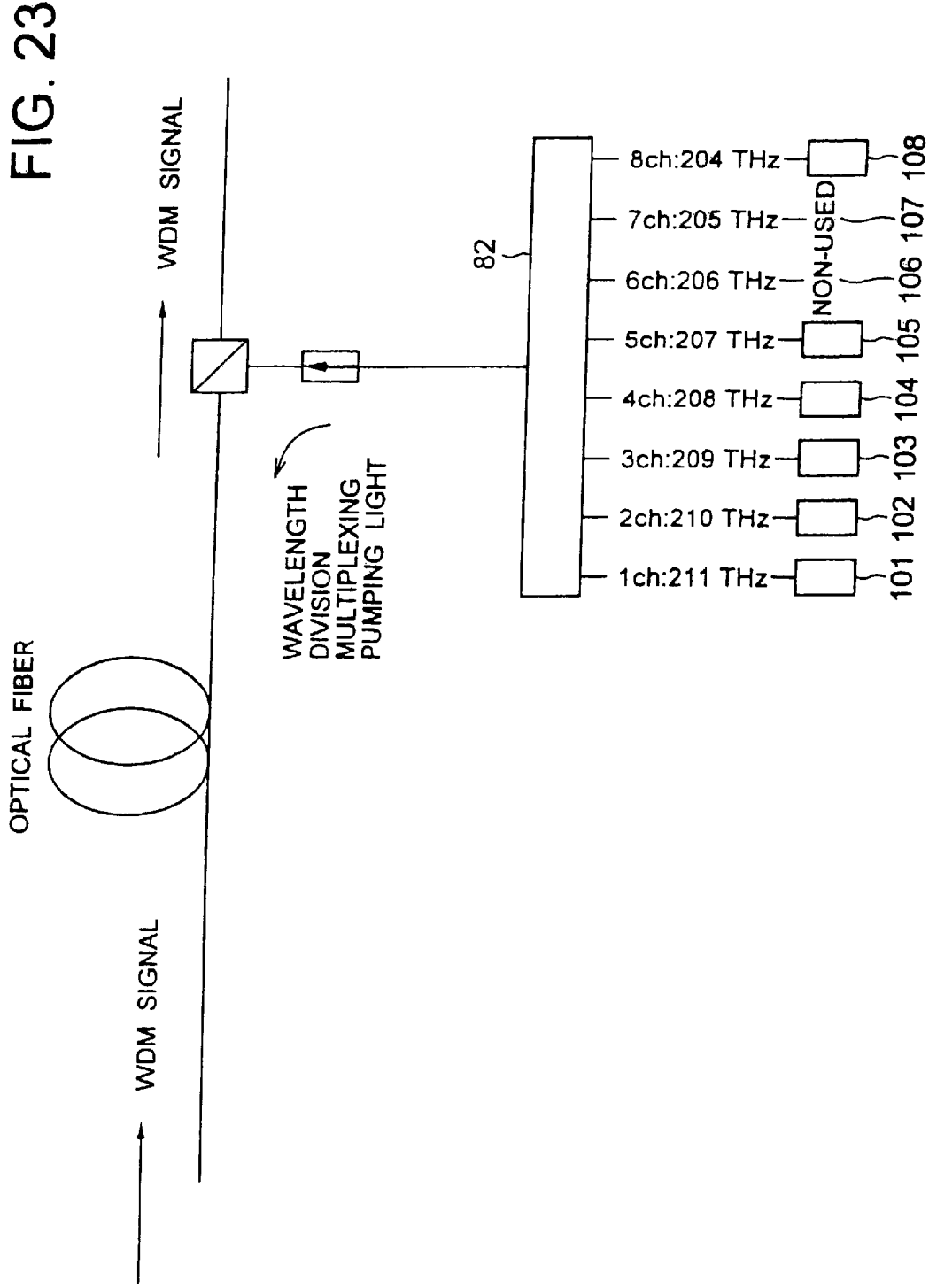
FIG. 23 is a schematic for illustrating yet another Raman amplification example according to the present invention.

FIG. 23 is a schematic illustrating yet another Raman amplifier example according to the present invention. In this example, the frequency of the first pump 101 is 211 THz (a wavelength of 1420.8 nm) and the frequencies of the second to eighth pumps 102–108 are from 210 THz (a wavelength of 1427.6 nm) to 204 THz (a wavelength of 1469.6 nm). Each slot for the pumps 101–108 is spaced apart from each other by an interval of 1 THz. Note again, however, that the pumps 106 and 107 are not used (although they may remain in the Raman amplifier to enable for dynamic reconfiguration of the amplification bandwidth, discussed above). In addition, the wavelength interval between adjacent operating pumps is within an inclusive range from 6 nm to 35 nm. Further, the number of pumps operating at the shorter wavelength side (with respect to the middle wavelength between the shortest and longest center wavelengths) is greater than the number of pumps operating at the longer wavelength side. That is, the middle frequency between the first pump 101 and eighth pump 108 is at about 207.5 THz. Thus, pumps 101–104 (i.e., four pumps) are operating on the shorter wavelength side and pumps 105 and 108 (i.e., two pumps) are operating on the longer wavelength side.

Figure 24:
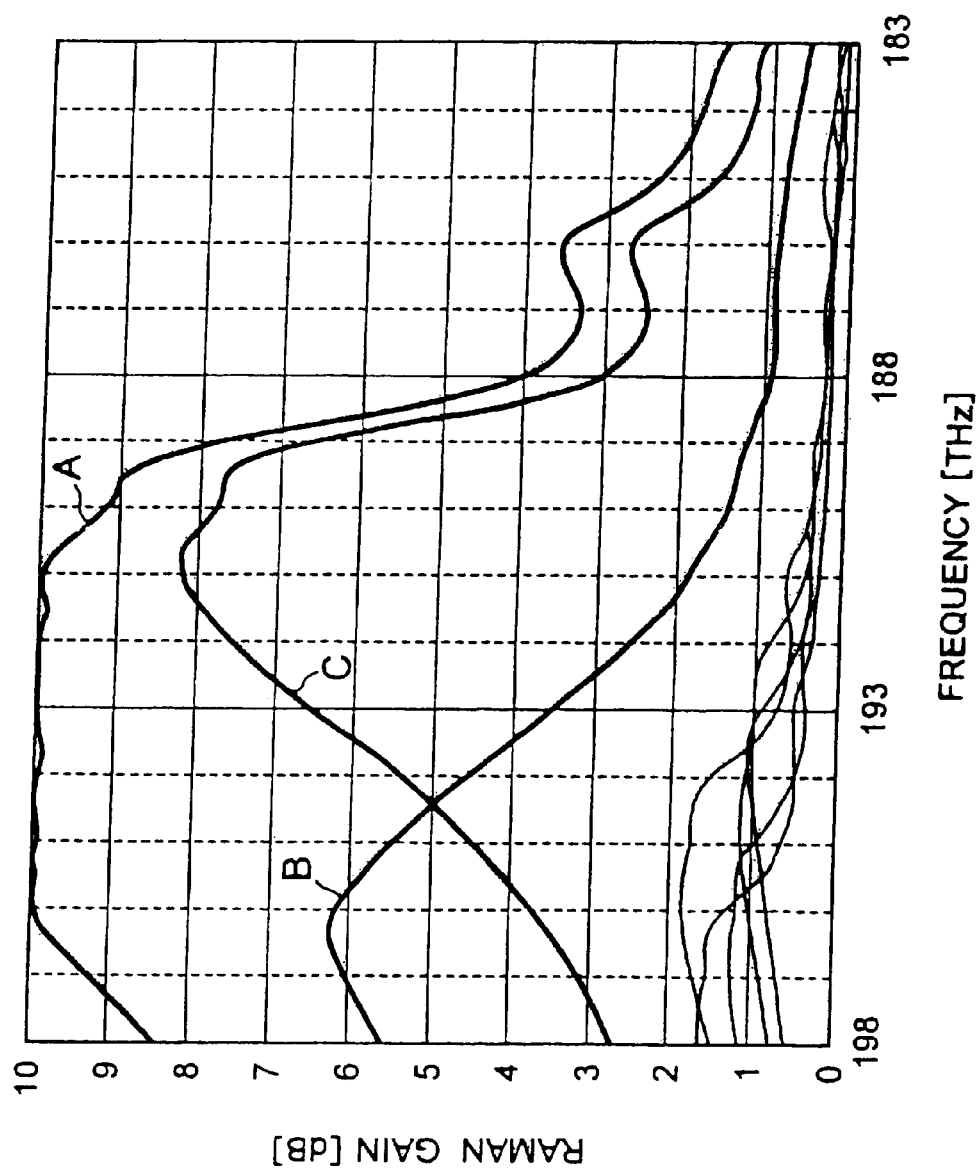
FIG. 24 is a graph illustrating amplification profiles of the pumping device in FIG. 23.

FIG. 24 illustrates Raman amplification profiles that are produced when the pumps 101–105 and 108 shown in FIG. 23 are used. The curve "A" represents the total amplification profile, the curve "B" represents the sum of amplification profiles due to the first five pumps 101–105, and the curve "C" represents an amplification profile due to the eighth pump 108. In addition, the thin lines represent individual amplification profiles of the first five pumps 101–105.

Figure 25:
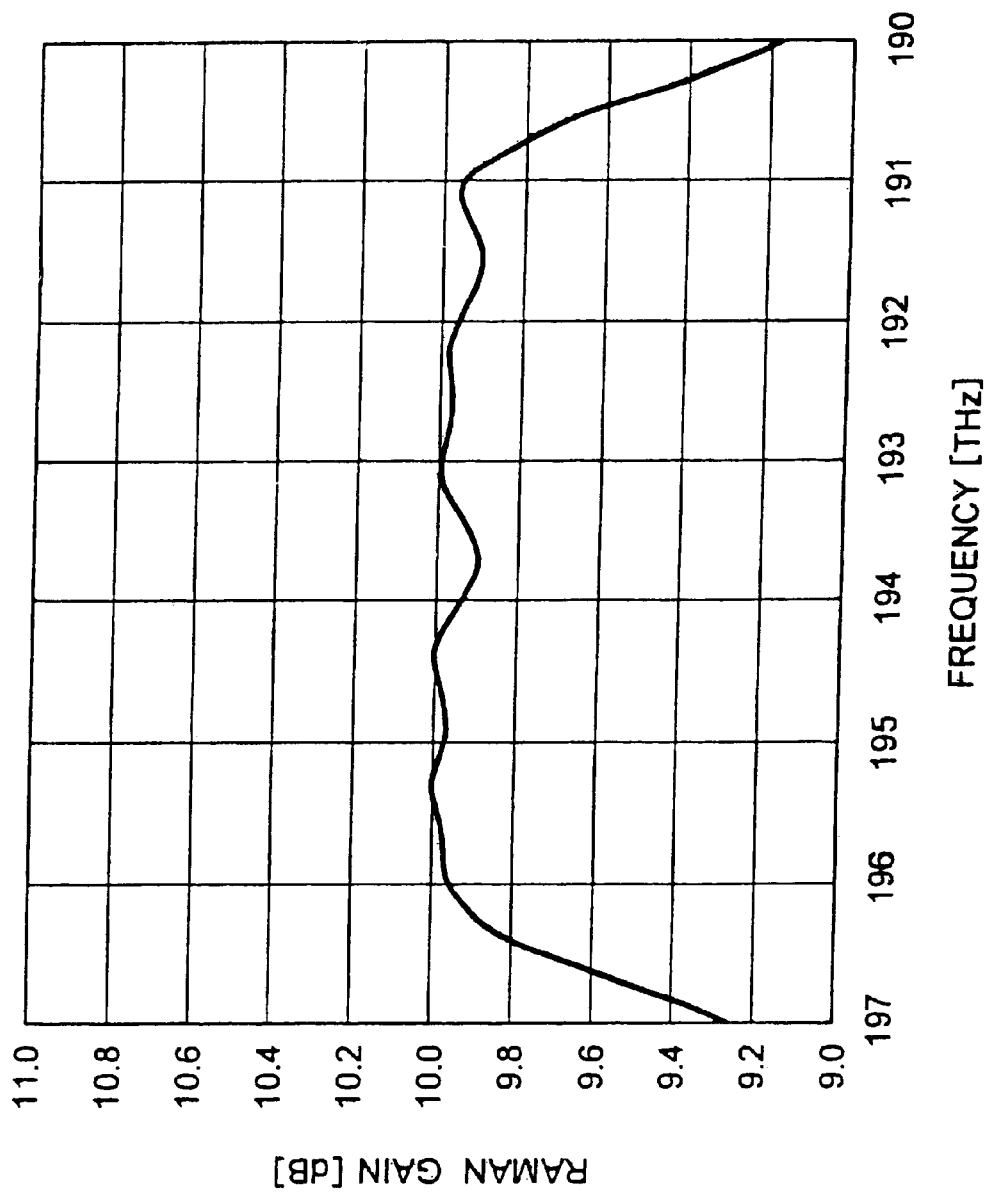
FIG. 25 is an enlarged view of the total amplification profile shown in FIG. 24.

FIG. 25 is an enlarged view of the total amplification curve "A" in FIG. 24. As shown, the peak amplification is at 10 dB, the amplification bandwidth extends from about 196 THz (a wavelength of 1529.6 nm) to about 191 THz (a wavelength of 1569.6 nm) and the amplification deviation is about 0.1 dB. Note the amplification bandwidth is wider than the amplification bandwidths shown in FIGS. 20 and 22. The reason is because the eighth pump 108 is spaced at a larger interval (i.e., 3 THz) from the adjacent operating pump 105.

Another Example of Optimized 1 THz Spacing

Figure 26:
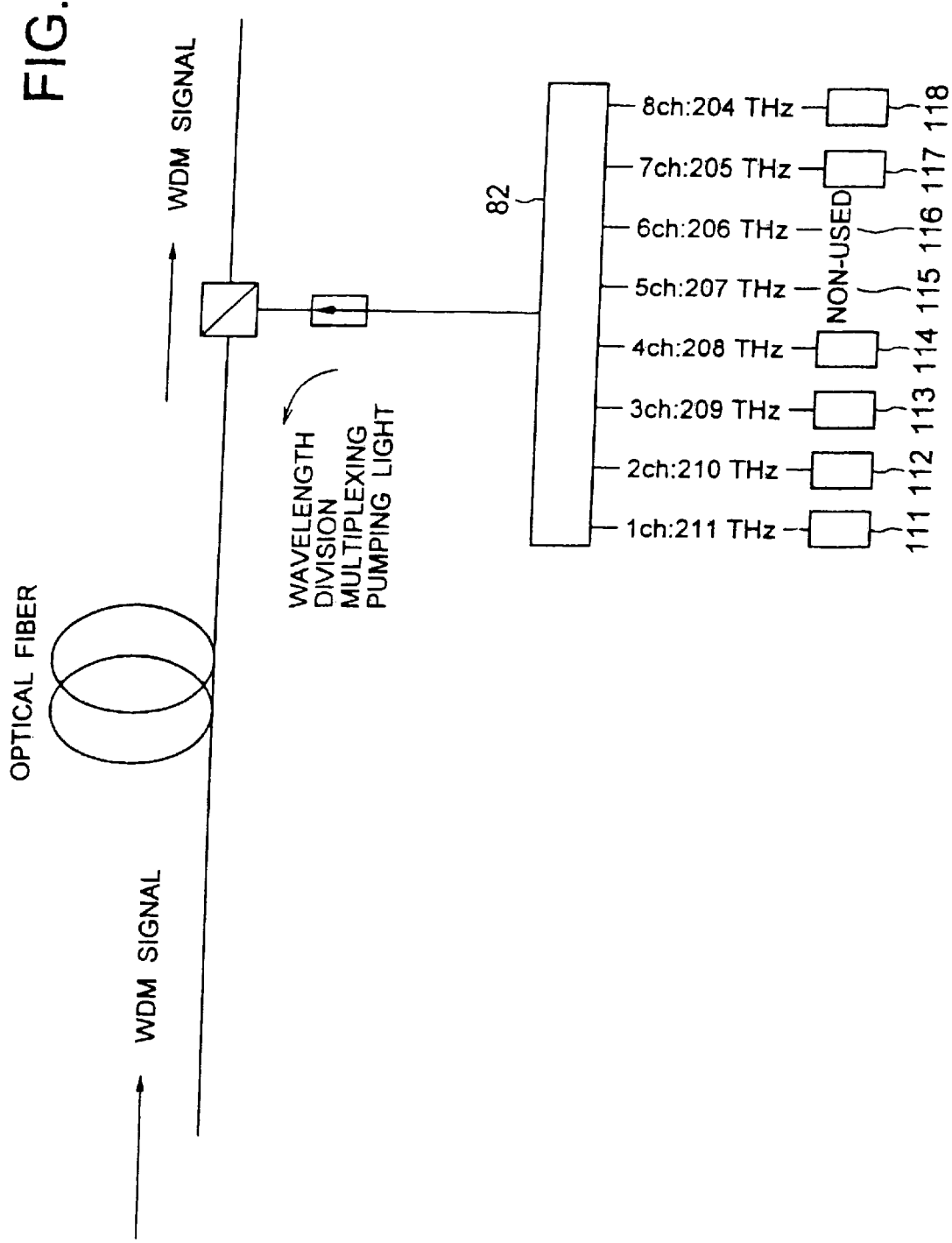
FIG. 26 is a schematic for explaining still another Raman amplification example according to the present invention.

FIG. 26 is a schematic illustrating still another Raman amplification example according to the present invention. The frequency of the first pump 111 is 211 THz (a wavelength of 1420.8 nm) and the frequencies of the second to eighth pumps 112 to 118 are from 210 THz (a wavelength of 1427.6 nm) to 204 THz (a wavelength of 1469.6 nm). In addition, each slot for the pumps is spaced at an interval of 1 THz. In this example, the fifth and sixth pumps 115 and 116 are not used. Further, the interval between operating adjacent pumps is within an inclusive range of 6 nm to 35 nm, and the number of pumps on the shorter wavelength side is greater than the number of pumps on the longer wavelength side.

Figure 27:
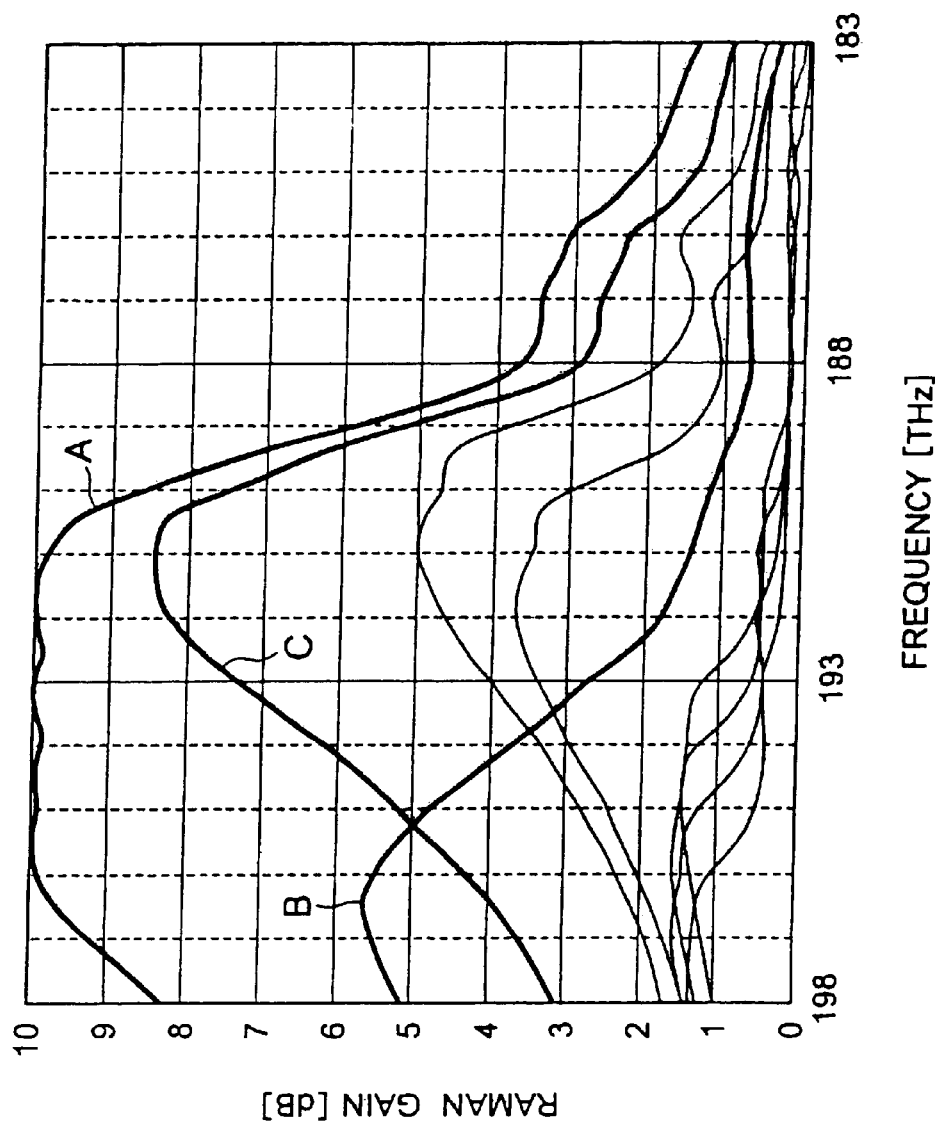
FIG. 27 is a graph illustrating amplification profiles of the pumping device in FIG. 17.

FIG. 27 illustrates Raman amplification profiles for the pumps 111–114 and 117–118 shown in FIG. 26. The curve "A" represents the total amplification profile, the curve "B" represents the sum of the amplification profiles due to the first four pumps 111–114, and the curve "C" represents the sum of the amplification profiles due to the seventh and eighth pumps 117 and 118. The thin lines represent the amplification profiles due to each of the operating pumps 111–114 and 117–118.

Figure 28:
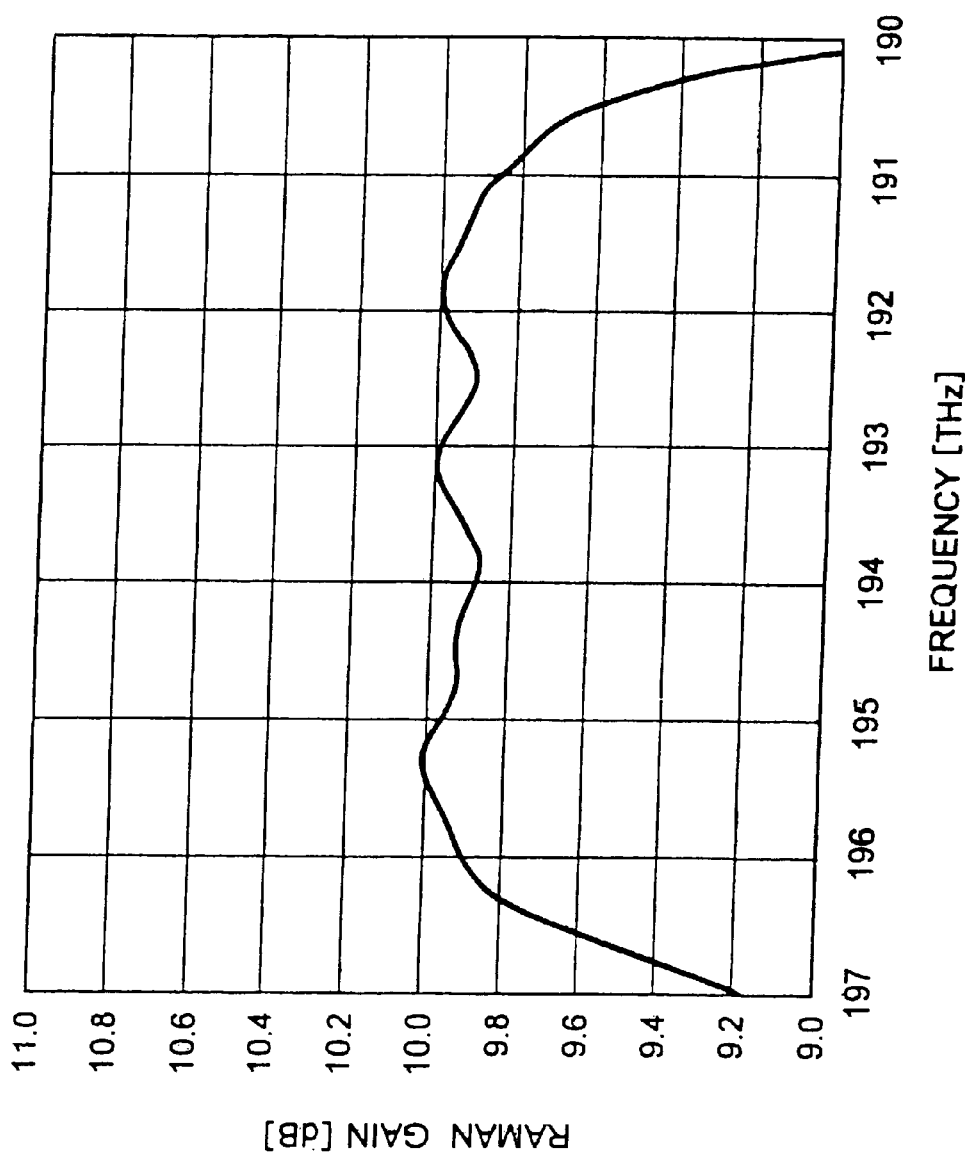
FIG. 28 is a graph illustrating an enlarged view of a total amplification profile shown in FIG. 27.

FIG. 28 is an enlarged view of the total amplification curve "A" in FIG. 27. As shown, the peak amplification is at 10 dB, the amplification bandwidth extends from about 196 THz (a wavelength of 1529.6 nm) to about 191 THz (a wavelength of 1569.6 nm) and the amplification deviation is about 0.1 dB. Further, in this example, note the amplification curve "C" in FIG. 27 is formed from the individual amplification profiles of pumps 117 and 118, whereas the amplification curve "C" in FIG. 24 is formed from the single pump 108 (see FIG. 23). In addition, the maximum gain created by the pumps 117 and 118 is about 5 dB (see FIG. 27), whereas the maximum gain created by the single pump 108 is about 8 dB. Thus, in FIG. 27, the two pumps 117 and 118 can be driven at a smaller output power compared to driving a single pump.

Further Example of Optimized 1 THz Spacing

Figure 29:
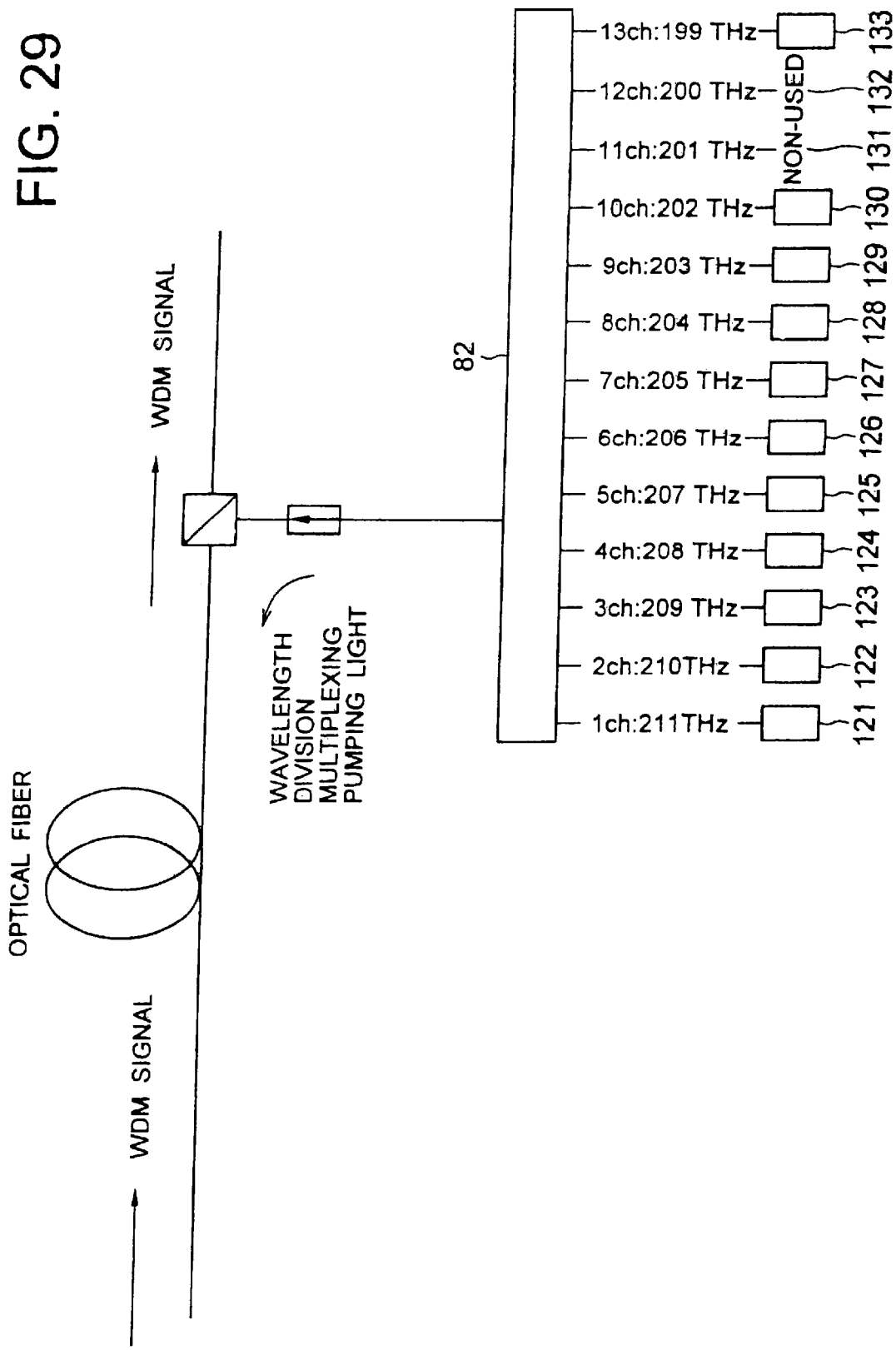
FIG. 29 is a schematic for explaining another Raman amplification example according to the present invention.

FIG. 29 is a schematic illustrating still another Raman amplification example according to the present invention. In this example, the pumping device includes a set of thirteen pumps 121–133. Each of the pumps is separated by 1 THz and the first pump 121 has a center frequency of 211 THz (a wavelength of 1420.8 nm) and the thirteenth pump 133 has a center frequency of 199 THz (a wavelength of 1506.5 nm). The eleventh and twelfth pumps 131 and 132 are not used (i.e., either the pumps are not installed or the control unit 4 does not apply a driving current to the pumps 131 and 132). In addition, the interval between adjacent operating pumps is within an inclusive range of 6 nm to 35 nm, and the number of pumps on the shorter wavelength side is greater than on the longer wavelength side.

Figure 30:
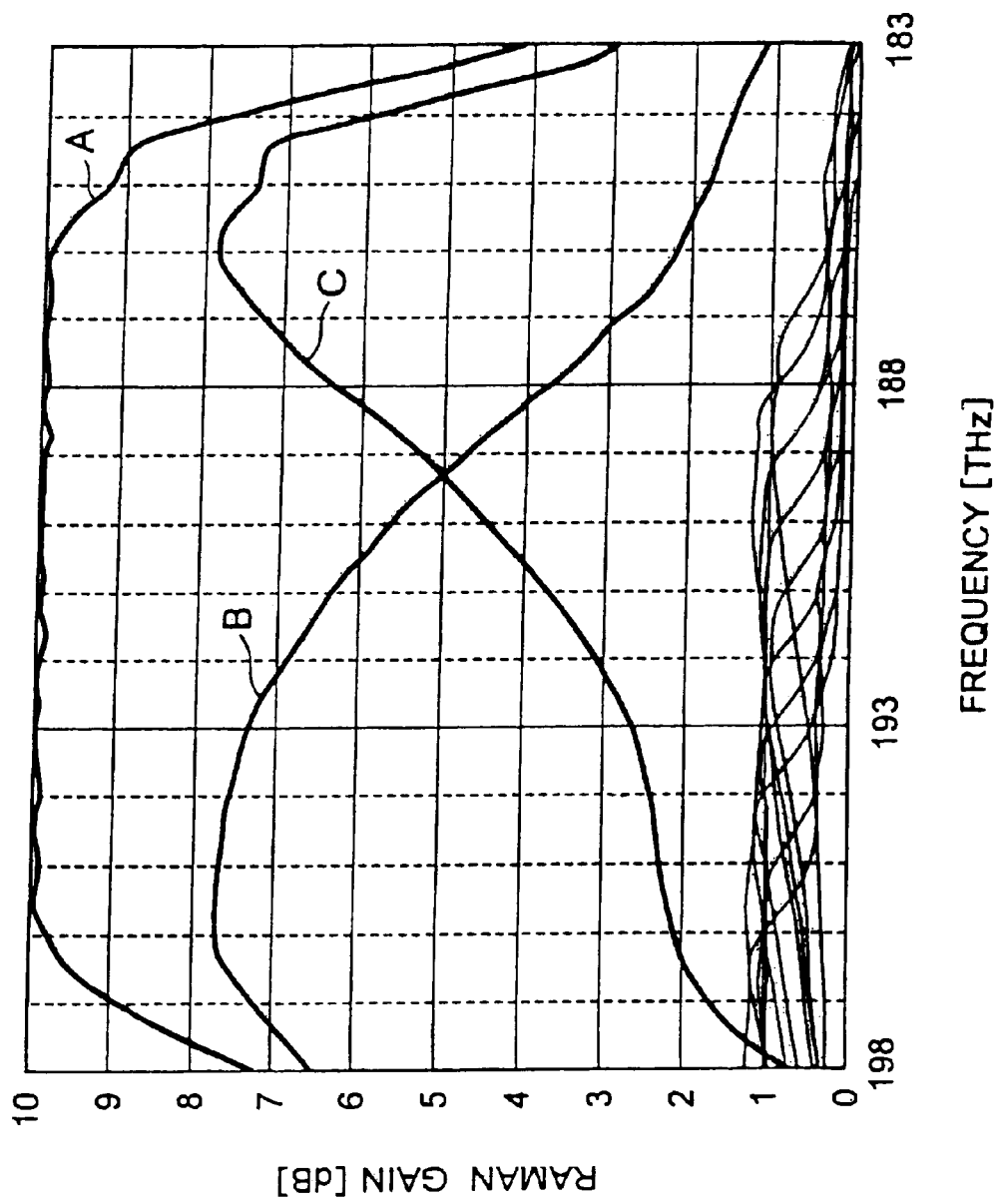
FIG. 30 is a graph illustrating amplification profiles for a pumping device including a bank of thirteen pumps.
Figure 31:
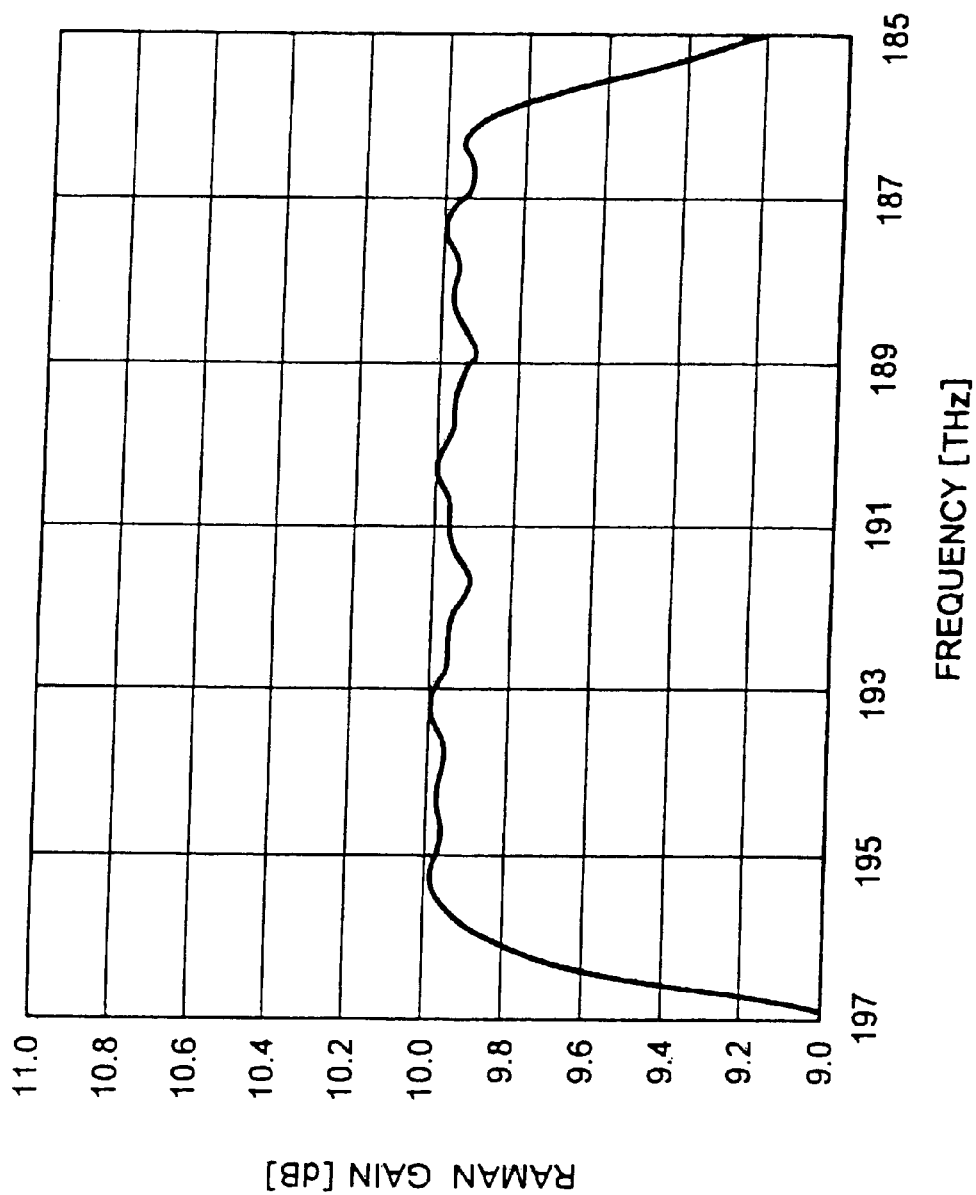
FIG. 31 is a graph illustrating an enlarged view of a total amplification profile shown in FIG. 30.

In FIG. 30, the curve "A" represents the total amplification profile, the curve "B" represents the sum of the amplification profiles due to the first to tenth pumps, and the curve "C" represents the amplification profile of the thirteenth pump. Further, the thin lines represent the individual amplification profiles of the first to tenth pumps. FIG. 31 is an enlarged view of the total amplification curve "A" in FIG. 30. As shown, the peak amplification is at 10 dB, the amplification bandwidth extends from about 196 THz (a wavelength of 1529.6 nm) to about 186 THz (a wavelength of 1611.8 nm) and the gain deviation is about 0.1 dB. Thus, by adding new pumps toward the longer wavelength, the gain profile can be expanded. When target performance is changed from the one in FIG. 24 and 27, pump configuration should be changed from FIG. 23 to FIG. 26. When the "spare" pump lasers are already resident in the Raman Amplifier, the change in bandwidth, as discussed with regard to the embodiments of FIGS. 17, 18, 23, 26 and 29 can be accomplished by the control unit 4 (not shown in these figures) switching the appropriate spare pumps into/out-of the pumping circuit. The control unit 4 may implement the change in bandwidth in response to a command message sent from the remote device controller 4000, by way of the network 3000 (see, e.g., FIG. 4).

Figure 32:
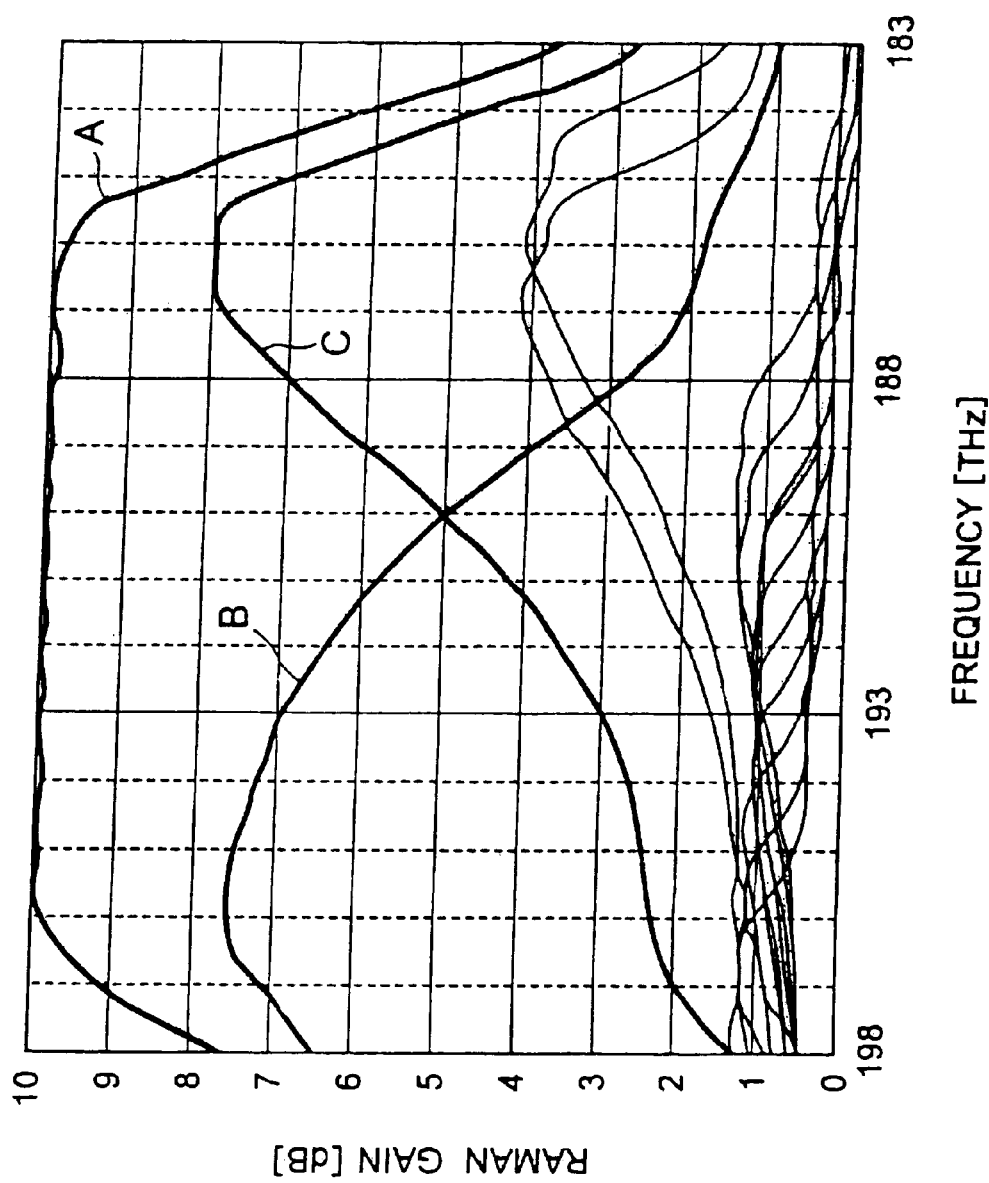
FIG. 32 is a graph illustrating amplification profiles for a variation of the pumping device in FIG. 30.

FIG. 32 illustrates amplification profiles for an example in which the pumps 130 and 131 are not used (rather than the pumps 131 and 132), as determined by the control unit 4. In addition, the interval between the adjacent operating pumps is within an inclusive range of 6 nm to 35 nm, and the number of pumps on the shorter wavelength side is greater than on the longer wavelength side. In FIG. 32, the curve "A" represents the total amplification profile, the curve "B" represents the sum of amplification profiles due to the first to ninth pumps, and the curve "C" represents the sum of the amplification profiles of the twelfth and thirteenth pumps. The thin lines represent the individual amplification profiles of the operating pumps.

Figure 33:
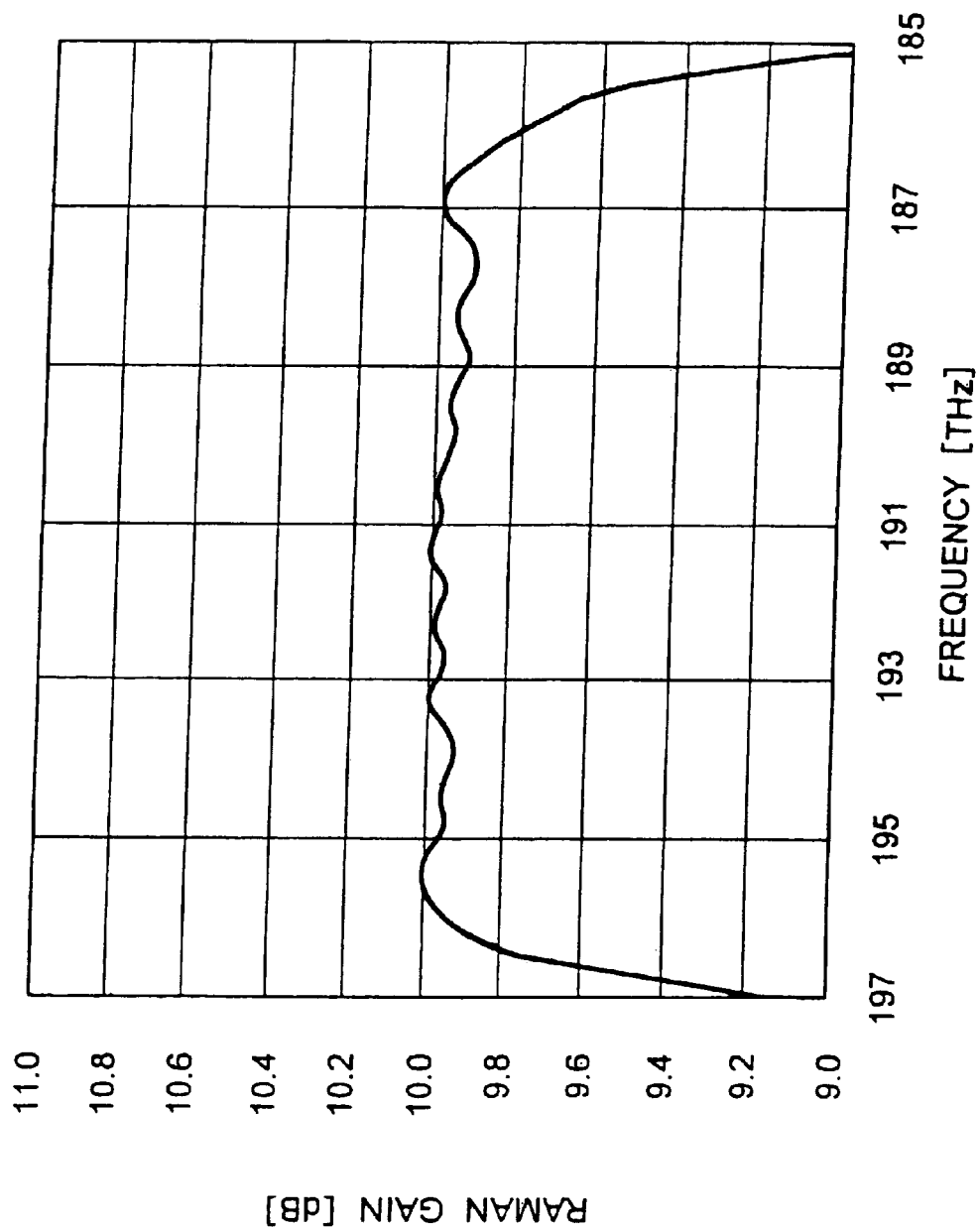
FIG. 33 is a graph illustrating an enlarged view of a total amplification profile illustrated in FIG. 32.

FIG. 33 is an enlarged view of the total amplification curve "A" in FIG. 32. As shown, the peak amplification is at 10 dB, the amplification extends from about 196 THz (a wavelength of 1529.6 nm) to about 186 THz (a wavelength of 1611.8 nm) and the amplification deviation is about 0.1 dB. Further, as evident from a comparison of the curves "C" in FIGS. 30 and 32, two pumps can be driven at a lower output value (as in FIG. 32), rather than by driving a single pump at a higher output power (as in FIG. 30).

Example Process for Changing a Target Profile With Altered Bandwidth

Figure 34:
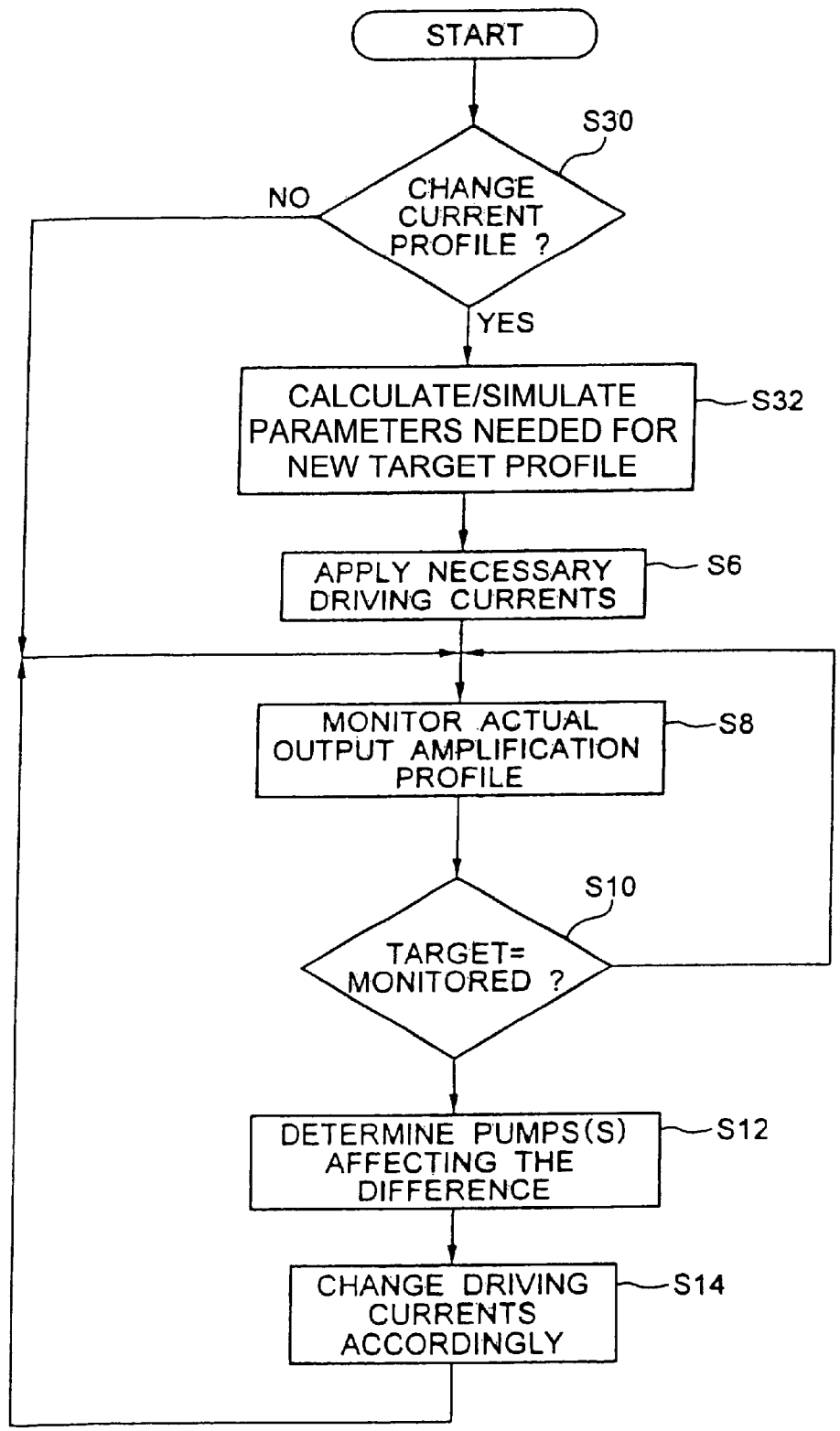
FIG. 34 is a flowchart illustrating yet another control operation according to the present invention.

FIG. 34 is a flowchart illustrating an operational procedure of the control unit 4 according to the second aspect of the present invention. Steps S6, S8, S10, S12 and S14 are the same as that described in FIG. 11, and accordingly a detailed description of these steps will be omitted. The difference between the operational procedure shown in FIG. 34 and that shown in FIG. 11 is the control unit 4 changes an existing amplification profile (step S30) to a new target amplification performance with a different amplification bandwidth. For example, an amplification bandwidth may need to be increased so as to accommodate additional channels (e.g., as the network grows in capacity). In this instance, a network engineer may instruct the control unit 4 (e.g., via the keyboard and mouse, or remotely via the remote device controller 4000, see FIG. 4) to increase (or decrease) the amplification bandwidth.

The control unit 4 then determines the parameters to produce the new target profile (step S32). For example, as discussed above with reference to the total amplification profiles shown in FIGS. 20, 22, 25, 28, 31 and 33, an amplification bandwidth may be increased by increasing the wavelength separation of the pump having a largest central wavelength from the pump having the next largest central wavelength. That is, the amplification bandwidth in FIG. 20 is produced by the arrangement shown in FIG. 18 (in which the pump 96 is separated by 2 THz from the pump 95), the amplification bandwidth in FIG. 21 is produced by separating the pump 96 from the pump 95 by 2.5 THz, and the amplification bandwidth in FIG. 25 is produced by separating the pump 108 (see FIG. 23) from the pump 105 by 3 THz. Thus, the control unit 4 may dynamically change the wavelength spacings between pumps by turning on or off spare pumps so as to change an existing amplification profile. For example, assume a pumping device includes seven pumps each separated at a wavelength interval of 1 THz. Then, according to the second aspect of the present invention, the control unit 4 may only apply driving current to the first through fifth pumps and the seventh pump. This would result in a similar arrangement as that in shown in FIG. 18.

In another example, the control unit 4 may determine a certain pump is not operating at a required output power, and then turn on or off certain pumps to offset the failing pump. For example, with reference to FIG. 23, assume the eighth pump 108 is not properly producing a gain of 8 dB, but rather is producing a gain of 5 dB. In this instance, the control unit 4 may apply a driving current to seventh pump 107 (which was previously turned off) so the pump 107 produces a gain of 5 dB. Note this example is similar to that shown in FIG. 26, in which two adjacent pumps may be operated to produce a gain of 5 dB each, rather than one pump operating at a gain of 8 dB. That is, the fifth pump 105 may be turned off in order to operate like the pumping device shown in FIG. 26.

Thus, the control unit 4 may be configured to change an existing Raman amplification profile to have a different amplification bandwidth. This change may be initiated via an external command from a network engineer (locally or remotely) or may be requested by the control unit 4 itself. That is, as discussed above, the control unit 4 may determine a certain pump is not producing the required gain (i.e., via the monitoring capabilities of the control unit 4) and then change an existing amplification profile.

Figure 35:
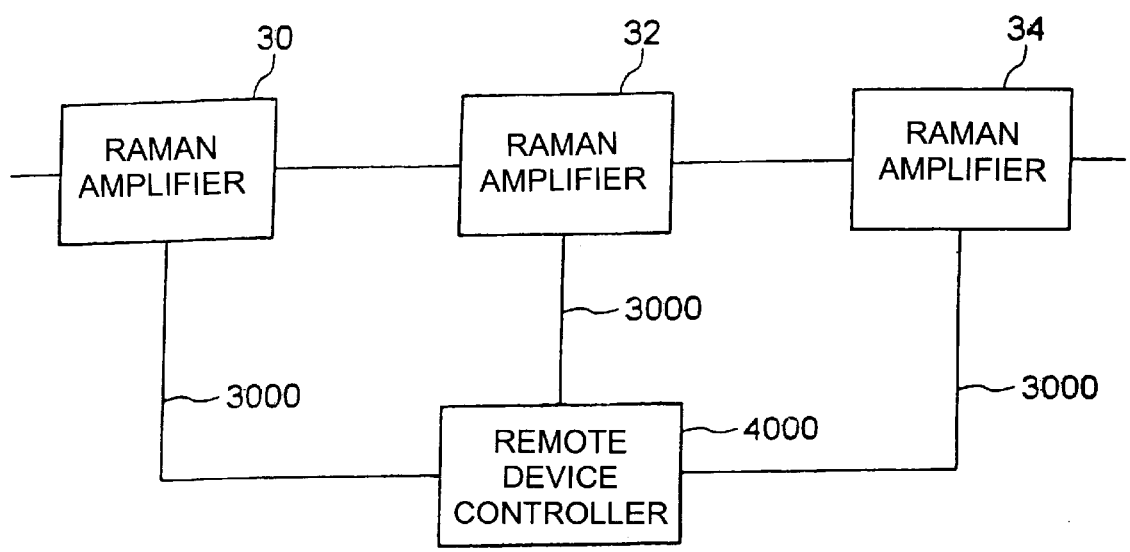
FIG. 35 is a schematic of cascaded Raman amplifiers and an associated control unit according to the present invention.

Turning now to FIG. 35, which is a schematic for illustrating an operational procedure according to the another aspect of the present invention. In more detail, FIG. 35 illustrates three cascaded Raman amplifiers 30, 32 and 34, which are remotely controlled by the remote device controller 4000. In this example, the remote device controller 4000 may change a total amplification profile in a first Raman amplifier to effect changes in a next Raman amplifier. For example, the remote device controller 4000 may determine a pump (or pumps) in the Raman amplifier 32 is not operating. The remote device controller 4000 may then increase a corresponding pump output power operating in the Raman amplifier 30 to offset the effect caused by the pump which does not operate in the Raman amplifier 32. Note that the remote device controller 4000 may also increase a corresponding pump output power in the Raman amplifier 34 to offset the effect caused by the pump not operating in the Raman amplifier 32. That is, the remote device controller 4000 is capable of controlling an entire operation of a plurality of cascaded Raman amplifiers such that an overall operation of the network is enhanced.

In addition, the remote device controller 4000 may be connected to each of the Raman amplifiers via an Internet connection (as discussed previously). Thus, a network engineer may effectively monitor the network via the remote device controller 4000. The remote device controller 4000 may include a web site that is accessible from other locations as well, via an Internet Browser, such as MICROSOFT EXPLORER. In this case, the operational status of each Raman amplifier 30, 32, and 34 may be monitored continuously. Each Raman amplifier 30, 32, and 34 may include a built-in reporting mechanism that provides periodic status messages to the remote device controller 4000. Alternatively, the remote device controller can download a Java or ActiveX file to each of the Raman amplifiers 30, 32, and 34, which may then operate to collect status data for automatic report-back to the remote device controller 4000. In this way, a network operator may observe the different target amplification profiles being employed in the respective Raman amplifiers 30, 32, 34 and take corrective action to help balance operations at a system level, to optimize performance at the system level.

The remote device controller 4000 and respective Raman amplifiers each employ communications interfaces and processing software to enable the uploading and downloading of active content for inspection by network operators and technicians located at any of amplifiers or controller 4000, but also at remote locations via the world wide web. How the world wide web operates, including communication tools such as web browsers and web pages is discussed at pages 122–166 of Gralla, P., "How The Internet Works", Que, 1999, the entire contents of which are incorporated herein by reference. Similarly, the transfer of active content between network resources in discussed in Gralla, pages 170–210, the entire contents of which are incorporated herein by reference.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, an type of disk including floppy disks, optical disks, CD-ROMs, and magneto-optical disks, ROMs, RAMs, EPROMs, EEPROMs, magnetic or optical cards, or any type of pure software inventions (e.g., word processing, accounting, Internet related, etc.) media suitable for storing electronic instructions.

Obviously, additional numerous modifications and variations of the present invention are possible in light of the above teachings. It is therefore to be understood that within the scope of the appended claims, the present invention may be practiced otherwise than as specifically described herein.

What is claimed is:

1. A controller for a Raman amplifier having a plurality of pump lasers that produce light centered at different wavelengths so as to provide WDM pump light, comprising:

a memory configured to hold computer-readable instructions and data, said data being arranged in a plurality of sets of drive conditions for said plurality of pump lasers, each of said sets of drive conditions corresponding to a different target profile, each different target profile including multiple wavelength samples distributed across an amplification bandwidth; and a processor having an interface configured to communicate with external devices, said processor configured to execute said computer-readable instructions and implement a target setting mechanism and a parameter application mechanism, wherein said target setting mechanism is configured to identify a target profile and corresponding operating parameters for the plurality of pump lasers to achieve the target profile, said operating parameters including a set of said plurality of sets of drive conditions, said target profile relating to an operational condition provided to said processor from at least one of said external devices, said target profile having multiple samples and being at least one of a predetermined amplification profile having the multiple samples specified across the amplification bandwidth, said amplification bandwidth being a contiguous bandwidth at least as large as a signal bandwidth of a WDM optical signal that is amplified by said Raman amplifier while propagating through an optical fiber, and an output signal level profile having the multiple samples specified across said amplification bandwidth, said parameter application mechanism is configured to output at least one control signal that defines said operating parameters so as to adjust an amount of light introduced into said optical fiber from said plurality of pump lasers, and said target setting mechanism is configured to compare the multiple samples of said target profile with corresponding samples obtained by monitoring an actual profile so as to determine whether each sub-band of a plurality of sub-bands of said actual profile is within a predetermined tolerance of said target profile across said amplification bandwidth so that said controller can make an adjustment to any of the plurality sub-bands of said actual profile that is not within said predetermined tolerance.

2. The controller of claim 1, wherein said target setting mechanism identifies by simulation said operating parameters to achieve an actual profile that is within the predetermined tolerance of said target profile.

3. The controller of claim 1, wherein said target setting mechanism is configured to retrieve from memory operating parameters for the pump laser to achieve an actual profile that is within the predetermined tolerance of the target profile.

4. The controller of claim 3, wherein said operational conditions are stored in said memory in association with said target profile.

5. The controller of claim 1, wherein:

said target profile being the predetermined amplification profile; and said target setting mechanism is configured to calculate said predetermined amplification profile from a sampled WDM output signal and a sampled input signal.

6. The controller of claim 5, wherein said processor is configured to adjust said operating parameters so as to maintain an actual output profile within the predetermined tolerance of said target amplification profile.

7. The controller of claim 1, wherein:

said target profile is said output signal level profile; and said target setting mechanism is configured to monitor the WDM optical signal when output from said Raman amplifier so as to determine an actual amplification profile.

8. The controller of claim 7, wherein said processor being configured to:

receive an indication of a level of an input WDM signal; and calculate an amplification gain of said Raman amplifier by calculating a ratio of said WDM optical signal when output to said input signal so as to determine if an amount of amplification provided by said Raman amplifier is consistent with said target profile.

9. The controller of claim 7, wherein said processor is configured to determine a level of the WDM optical signal when input to said Raman amplifier from output signal level data provided by an adjacent Raman amplifier, wherein said adjacent Raman amplifier is connected to an input of said Raman amplifier by said optical fiber, said processor being configured to calculate a level of said WDM optical signal by comparing the signal level data and fiber loss data.

10. The controller of claim 7, wherein said processor is configured to monitor said WDM optical signal when output from the Raman amplifier with at least as many sample points as WDM channels in the WDM optical signal.

11. The controller of claim 10, wherein said processor is configured to receive separate spectral samples of the WDM optical signal from a demultiplexer that separates the WDM optical signal into a plurality of signals.

12. The controller of claim 7, wherein said processor is configured to monitor a WDM output signal of said Raman amplifier by monitoring at least as many samples taken at different wavelengths as a number of said pump lasers in said Raman amplifier.

13. The controller of claim 7, wherein said processor monitors the WDM output signal by monitoring a predetermined number of samples taken at different wavelengths, said predetermined number of samples being in a range bounded by a number of the pump lasers in the Raman amplifier and a number of WDM channels in said WDM optical signals.

14. The controller of claim 6, wherein said processor is configured to compare said sampled WDM output signal with said target profile and determine if a deviation therebetween is greater than a predetermined tolerance.

15. The controller of claim 14, wherein if the deviation is greater than the predetermined tolerance, the processor incrementally adjusts an output power of at least one of the plurality of pump lasers that has a gain profile that corresponds in wavelength with a band of wavelengths in which the deviation occurred.

16. The controller of claim 15, wherein if the deviation is greater than the predetermined tolerance, the processor adjusts an output of a group of the plurality of pump lasers, said group containing pump lasers that have adjacent operating wavelengths with respect to an entire set of operating wavelengths for the plurality of pump lasers.

17. The controller of claim 14, wherein said processor determines if respective samples of the WDM output signal are not within said predetermined tolerance according to an equation $$ABS[\text{target}-\text{monitored}] \leq \text{predetermined tolerance.}$$

18. The controller of claim 17, wherein if only one sample in a series of samples is greater than the predetermined tolerance, the processor identifies which of said plurality of pump lasers produces a Raman gain profile having a gain peak closest to a wavelength in which the deviation occurred.

19. The controller of claim 18, wherein said parameter application mechanism is configured to adjust an amount of pump light from the optical pump that produces the Raman gain profile having a gain peak closest to the wavelength in which the deviation occurred.

20. The controller of claim 17, wherein if more than one adjacent sample is greater than said predetermined tolerance, said processor develops a secondary target amplification profile.

21. The controller of claim 20, wherein said parameter amplification mechanism is configured to adjust the output of the control signal so as to adjust an amount of pump light from the plurality of pump lasers by an amount that corresponds with the secondary target amplification profile.

22. The controller of claim 20, wherein said processor is configured to retrieve said secondary target amplification profile from said memory.

23. The controller of claim 22, wherein said processor is configured to identify said secondary target amplification profile from a plurality of candidate profiles by a pattern recognition mechanism.

24. The controller of claim 23, wherein said processor is configured to identify said secondary target amplification profile by calculating a least square fit of said secondary target amplification profile with respect to said plurality of candidate profiles.

25. The controller of claim 1, wherein said processor is further configured to implement a target adjustment mechanism that is configured to adjust said target profile when said interface receives an indication from one of said external components indicating that an operational condition has changed.

26. The controller of claim 25, wherein said target adjustment mechanism is configured to adjust a shape of said target profile.

27. The controller of claim 26, wherein said target adjustment mechanism being configured to identify by way of simulation operating parameters for the pump lasers that correspond with a shape of said target profile.

28. The controller of claim 26, wherein said target adjustment mechanism being configured to identify by way of a lookup table operating parameters for the pump lasers that correspond with a shape of said target profile.

29. The controller of claim 25, wherein said target adjustment mechanism being configured to adjust a bandwidth of said amplification bandwidth.

30. The controller of claim 29, wherein said target adjustment mechanism being configured to identify said operating parameters corresponding with said amplification bandwidth by way of said at least one of simulation and a table lookup procedure.

31. The controller of claim 29, wherein said target adjustment mechanism being configured to enable for operational use a different subset of previously non-operating pump lasers from said plurality of pump lasers.

32. The controller of claim 25, wherein said target adjustment mechanism is configured to adjust said target profile after identifying a change in operational condition, said operational condition being at least one of
   an amount of the pump interaction,
   fiber loss, and
   a change in amplification profile from an adjacent cascaded Raman amplifier.

33. The controller of claim 1, wherein said target setting mechanism is configured to identify a common set of operating parameters for a first group of the pump lasers and uniformly change the operating parameters for the first group of pump lasers when said processor determines that an actual profile of said Raman amplifier is not within a predetermined tolerance of said target profile.

34. The controller of claim 33, wherein the processor is configured to calculate respective output powers of each pump laser in the first group, and remaining pump lasers in a second group of said plurality of pump lasers.

35. The controller of claim 34, wherein the processor is configured to calculate the respective output powers of each pump in the first group and the second group from at least one of
   a simulation routine,
   a look-up table, and
   a superposition process.

36. The controller of claim 34, wherein a total number of pump lasers in the first group is greater than a total number of pump lasers in the second group.

37. The controller of claim 1, wherein the processor is configured to control the output power of each of the plurality of pump lasers to increase as an operating wavelength of the respective pump lasers decrease.

38. The controller of claim 1, wherein the plurality of pump lasers are configured to produce light at different central wavelengths and operate within a wavelength band having a shorter wavelength side and a longer wavelength side, said shorter wavelength side containing a first group of pump lasers having operating central wavelengths that are less than a middle wavelength between a shortest and a longest central wavelength of the pump lasers, and the longer wavelength side containing a second group pump lasers having operating central wavelengths that are greater than the middle wavelength.

39. The controller of claim 38, wherein the first group of pump lasers includes more pump lasers than the second group of pump lasers.

40. The controller of claim 38, wherein the processor is configured to control the plurality of pump lasers such that an optical pumping power launched into the optical fiber due to the first group is greater than an optical pumping power launched into the optical fiber due to the second group.

41. The controller of claim 38, wherein said parameter application mechanism is configured to output a control signal only to the subset of pump lasers in the longer wavelength side so as to impart tilt to a composite gain profile of said Raman amplifier throughout the amplification bandwidth.

42. The controller of claim 41, wherein said parameter application mechanism is configured to impart a negatively sloped tilt to the gain profile by decreasing an optical output of the subset of pump lasers in the second group.

43. The controller of claim 41, wherein said parameter application mechanism is configured to impart a positively sloped tilt to the gain profile by decreasing an optical output of the subset of pump lasers in the first group.

44. The controller of claim 1, wherein said processor receives via said interface said set of drive conditions from a memory that is external to said Raman amplifier.

45. The controller of claim 44, wherein said interface being configured to connect to an Internet for receiving information from at least one of the memory external to the Raman amplifier and an adjacent Raman amplifier connected to said Raman amplifier by the optical fiber.

46. The controller of claim 44, wherein said computer readable instructions are downloaded to said memory from the memory external to the Raman amplifier.

47. The controller of claim 46, wherein said computer readable instructions include at least one of Java and ActiveX instructions.

48. The controller of claim 47, wherein said processor being configured to receive at least one of said computer readable instructions, said data, and said operational conditions from said remote computer by way of a worldwide web page hosted by said remote computer.

49. The controller of claim 1, wherein said set of drive conditions being at least one of a set of drive currents and other control parameters for said pump lasers that influence an achievement of the target profile.

50. The controller of claim 1, wherein said processor is configured to receive via said interface, operational conditions regarding an operational status of an adjacent cascaded Raman amplifier so as to cause said target setting mechanism to identify operating parameters for the pump lasers that will offset a change in said amplification profile of said adjacent cascaded Raman amplifier.

51. A Raman amplifier for amplifying a WDM optical signal in an optical fiber propagating therethrough, comprising:
   a pumping device including a plurality of pump lasers configured to produce light centered at different wavelengths so as to produce WDM pump light that is applied to the optical fiber;
   an optical coupler configured to optically interconnect the pumping device with the optical fiber; and
   a controller having
      a memory interface retrieve from memory computer-readable instructions and data, said data being arranged in a plurality of sets of drive conditions for said plurality of pump lasers, each of said sets of drive conditions corresponding to a different target profile, each different target profile including multiple wavelength samples distributed across an amplification bandwidth, and
      a processor having an interface configured to communicate with external devices, said processor configured to execute said computer-readable instructions and implement a target setting mechanism and a parameter application mechanism, wherein
         said target setting mechanism is configured to identify a target profile and corresponding operating parameters for the plurality of pump lasers to achieve the target profile, said operating parameters including a set of said plurality of sets of drive conditions, said target profile relating to an operational condition provided to said processor from at least one of said external devices, said target profile having multiple samples and being at least one of
            a predetermined amplification profile having the multiple samples specified across the amplification bandwidth, said amplification bandwidth being a contiguous bandwidth at least as large as a signal bandwidth of a WDM optical signal that is amplified by said Raman amplifier while propagating through an optical fiber, and an output signal level profile having the multiple samples specified across said amplification bandwidth, said parameter application mechanism is configured to output at least one control signal that defines said operating parameters so as to adjust an amount of light introduced into said optical fiber from said plurality of pump lasers, and said target setting mechanism is configured to compare the multiple samples of said target profile with corresponding samples obtained by monitoring an actual profile so as to determine whether each sub-band of a plurality of sub-bands of said actual profile is within a predetermined tolerance of said target profile across said amplification bandwidth so that said controller can make an adjustment to any of the plurality sub-bands of said actual profile that is not within said predetermined tolerance.

52. The Raman amplifier according to claim 51, further comprising a tap coupler configured to provide to the processor a sampled WDM output signal from the Raman amplifier.

53. The Raman amplifier of claim 51, wherein said target setting mechanism identifies by simulation said operating parameters to achieve an actual profile that is within a predetermined tolerance of said target profile.

54. The Raman amplifier of claim 51, wherein said target setting mechanism is configured to retrieve from memory said set of driving conditions for the pump laser to achieve an actual profile that is within a predetermined threshold of the target profile.

55. The Raman amplifier of claim 54, wherein said set of driving conditions include at least one of driving currents and other operating parameters associated with an amount of optical output produced by said pump lasers to achieve said target profile.

56. The Raman amplifier of claim 51, wherein: said target profile being the predetermined amplification performance; and said target setting mechanism is configured to calculate said predetermined amplification performance from the sampled WDM output signal and a sampled input signal.

57. The Raman amplifier of claim 56, wherein said processor is configured to adjust said operating parameters so as to maintain an actual output profile of said Raman amplifier within a predetermined tolerance of said target amplification profile.

58. The Raman amplifier of claim 51, wherein
said target profile is said output signal level profile; and
said target setting mechanism is configured to monitor the WDM output signal of said Raman amplifier so as to determine an actual amplification profile.

59. The Raman amplifier of claim 58, wherein said processor being configured to:
receive an indication of a level of an input WDM signal; and
calculate an amplification gain of said Raman amplifier by calculating a ratio of an output WDM signal to said input WDM signal so as to determine if an amount of amplification provided by said Raman amplifier is consistent with said target profile.

60. The Raman amplifier of claim 58, wherein said processor is configured to determine a level of the WDM optical signal when input to said Raman amplifier from output signal level data provided by an adjacent cascaded Raman amplifier, wherein said adjacent cascaded Raman amplifier is connected to said Raman amplifier by said optical fiber,
said processor being configured to calculate said level of said WDM optical signal by comparing the signal level data and fiber loss data.

61. The Raman amplifier of claim 52, further comprising a demultiplexer that divides the WDM output optical signal into a predetermined number of separate signals, each centered at a different wavelength in the amplification bandwidth, wherein
said predetermined number of separate signals is at least as great in number as WDM channels in the WDM optical signal.

62. The Raman amplifier of claim 52, further comprising a demultiplexer that divides the WDM output optical signal into a predetermined number of separate signals, each centered at a different wavelength in the amplification bandwidth, wherein
said predetermined number of separate signals corresponds in number with the number of pump lasers.

63. The Raman amplifier of claim 52, wherein said processor is configured to compare said WDM output signal with said target profile and determine if a deviation therebetween is greater than a predetermined tolerance.

64. The Raman amplifier of claim 63, wherein if the deviation is greater than the predetermined tolerance, the processor incrementally increases or decreases an output power of at least one of the plurality of pump lasers that has a gain profile that corresponds in wavelength with a range of wavelengths in which the deviation occurred.

65. The Raman amplifier of claim 63, wherein if the deviation is greater than the predetermined tolerance the controller adjusts an output of a group of the plurality of pump lasers, said group containing pump lasers that have adjacent operating wavelengths with respect to the set of operating wavelengths of the plurality of pump lasers.

66. The Raman amplifier of claim 63, wherein said processor determines if respective spectral samples of said WDM output signal are not within said predetermined tolerance according to an equation $$ABS[\text{target}-\text{monitored}] \leq \text{predetermined tolerance}.$$

67. The Raman amplifier of claim 63, wherein if only one spectral sample in said WDM output signal is greater than predetermined tolerance, said controller is configured to identify which of said plurality of pump lasers produces a Raman gain profile having a gain peak closest to a wavelength of a spectral sample in said WDM output signal that is greater than said predetermined tolerance.

68. The Raman amplifier of claim 67, wherein said parameter application mechanism is configured to adjust an amount of pump light from the optical pump that produces the Raman gain profile having a peak closest to the location of the sample that is greater than the predetermined tolerance.

69. The Raman amplifier of claim 63, wherein if more than one adjacent spectral sample of said WDM output signal is greater than said predetermined tolerance, said processor develops a secondary target amplification profile.

70. The Raman amplifier of claim 69, wherein said parameter application mechanism is configured to adjust the output of the at least one control signal so as to adjust an amount of pump light from the plurality of pump lasers by an amount that corresponds with the secondary target amplification profile.

71. The Raman amplifier of claim 69, wherein said processor is configured to retrieve said secondary target amplification profile from said memory.

72. The Raman amplifier of claim 71, wherein said processor is configured to identify said secondary target amplification profile from a plurality of candidate profiles by pattern recognition.

73. The Raman amplifier of claim 72, wherein said processor is configured to identify said secondary target amplification profile by calculating a least square fit of said secondary target amplification profile with said candidate profiles.

74. The Raman amplifier of claim 51, wherein said processor is further configured to implement a target adjustment mechanism that is configured to adjust said target profile when said interface receives an indication from one of said external components that an operational condition has changed.

75. The Raman amplifier of claim 74, wherein said target adjustment mechanism is configured to adjust a shape of said target profile.

76. The Raman amplifier of claim 75, wherein said target adjustment mechanism being configured to identify by way of simulation operating parameters for the pump lasers that correspond with a shape of said target profile.

77. The Raman amplifier of claim 75, wherein said target adjustment mechanism being configured to identify by way of lookup table operating parameters for the pump lasers that correspond with a shape of said target profile.

78. The Raman amplifier of claim 74, wherein said target adjustment mechanism being configured to adjust a bandwidth of said amplification bandwidth.

79. The Raman amplifier of claim 78, wherein said target adjustment mechanism being configured to identify said operating parameters corresponding with said amplification bandwidth by way of said at least one of simulation and a table lookup procedure.

80. The Raman amplifier of claim 78, wherein said target adjustment mechanism being configured to enable for operational use a different subset of previously non operational pump lasers from said plurality of pump lasers.

81. The Raman amplifier of claim 74, wherein said target adjustment mechanism is configured to adjust said target profile after identifying a change in operational conditions, said operational conditions being at least one of
    pump interaction,
    fiber loss, and
    a change in amplification profile from an adjacent cascaded Raman amplifier.

82. The Raman amplifier of claim 51, wherein said target setting mechanism is configured to identify a common set of operating parameters for a first group of the pump lasers and uniformly change the operating parameters for the first group of pump lasers when said processor determines that an actual profile of said Raman amplifier is not within a predetermined tolerance of said target profile.

83. The Raman amplifier of claim 82, wherein the processor is configured to calculate respective output powers of each pump laser included in the first group, and remaining pump lasers in a second group of said plurality of pump lasers to produce the target amplification profile.

84. The Raman amplifier of claim 83, wherein the processor is configured to calculate the required output powers of each pump included in the first group and the second group from at least one of
    a simulation routine configured to calculate the required output powers to produce the target profile,
    a look-up table including the required output powers to produce the target profile, and
    a superposition routine.

85. The Raman amplifier of claim 83, wherein a total number of pump lasers in the first group is greater than a total number of pump lasers in the second group.

86. The Raman amplifier of claim 51, wherein the plurality of pump lasers are each configured to produce light at different central wavelengths and operate within a wavelength band having a shorter wavelength side and a longer wavelength side, said shorter wavelength side containing pump lasers in a first group having operating central wavelengths that are less than a middle wavelength between a shortest and a longest central wavelength of the pump lasers, and the longer wavelength side containing pump lasers in a second group having operating central wavelengths that are greater than the middle wavelength.

87. The Raman amplifier of claim 86, wherein the first group of pump lasers are configured to output a total amount of optical power greater than the second group.

88. The Raman amplifier of claim 86, wherein the processor is configured to control the plurality of pump lasers such that an optical pumping power launched into the optical fiber due to the pump lasers in the shorter wavelength side is greater than an optical pumping power launched into the optical fiber due to the pump lasers in the longer wavelength side.

89. The Raman amplifier of claim 86, wherein said parameter application mechanism is configured to output a control signal to increase the output of the second group of lasers relative to the first group so as to impart a positively sloped tilt to a composite gain profile of said Raman amplifier.

90. The Raman amplifier of claim 86, wherein said parameter application mechanism is configured to output a control signal to decrease an output of the first group of lasers relative to the second group so as to impart a positively sloped tilt to a composite gain profile of said Raman amplifier.

91. The Raman amplifier of claim 51, wherein said processor receives via said interface said data and at least a portion of said operation conditions from a remote computer.

92. The Raman amplifier of claim 91, wherein said interface being configured to connect to the Internet for receiving information from at least one of the remote computer and an adjacent Raman amplifier connected to said Raman amplifier by the optical fiber.

93. The Raman amplifier of claim 91, wherein said computer readable instructions are downloaded to said memory from said remote computer.

94. The Raman amplifier of claim 93, wherein said computer readable instructions include at least one of Java and ActiveX instructions.

95. The Raman amplifier of claim 92, wherein said processor being configured to receive at least one of said computer readable instructions, said data, and said operational conditions from said remote computer by way of a worldwide web page hosted by said remote computer.

96. The Raman amplifier of claim 91, wherein said processor is configured to receive from said remote computer via said interface other operational conditions that influence an optimal target profile.

97. The Raman amplifier of claim 51, wherein said processor is configured to receive via said interface, an operational condition regarding an operational status of an adjacent Raman amplifier so as to cause said target setting mechanism to identify operating parameters for the pump lasers that will offset a change in said amplification profile of said adjacent Raman amplifier.

98. A method for controlling an amplification profile of a Raman amplifier having a plurality of pump lasers that produce light centered at different wavelengths so as to provide WDM pump light, comprising steps of:
identifying operating parameters for the plurality of pump lasers that correspond with a target profile for said Raman amplifier, said target profile including multiple wavelength samples distributed across an amplification bandwidth and being at least one of
a predetermined amplification profile having the multiple samples specified across the amplification bandwidth, said amplification bandwidth being a contiguous bandwidth at least as large as a signal bandwidth of a WDM optical signal that is amplified when propagating through an optical fiber, and
an output signal level profile having the multiple samples specified across said amplification bandwidth;
comparing the multiple samples of said target profile with corresponding samples obtained by monitoring an actual profile so as to determine whether each sub-band of a plurality of sub-bands of said actual profile is within a predetermined tolerance of said target profile across said amplification bandwidth;
forming a control signal in a processor derived from said operating parameters, said forming step including retrieving from memory a set of drive conditions for said plurality of pump lasers, said set being one of a plurality of sets of drive conditions that correspond to different target profiles;
sending said control signal to an optical output adjustment mechanism coupled to said plurality of pump laser; and
adjusting an amount of light introduced into said optical fiber from said plurality of pump lasers to achieve the actual profile that is within the predetermined tolerance of said target profile for any of the plurality sub-bands of said actual profile that is not within said predetermined tolerance.

99. The method of claim 98, wherein said output adjustment mechanism being a drive circuit, and said adjusting step includes adjusting at least one of drive currents applied to at least a portion of said pump lasers and other drive conditions for said plurality of pump lasers.

100. The method of claim 98, further comprising a step of forming a sampled WDM output signal from the Raman amplifier and providing said sampled WDM output signal to said processor so as to create a feedback loop.

101. The method of claim 99, wherein said identifying step includes executing a simulation routine to identify said operating parameters to achieve an actual profile that is within a predetermined tolerance of said target profile.

102. The method of claim 99, wherein said retrieving from memory step includes retrieving said set of drive conditions from at least one of a memory in the Raman amplifier and a memory external to the Raman amplifier to achieve an actual profile that is within a predetermined tolerance of the target profile.

103. The method of claim 99, further comprising a step of storing sets of operational conditions in memory in association with different target profiles.

104. The method of claim 100, wherein said target profile being the predetermined amplification profile, and further comprising a step of calculating said predetermined amplification profile from the sampled WDM output signal and a sampled WDM optical signal that is input to the Raman amplifier.

105. The method of claim 104, further comprising a step of monitoring an output performance of said Raman amplifier.

106. The method of claim 105, further comprising a step of adjusting said operating parameters so as to keep said output profile within a predetermined tolerance of said target profile.

107. The method of claim 106, wherein said monitoring step includes:
receiving an indication of a level of an input WDM signal; and
calculating an amplification gain by finding a ratio of said sampled WDM output signal to said input WDM signal so as to determine if an amount of amplification provided by said Raman amplifier is consistent with said target profile.

108. The method of claim 105, further comprising steps of:
receiving signal level data of the WDM optical signal when output from an adjacent cascaded Raman amplifier, said adjacent cascaded Raman amplifier is connected to said Raman amplifier by said optical fiber; and
determining a signal level of said WDM optical signal when input to said Raman amplifier by comparing the signal level data with fiber loss data.

109. The method of claim 105, further comprising:
dividing the WDM output optical signal into a predetermined number of separate signals, each centered at a different wavelength in the amplification bandwidth, wherein
said predetermined number of separate signals is at least as great in number as WDM channels in the WDM optical signal.

110. The method of claim 105, further comprising:
dividing the WDM output optical signal into a predetermined number of separate signals, each centered at a different wavelength in the amplification bandwidth, wherein
said predetermined number of separate signals corresponds in number with the number of pump lasers.

111. The method of claim 100, further comprising:
comparing said sampled WDM output signal with said target profile and determining if a deviation therebetween is greater than a predetermined tolerance.

112. The method of claim 111, wherein if the deviation is greater than the predetermined tolerance, incrementally adjusting an output power of at least one of the plurality of pump lasers that has a gain profile that corresponds in wavelength with a range of wavelengths in which the deviation occurred.

113. The method of claim 111, wherein if the deviation is greater than the predetermined tolerance, adjusting an output power of a group of the plurality of pump lasers, said group containing pump lasers that have adjacent operating wavelengths with respect to the set of operating wavelengths of all of the plurality of pump lasers.

114. The method of claim 111, wherein said comparing step includes determining if respective samples of said sampled WDM output signal are not within said predetermined tolerance according to an equation $$ABS[\text{target}-\text{monitored}] \leqq \text{predetermined tolerance}.$$

115. The method of claim 114, wherein if only one sample in said sampled WDM output signal is greater than predetermined tolerance, identifying which of said plurality of pump lasers produces a Raman gain profile having a gain peak closest to a wavelength of a sample in said sampled WDM output signal that is greater than said predetermined tolerance.

116. The method of claim 115, wherein said adjusting step adjusts an amount of pump light from the optical pump that produces the Raman game profile having a peak closest to the wavelength of the sample that is greater than the predetermined tolerance.

117. The method of claim 114, wherein if more than one adjacent sample of said sample signal is greater than said predetermined tolerance, developing a secondary target amplification profile.

118. The method of claim 117, wherein said adjusting step includes adjusting the output of the at least one control signal so as to adjust an amount of pump light from the plurality of pump lasers by an amount that corresponds with the secondary target amplification profile.

119. The method of claim 117, wherein said developing a secondary target amplification profile step includes retrieving said secondary target amplification profile from memory.

120. The method of claim 119, wherein said retrieving said secondary target amplification profile from memory step includes using pattern recognition to identify an appropriate secondary target amplification profile from a plurality of candidate profiles.

121. The method of claim 120, wherein said step of using pattern recognition includes calculating a least square fit of said secondary target amplification profile with said plurality of candidate profiles.

122. The method of claim 98, further comprising steps of:
receiving an indication that an operational condition for said Raman amplifier has changed with regard to an initial setting of operating parameters; and
altering said target profile to account for the change in operational condition.

123. The method of claim 122, wherein said altering step includes adjusting a shape of said target profile.

124. The method of claim 122, wherein said altering step includes adjusting a bandwidth of said amplification bandwidth.

125. The method of claim 124, wherein said altering step includes enabling a previous inactive subset of pump lasers from said plurality of pump lasers.

126. The method of claim 122, wherein said operational condition being at least one of
pump interaction,
fiber loss, and
a change in amplification profile in an adjacent cascaded Raman amplifier.

127. The method of claim 105, wherein said identifying step includes identifying a common set of operating parameters for a first group of the pump lasers and uniformly changing the operating parameters for the first group of pump lasers when the actual profile of said Raman amplifier is not within the predetermined tolerance of said target profile, pump lasers in said first group having operational wavelengths that are either all longer in wavelength or all shorter in wavelength than a second group of the plurality of pump lasers.

128. The method of claim 127, wherein said step of identifying a common set of operating parameters includes using
a simulation routine configured to calculate output powers to produce the target profile,
a look-up table including the output powers to produce the target profile, and
a superposition process.

129. The method of claim 127, wherein a total number of pump lasers in the first group is greater than a total number of pump lasers in the second group.

130. The method of claim 127, wherein the operating wavelengths of the pump lasers in the first wavelength are shorter than the operating wavelengths for the pump lasers in the second group.

131. The method of claim 130, wherein said adjusting step causes more optical pumping power from the pump lasers in the first group to be launched into the optical fiber than optical pumping power from the second group.

132. The method of claim 130, wherein said adjusting step includes decreasing the output of the first group of pump lasers relative to the second group so as to impart a positively sloped tilt to a composite gain profile of said Raman amplifier.

133. The method of claim 130, wherein said adjusting step includes increasing the output of the first group of pump lasers relative to the second group so as to impart a negatively sloped tilt to a composite gain profile of said Raman amplifier.

134. The method of claim 122, wherein said receiving step includes receiving said operational condition from a remote computer.

135. The method of claim 134, wherein said remote computer being a processor in an adjacent cascaded Raman amplifier connected to said Raman amplifier by the optical fiber.

136. The method of claim 134, wherein said remote computer being a computer that interconnects a plurality of cascaded Raman amplifiers by a communication link.

137. The method of claim 136, wherein at least a portion of said communication link being an Internet.

138. The method of claim 134, wherein said receiving step includes receiving said operational condition via a web page hosted on said remote computer.

139. The method of claim 138, wherein said receiving step includes receiving at least one of Java and ActiveX instructions from said remote computer and that runs on a processor in said Raman amplifier.

140. The method of claim 134, wherein said operational condition relates to a change in an operational status of an adjacent Raman amplifier; and
said altering step includes altering a shape of the target profile to compensate for the change in operational status of the adjacent Raman amplifier.

141. An apparatus for controlling an amplification profile of a Raman amplifier having a plurality of pump lasers that produce light centered at different wavelengths so as to provide WDM pump light, comprising:
means for identifying operating parameters for the plurality of pump lasers that correspond with a target profile for said Raman amplifier, said target profile including multiple wavelength samples distributed across an amplification bandwidth and being at least one of a predetermined amplification profile having the multiple samples specified across the amplification bandwidth, said amplification bandwidth being a contiguous bandwidth at least as large as a signal bandwidth of an WDM optical signal that is amplified by said Raman amplifier while propagating through an optical fiber, and an output signal level profile having the multiple samples specified across said amplification bandwidth;

means for comparing the multiple samples of said target profile with corresponding samples obtained by monitoring an actual profile so as to determine whether each sub-band of a plurality of sub-bands of said actual profile is within a predetermined tolerance of said target profile across said amplification bandwidth;

means for forming a control signal derived from said operating parameters that include a set of drive conditions saved in memory that correspond with the target profile, said memory containing other sets of drive conditions that correspond with other target profiles;

means for sending said control signal to said plurality of pump lasers; and means for adjusting an amount of light introduced into said optical fiber from said plurality of pump lasers to achieve the actual profile that is within the predetermined tolerance of said target profile for any of the plurality sub-bands of said actual profile that is not within said predetermined tolerance.

142. The apparatus of claim 141, further comprising:
means for forming a sampled WDM output signal so as to create a feedback loop.

143. The apparatus of claim 142, further comprising means for monitoring an output performance of said Raman amplifier.

144. The apparatus of claim 143, further comprising means for maintaining said output performance within a predetermined tolerance of said target profile.

145. The apparatus of claim 144, further comprising:
means for comparing the output profile with said target profile and determining if a deviation therebetween is greater than the predetermined tolerance.

146. The apparatus of claim 145, further comprising:
means for adjusting an amount of pump light from individual pump lasers or groups of pump lasers depending on whether the deviation is primarily attributable to one pump laser or a group of pump lasers.

147. The apparatus of claim 146, further comprising means for developing a secondary target amplification profile when a spectral band of said deviation is primarily attributable to more than one pump laser.

148. The apparatus of claim 141, further comprising:
means for receiving an indication that an operational condition for said Raman amplifier has changed with regard to an initial setting of operating parameters; and
means for altering said target profile to account for the change in operational condition.

149. The apparatus of claim 148, wherein said means for altering includes means for adjusting a shape of said target profile.

150. The apparatus of claim 148, wherein said means for altering includes means for adjusting a bandwidth of said target profile and the amplification bandwidth of said Raman amplifier.

151. The apparatus of claim 141, wherein said means for adjusting includes means for adjusting optical outputs of groups of pump lasers from said plurality of pump lasers.

152. The apparatus of claim 151, wherein said means for adjusting includes means for adjusting an optical output of a first group of pump lasers by more than a second group of pump lasers so as to impart a tilt to a composite gain profile of said Raman amplifier.

153. The apparatus of claim 141, further comprising means for receiving an operational condition from a remote computer and using said operational condition in said means for identifying to identify another target profile that corresponds with said operational condition.

154. The apparatus of claim 153, wherein said operational condition relates to a change in an operational status of an adjacent Raman amplifier; and
said means for adjusting includes means for adjusting a shape of the target profile to compensate for the change in operational status of the adjacent Raman amplifier.

155. An optical communication system comprising:
a controller having
a processor,
a memory having sets of drive conditions that correspond with different target profiles, and
an interface to a data communications network;
a first Raman amplifier configured to optically amplify a WDM optical signal while propagating through an optical fiber, wherein a wavelength span of said WDM signal falls within a contiguous amplification bandwidth of said first Raman amplifier; the optical fiber; and
a second Raman amplifier configured to receive and Raman amplify said WDM optical signal provided from said first Raman amplifier, said second Raman amplifier having a communications interface that connects to said data communications network, wherein
said controller is configured to retrieve a predetermined set of drive conditions for laser pumps in said second Raman amplifier and send a control message to said second Raman amplifier with said predetermined set of drive conditions that instructs said second Raman amplifier to adjust a target profile thereof, said target profile including multiple wavelength samples distributed across portions of said contiguous amplification bandwidth,
said second Raman amplifier being configured to compare the multiple wavelength samples of said target profile with corresponding samples obtained by monitoring an actual profile so as to determine whether each sub-band of a plurality of sub-bands of said actual profile is within a predetermined tolerance of said target profile across said contiguous amplification bandwidth, and
said second Raman amplifier being configured to adjust an optical output of at least a subset of a plurality of pump lasers therein that provide light centered at different wavelengths so as to produce WDM pump light that causes said actual profile to be within said predetermined tolerance across the amplification bandwidth for any of the plurality sub-bands of said actual profile that is not within said predetermined tolerance.

156. The system of claim 155, wherein at least a portion of said data communications network being an Internet.

157. The system of claim 155, wherein said first Raman amplifier includes an interface configured to report to said controller an operational status thereof, said operational status including whether an optical output capacity of a pump laser contained therein is below a predetermined level.

158. The system of claim 157, wherein in response to receiving said control message, said second Raman amplifier is configured to alter an amplification profile thereof to counteract the optical output capacity of the pump laser of the first Raman amplifier being below a predetermined level.

159. A computer program product for controlling an amplification profile of a Raman amplifier that includes a plurality of pump lasers that produce light at different wavelengths so as to provide WDM pump light, comprising:

means for identifying operating parameters for the plurality of pump lasers that correspond with a target profile for said Raman amplifier, said operating parameters including a set of drive conditions for said plurality of pump lasers that correspond with said target profile, said set of drive conditions being one of a plurality of sets of drive conditions that correspond with other target profiles, said target profile including multiple wavelength samples distributed across an amplification bandwidth and being at least one of a predetermined amplification profile having the multiple samples specified across the amplification bandwidth, said amplification bandwidth being a contiguous bandwidth at least as large as a signal bandwidth of a WDM optical signal that is to be Raman amplified while propagating through an optical fiber, and an output signal level profile having the multiple samples specified across said amplification bandwidth; and a comparison mechanism configured to compare the multiple samples of said target profile with corresponding samples obtained by monitoring an actual profile so as to determine whether each sub-band of a plurality of sub-bands of said actual profile is within a predetermined tolerance of said target profile across said amplification bandwidth;

a control signal formation mechanism that derives a control signal from said operating parameters that includes said set of drive conditions and provides said control said to means for sending said control signal to means for adjusting an amount of light introduced into said optical fiber from said plurality of pump lasers to achieve the actual profile that is within the predetermined tolerance of said target profile for any of the plurality sub-bands of said actual profile that is not within said predetermined tolerance.

160. The computer program product of claim 159, further comprising:

means for monitoring an output performance of said Raman amplifier.

161. The computer program product of claim 160, further comprising means for maintaining said output profile within a predetermined tolerance of said target profile.

162. The computer program product of claim 160, further comprising means for comparing the output profile with said target profile and determining if a deviation therebetween is greater than a predetermined tolerance.

163. The computer program product of claim 162, further comprising:

means for adjusting an amount of pump light from individual pump lasers or groups of pump lasers depending on whether the deviation is primarily attributable to one pump laser or a group of pump lasers.

164. The computer program product of claim 162, further comprising means for developing a secondary target amplification profile when a spectral band of said deviation is primarily attributable to more than one pump laser.

165. The computer program product of claim 159, further comprising:

means for receiving an indication that an operational condition for said Raman amplifier has changed with regard to an initial setting of operating parameters; and means for altering said target profile to account for the change in operational condition.

166. The computer program product of claim 165, wherein said means for altering includes means for adjusting a shape of said target profile.

167. The computer program product of claim 165, wherein said means for altering includes means for adjusting a bandwidth of said target profile and an amplification bandwidth of said Raman amplifier.

168. The computer program product of claim 165, wherein said means for altering includes means for adjusting optical outputs of groups of pump lasers from said plurality of pump lasers.

169. The computer program product of claim 168, wherein said means for altering includes means for adjusting an optical output of a first group of pump lasers by more than a second group of pump lasers so as to impart a tilt to a composite gain profile of said Raman amplifier.

170. The computer program product of claim 165, further comprising means for receiving an operational condition from a remote computer and using said operational condition in said means for identifying to identify a target performance that corresponds with said operational condition.

171. The computer program product of claim 170, wherein:

said operational condition relates to a change in an operational status of an adjacent Raman amplifier; and said means for adjusting includes means for adjusting a shape of the target performance to compensate for the change in operational status of the adjacent Raman amplifier.

* * * * *